US005197927A

United States Patent [19]
Patterson et al.

[11] Patent Number: 5,197,927
[45] Date of Patent: Mar. 30, 1993

[54] BICYCLE DERAILLEUR CABLE ACTUATING SYSTEM

[75] Inventors: Sam H. Patterson, Agoura Hills, Calif.; John D. Cheever; Jeffery M. Shupe, both of Chicago, Ill.

[73] Assignee: Sram Corporation, Chicago, Ill.

[21] Appl. No.: 853,442

[22] Filed: Mar. 18, 1992

Related U.S. Application Data

[63] Continuation-in-part of Ser. No. 672,431, Mar. 20, 1991, Pat. No. 5,102,372.

[51] Int. Cl.$^5$ .............................................. F16H 7/00
[52] U.S. Cl. ...................................................... 474/80
[58] Field of Search ...................................... 474/78–82; 280/236, 238

[56] References Cited

U.S. PATENT DOCUMENTS

| | | | |
|---|---|---|---|
| 5,033,991 | 7/1991 | McLaren | 474/80 X |
| 5,102,372 | 4/1992 | Patterson et al. | 474/80 X |
| 5,135,441 | 8/1992 | Gelbien | 474/80 X |

*Primary Examiner*—Thuy M. Bui
*Attorney, Agent, or Firm*—Albert L. Gabriel

[57] ABSTRACT

A bicycle gear shifting system having rotatable front and rear handgrip shift actuators operatively associated with control cables for shifting respective front and rear derailleur mechanisms. In some forms of the invention the control cable is directly actuated by the handgrip rotator, while in other forms the shifter rotator drives a separate "jack spool" which in turn actuates the control cable. A cam on either the handgrip rotator or the jack spool is configured so as to substantially compensate for increasing force of the derailleur return spring during down-shifting. Compensation is provided in the shift actuators of the invention for various lost motions in the derailleur shifting mechanisms and control cable systems. The shift actuators of the invention also provide overshift movement of the derailleur mechanisms in the down-shifting direction so as to overshift the bicycle chain a sufficient amount beyond the destination derailleur sprocket so that the chain will approach the destination sprocket in the same direction as it would in the up-shifting direction. The shift actuators of the invention also provide equalization for the higher derailleur return spring force during down-shifting than during up-shifting, and allow fine-tuning to avoid chain rasp, which is particularly important for "cross-over" riding.

108 Claims, 30 Drawing Sheets

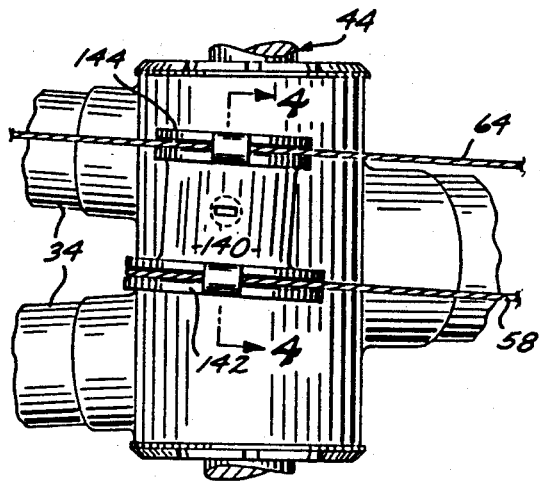
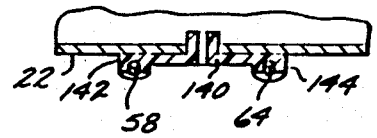
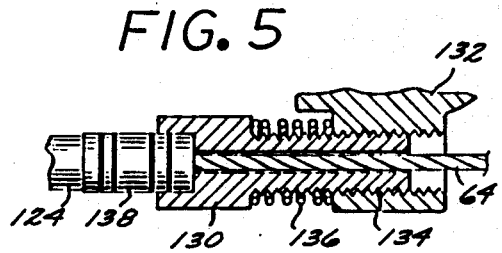
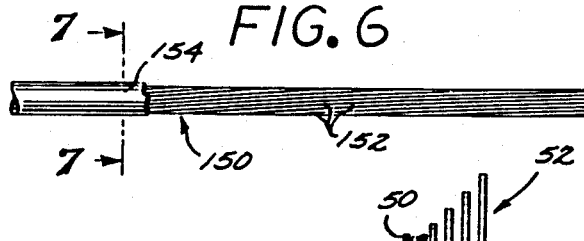
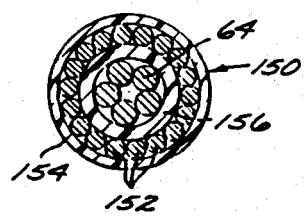
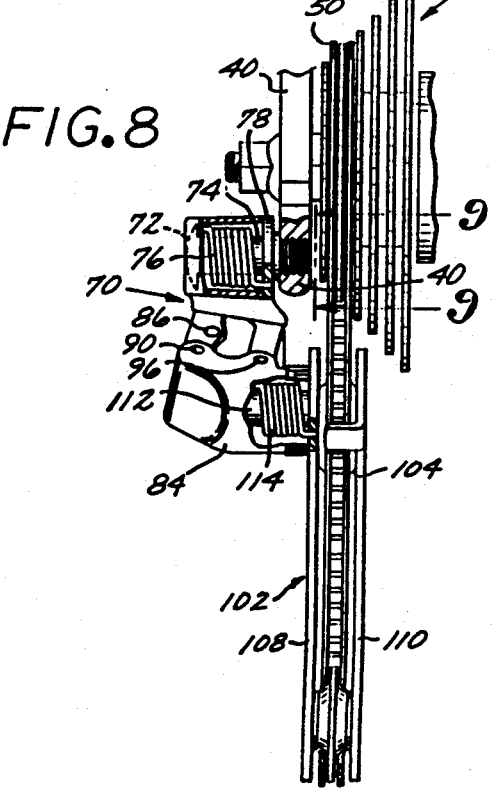
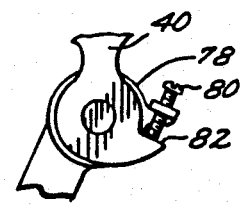
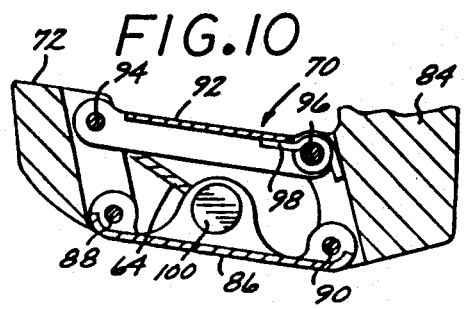

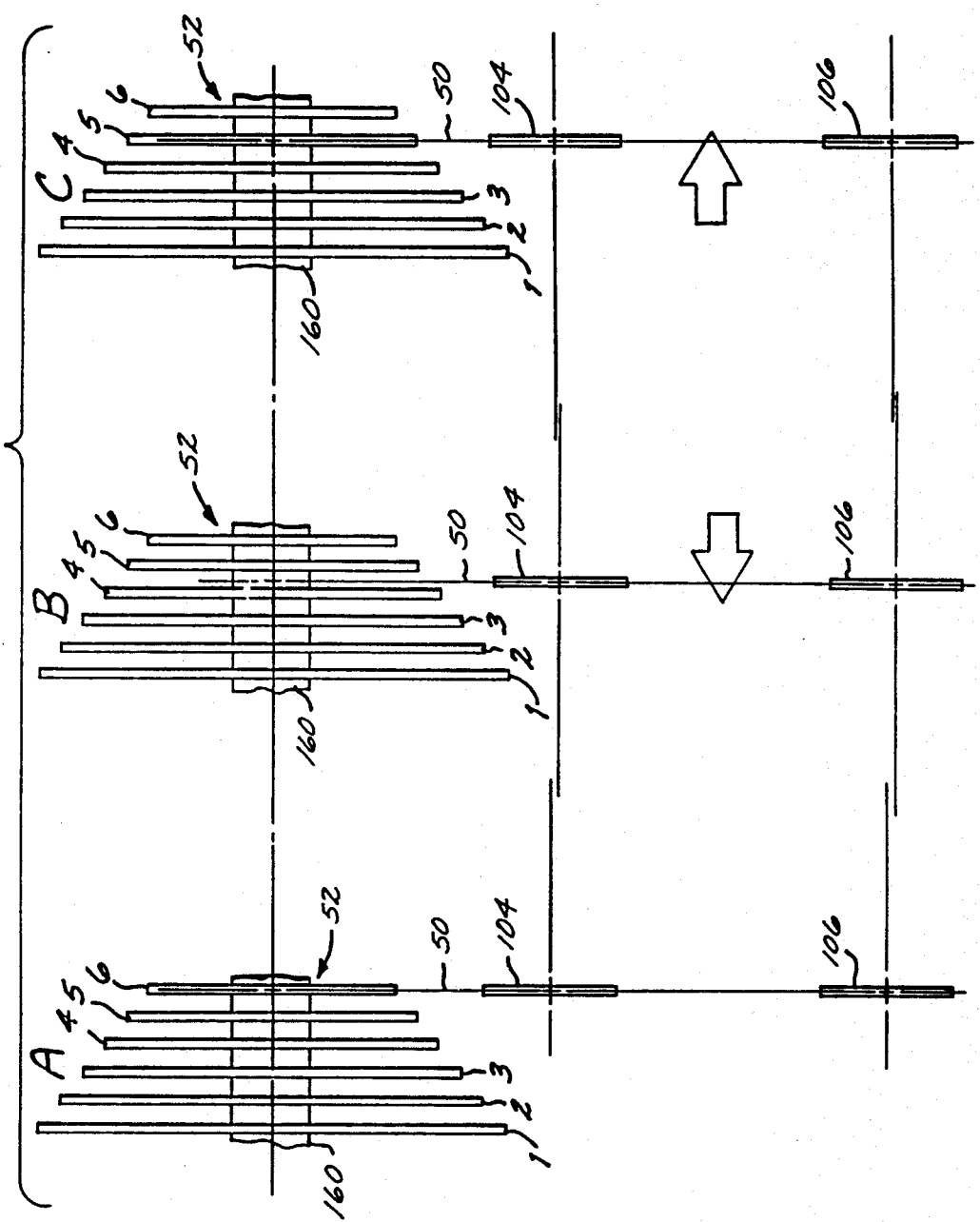

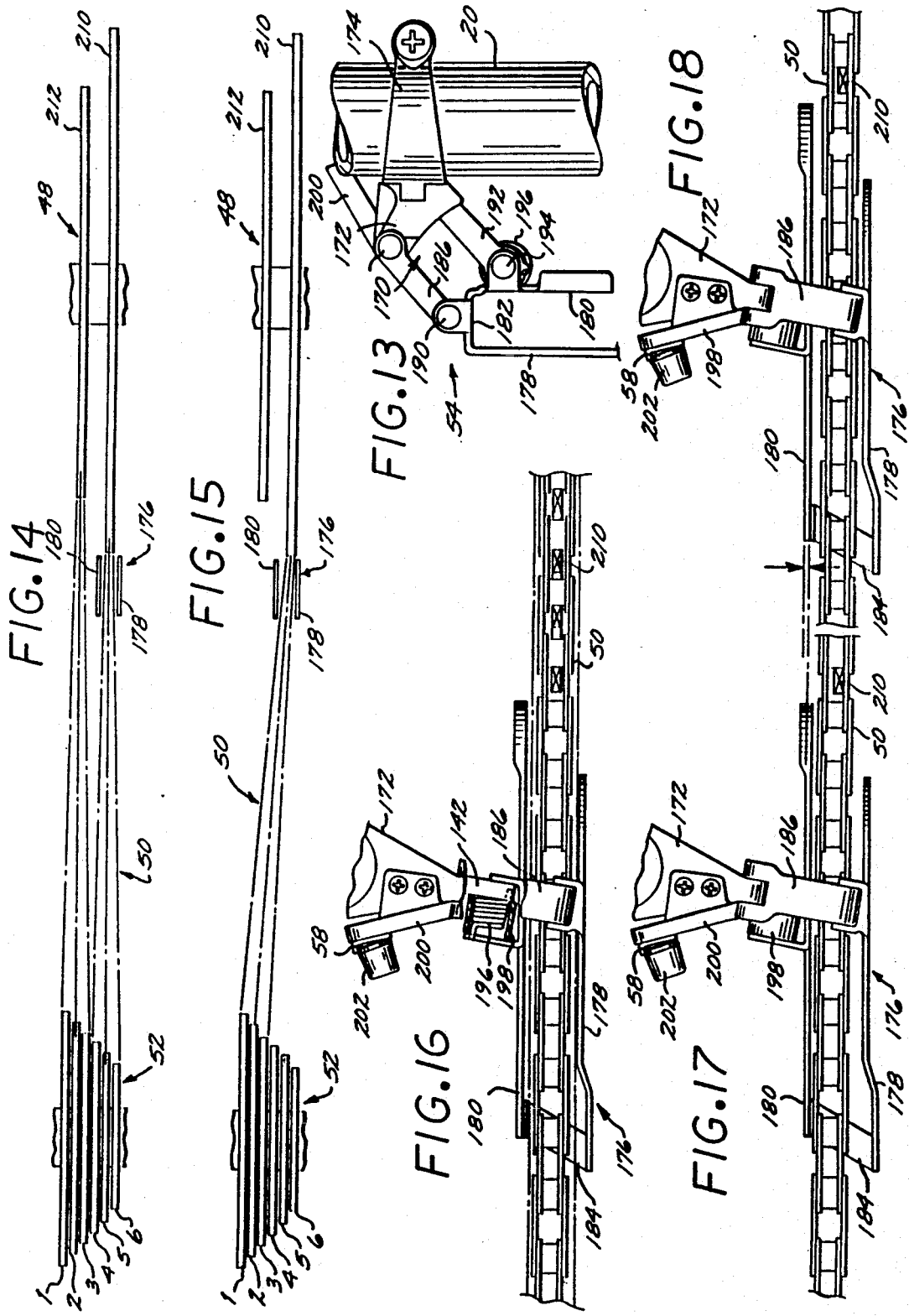

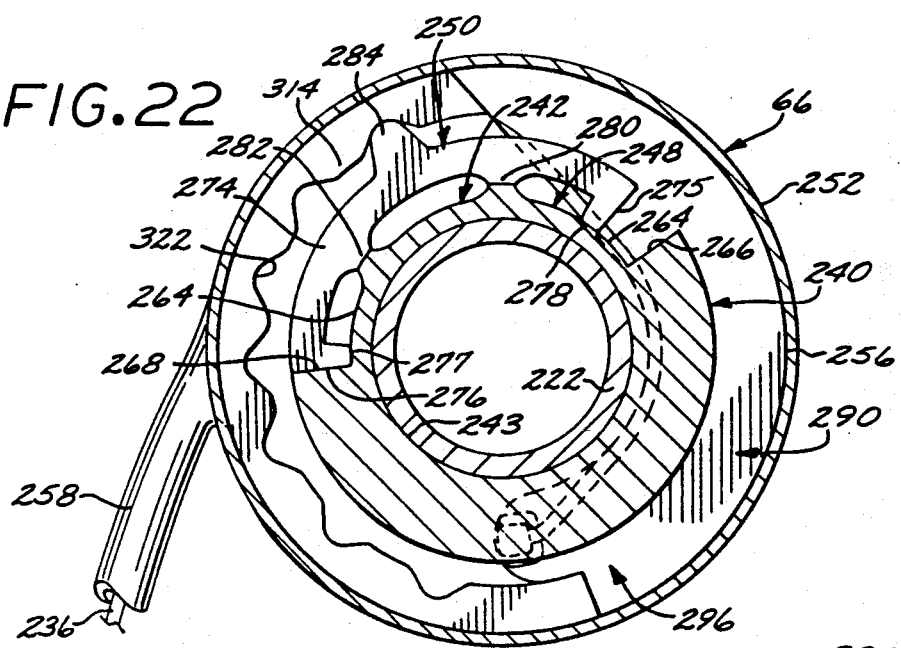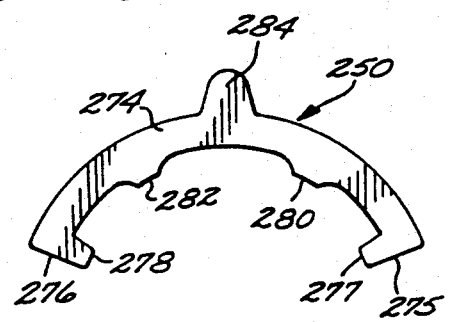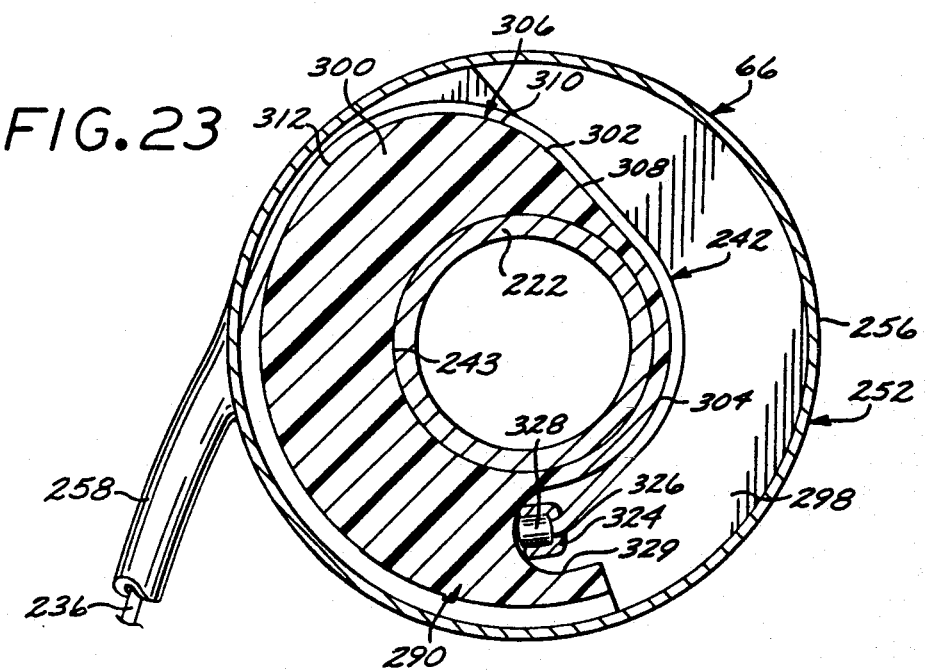

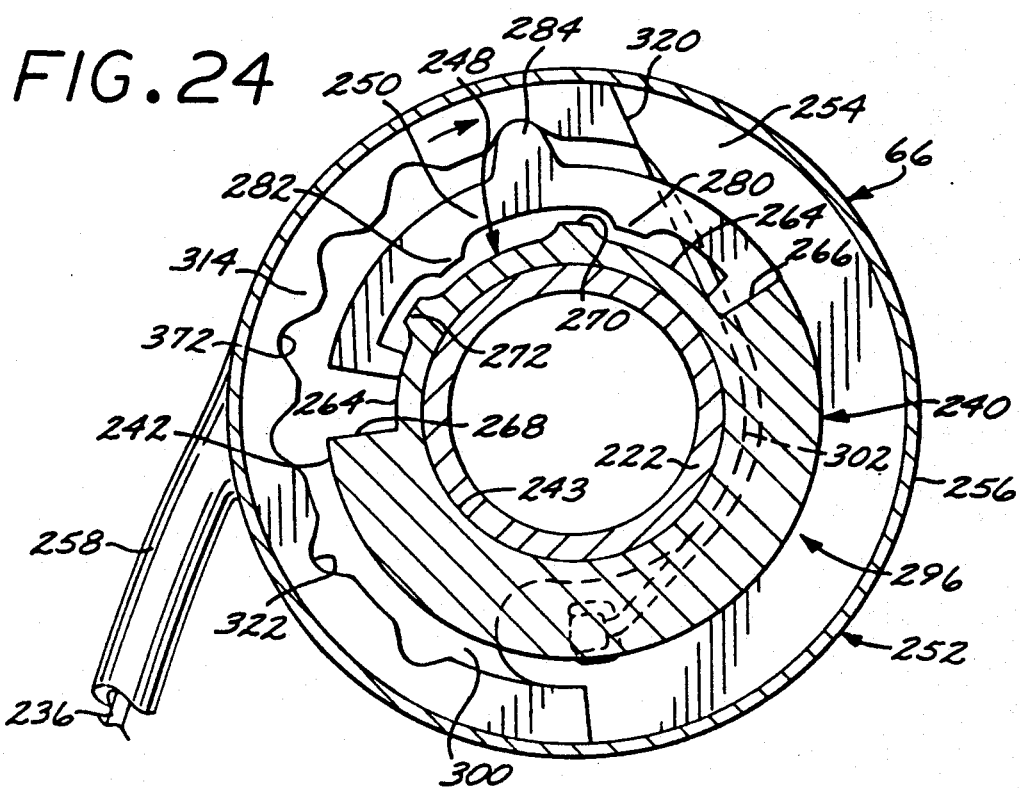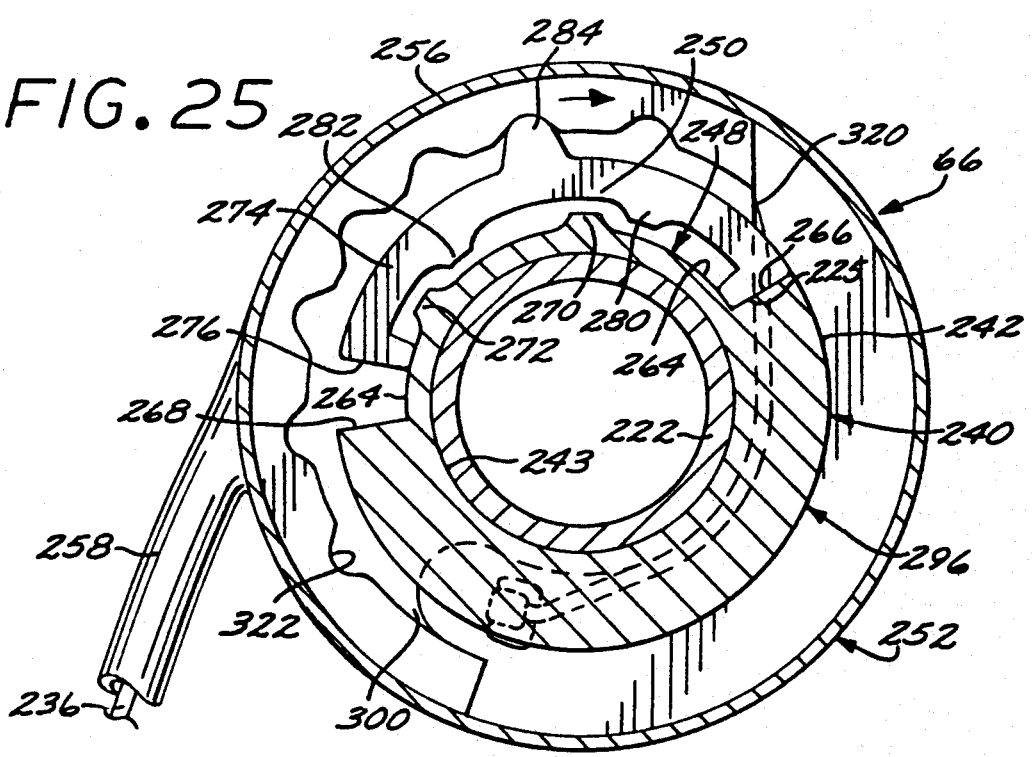

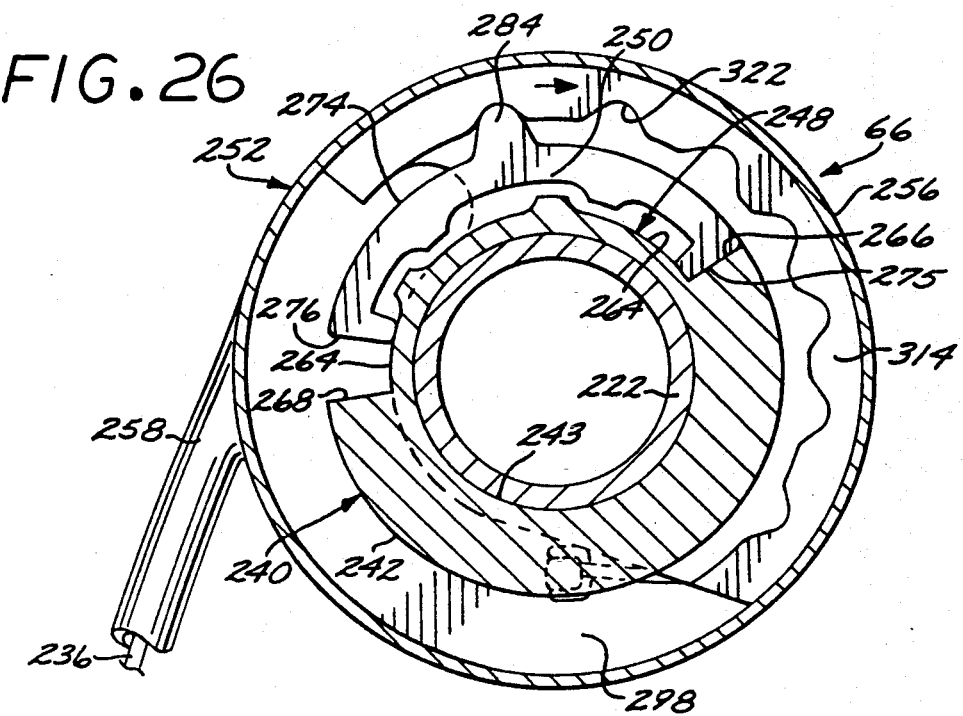
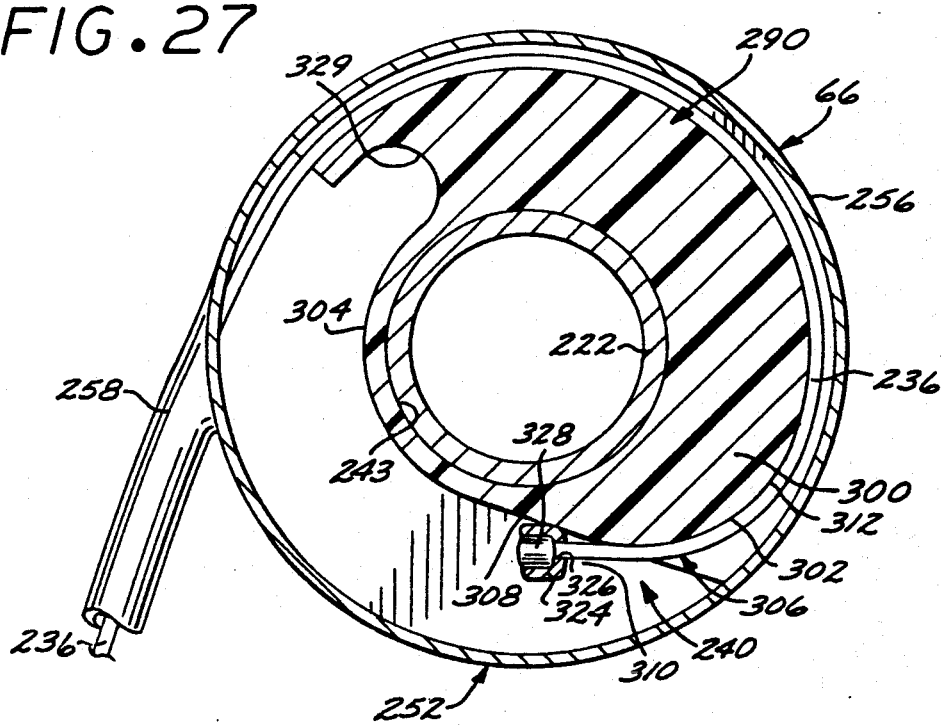

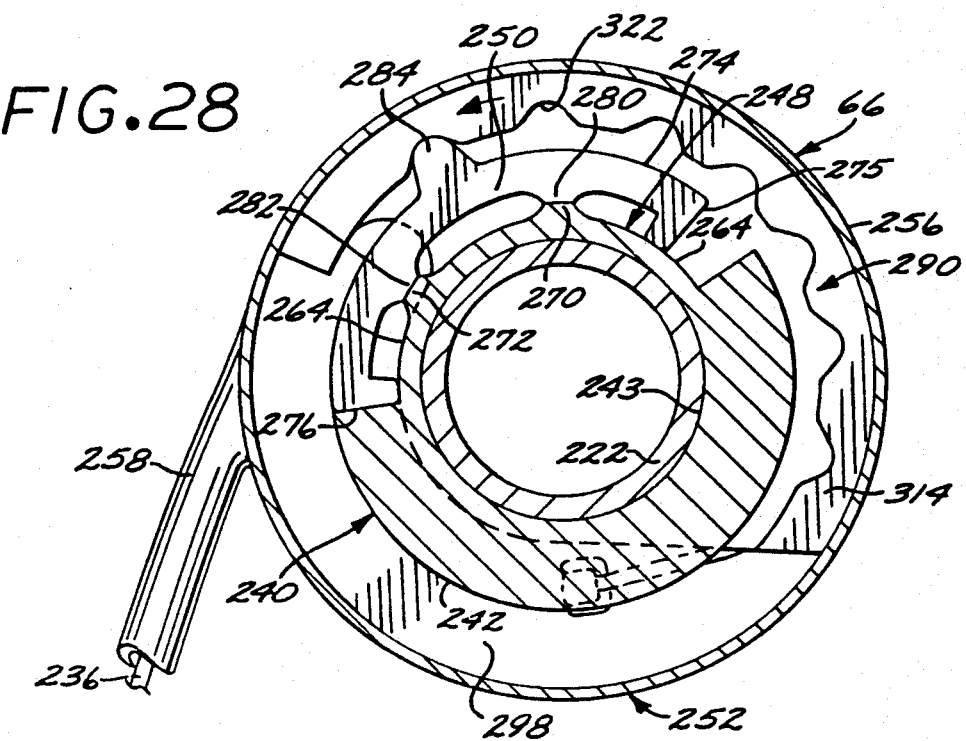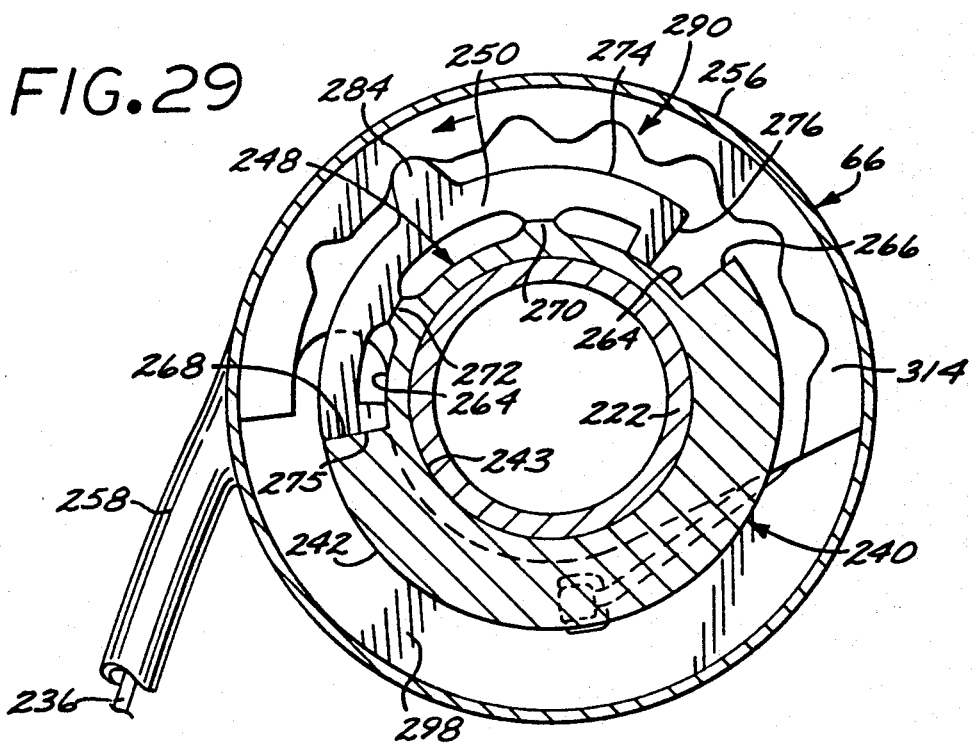

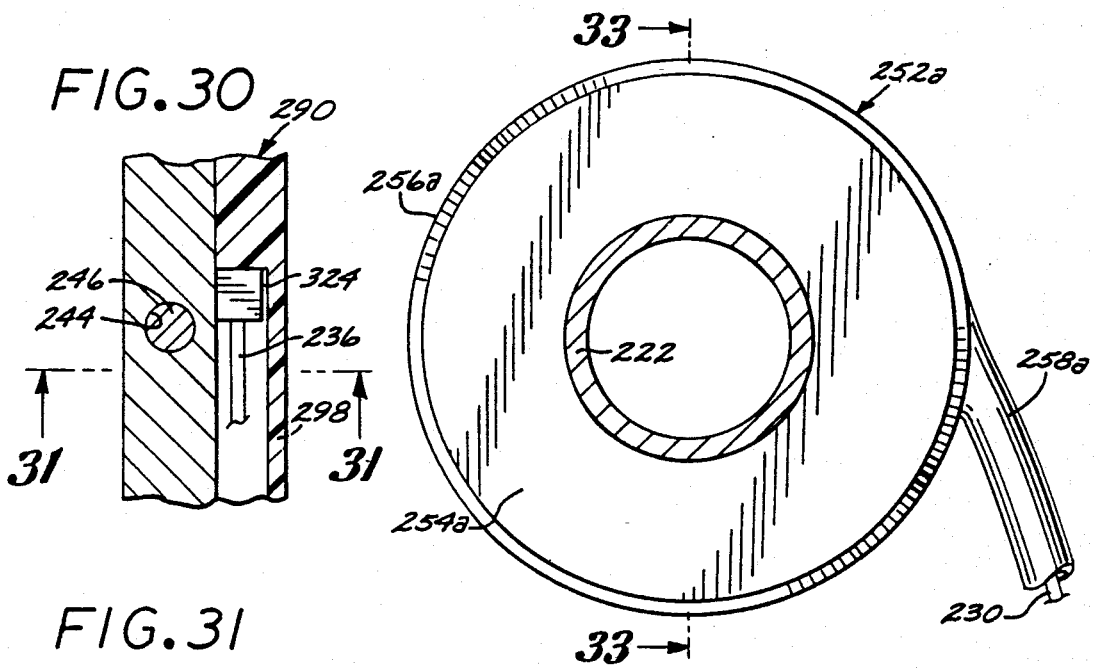
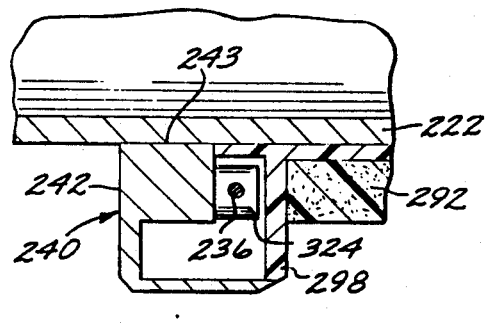
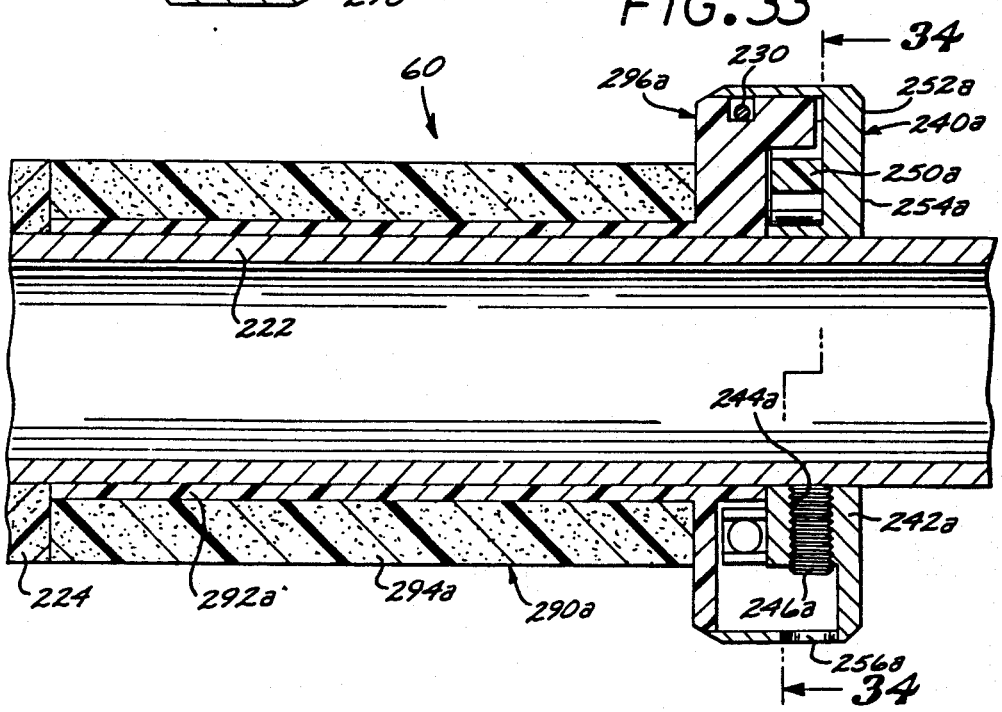

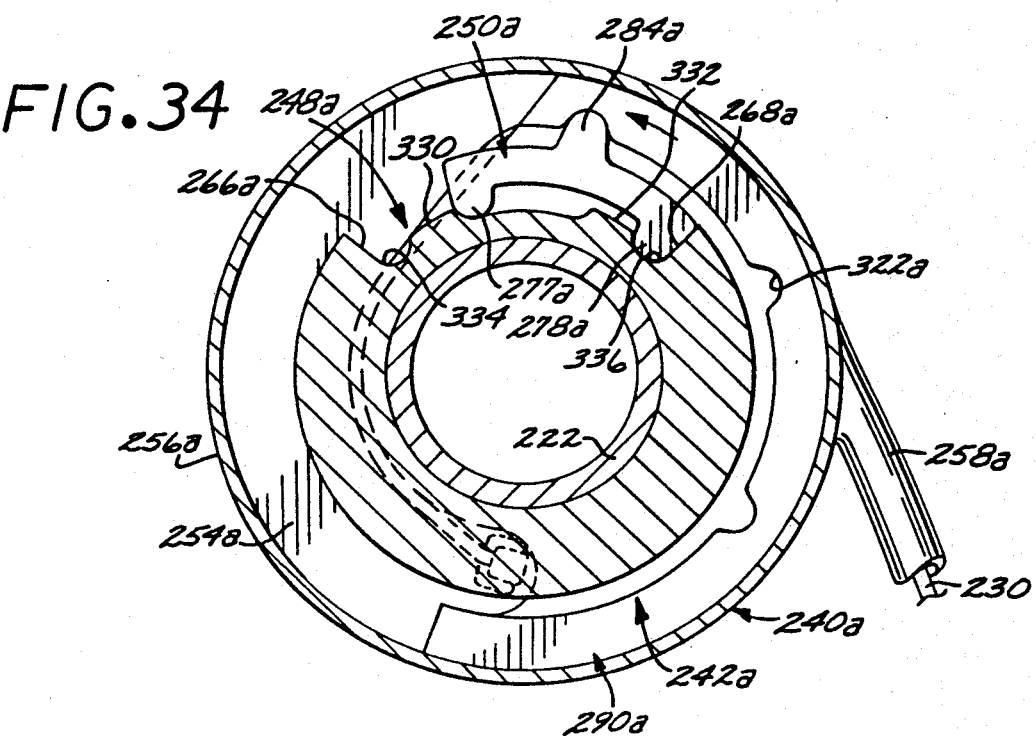
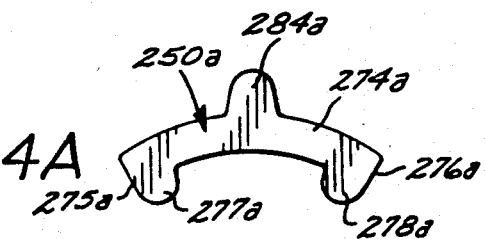
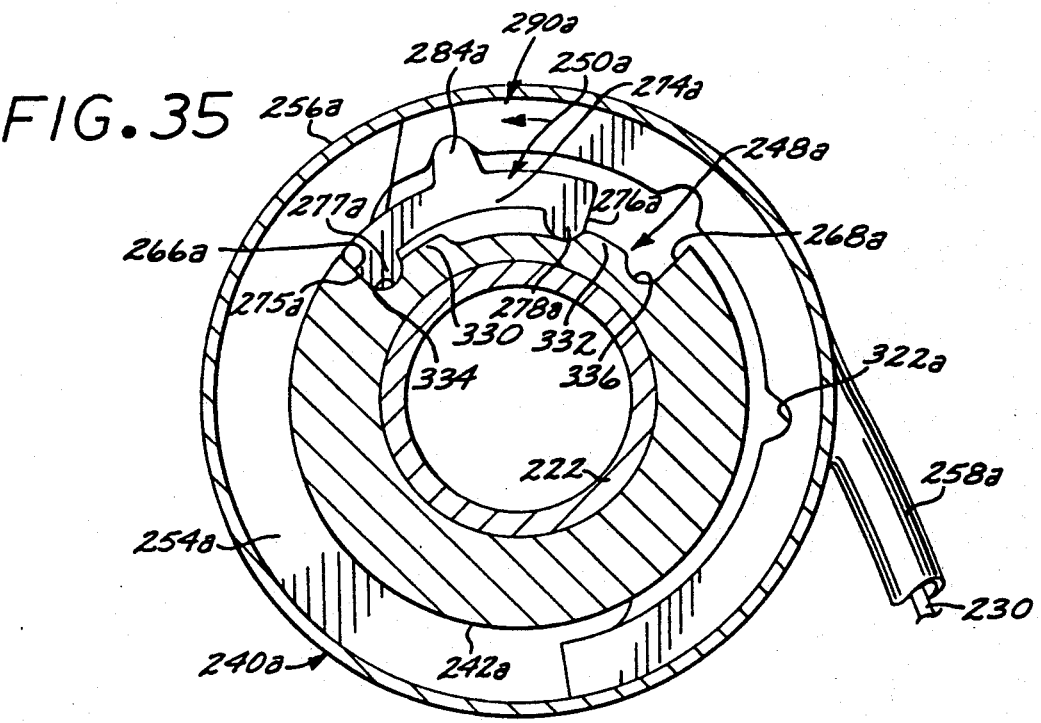

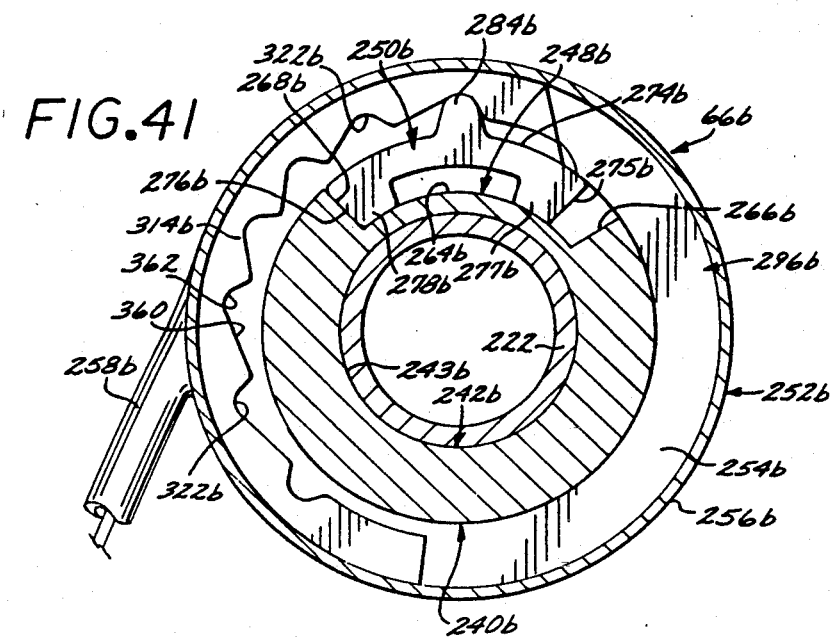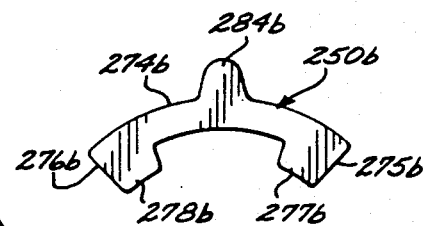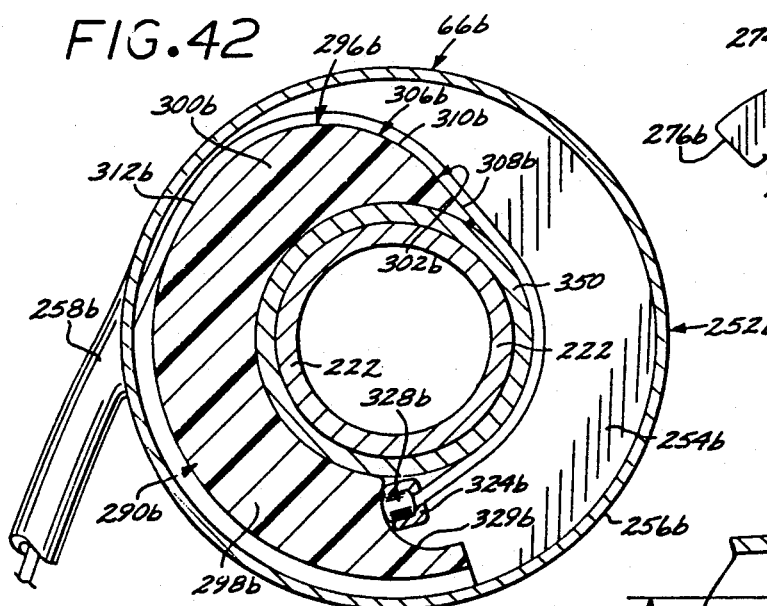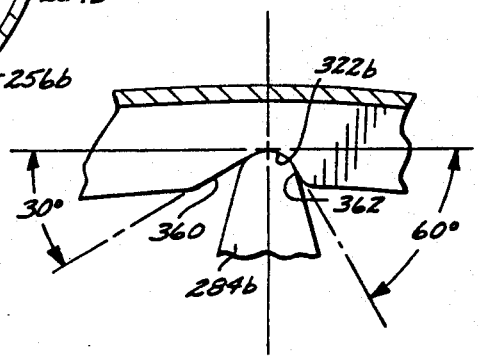

FIG.49
FIG.50
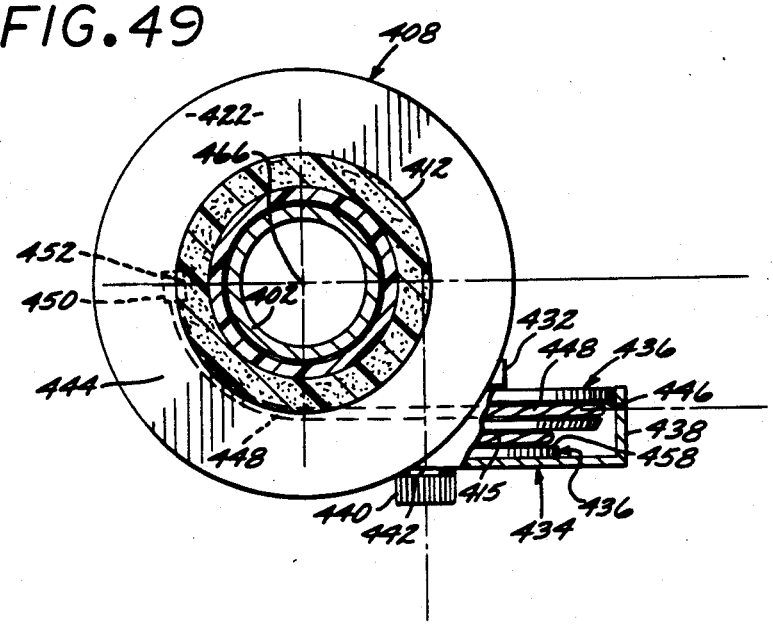
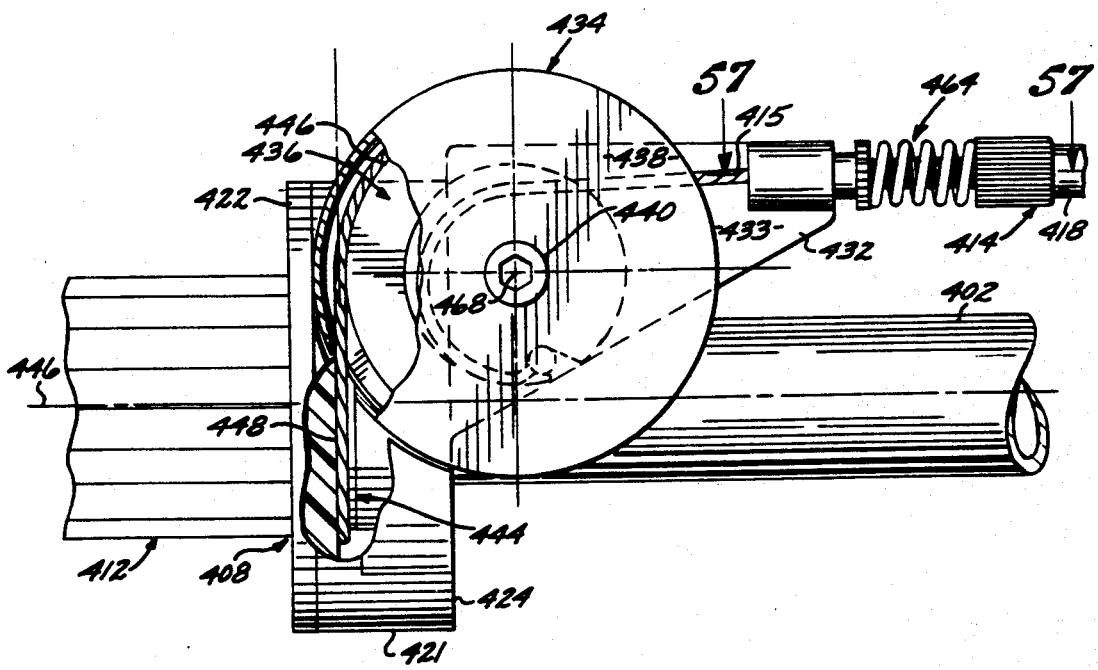

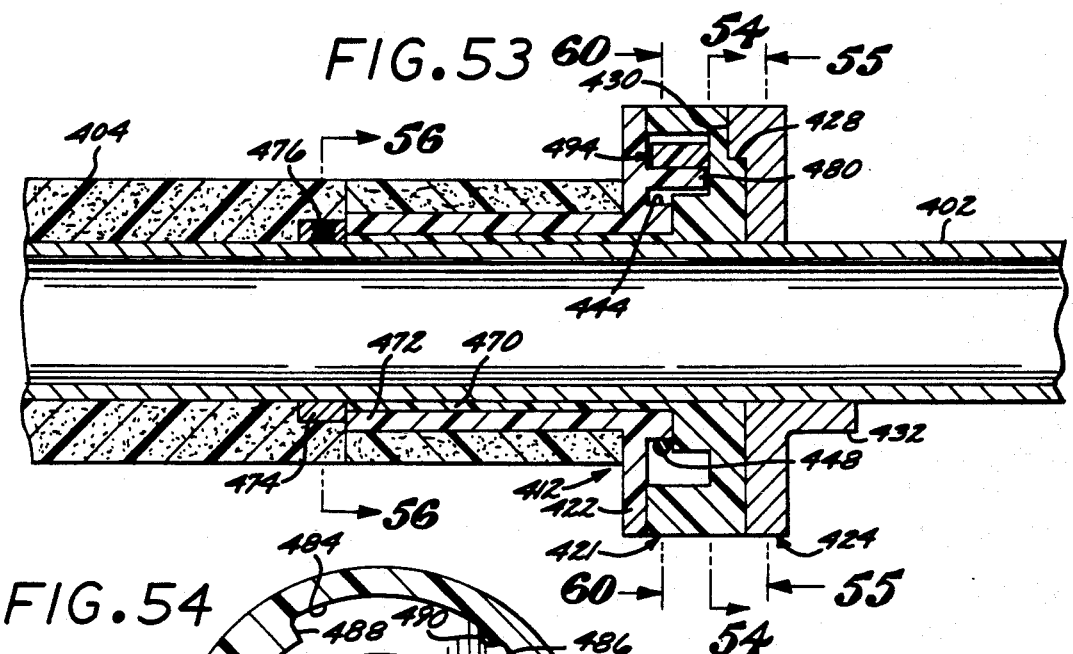
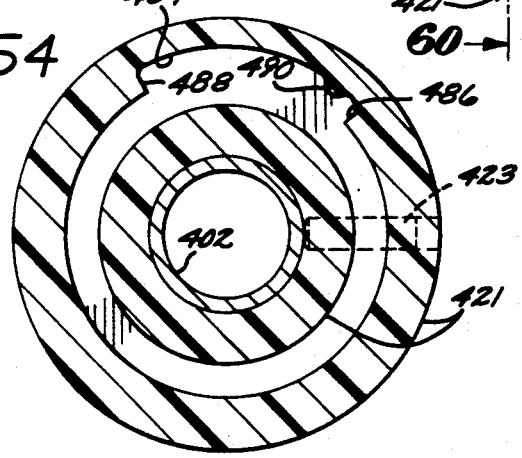
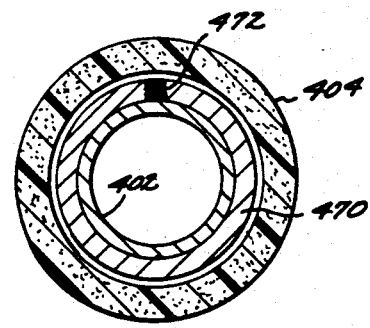
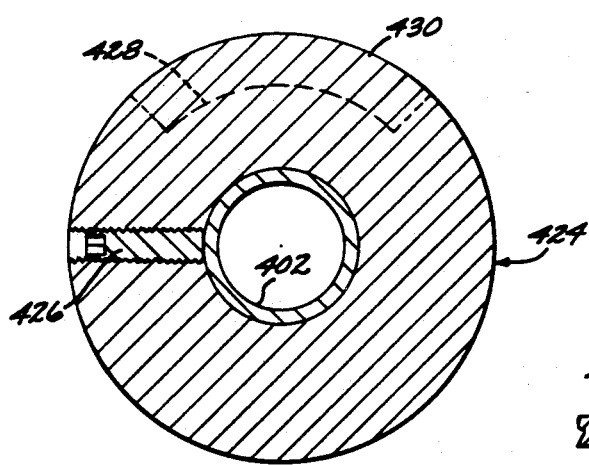
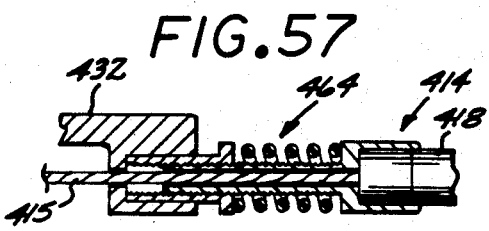

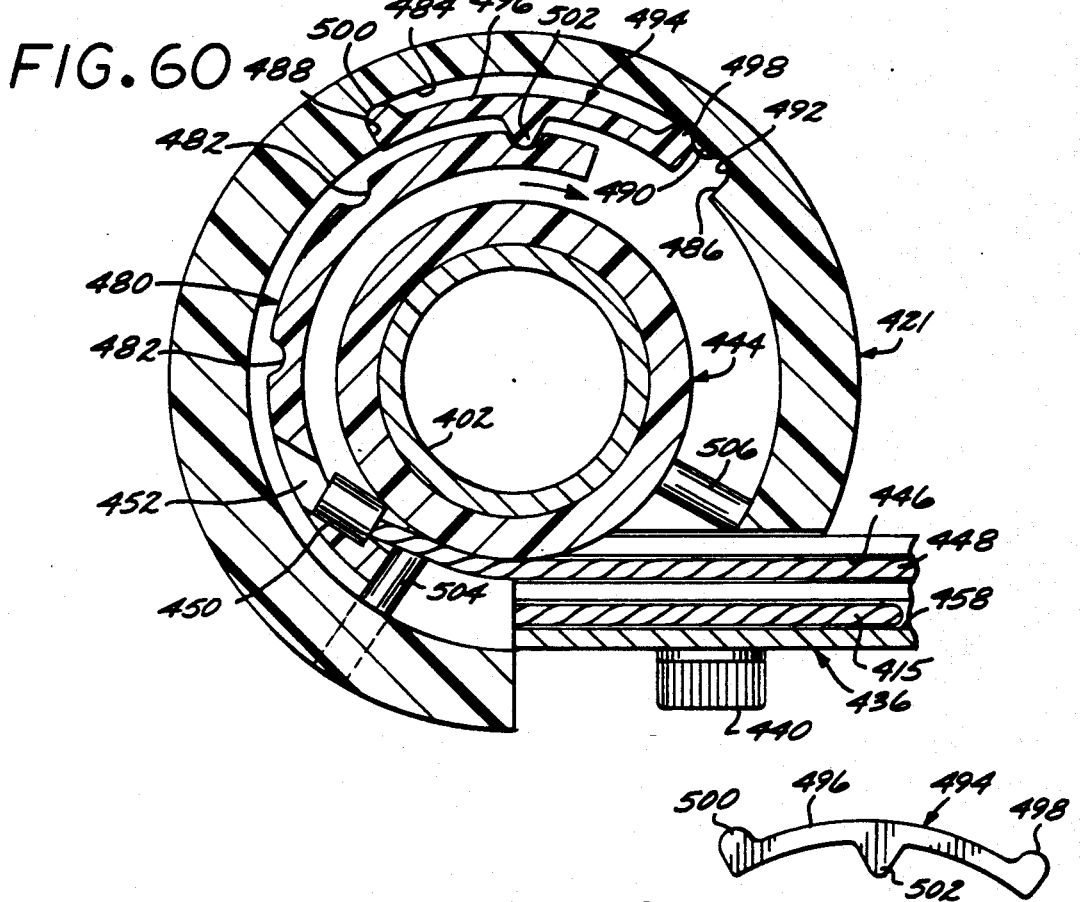
FIG. 60
FIG. 60A
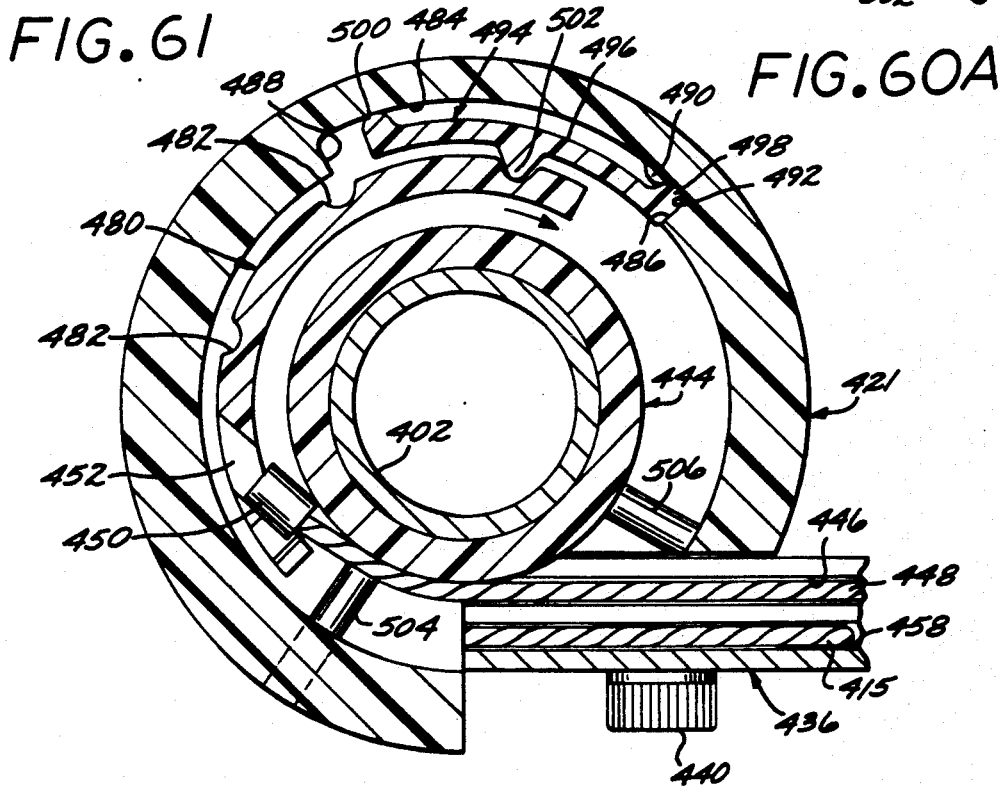
FIG. 61

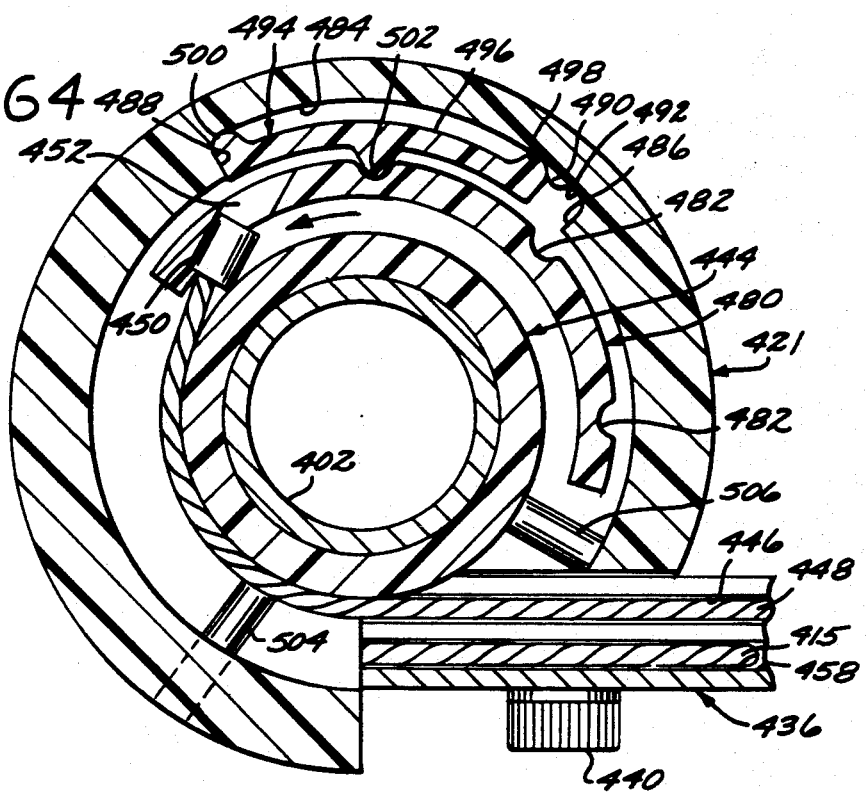
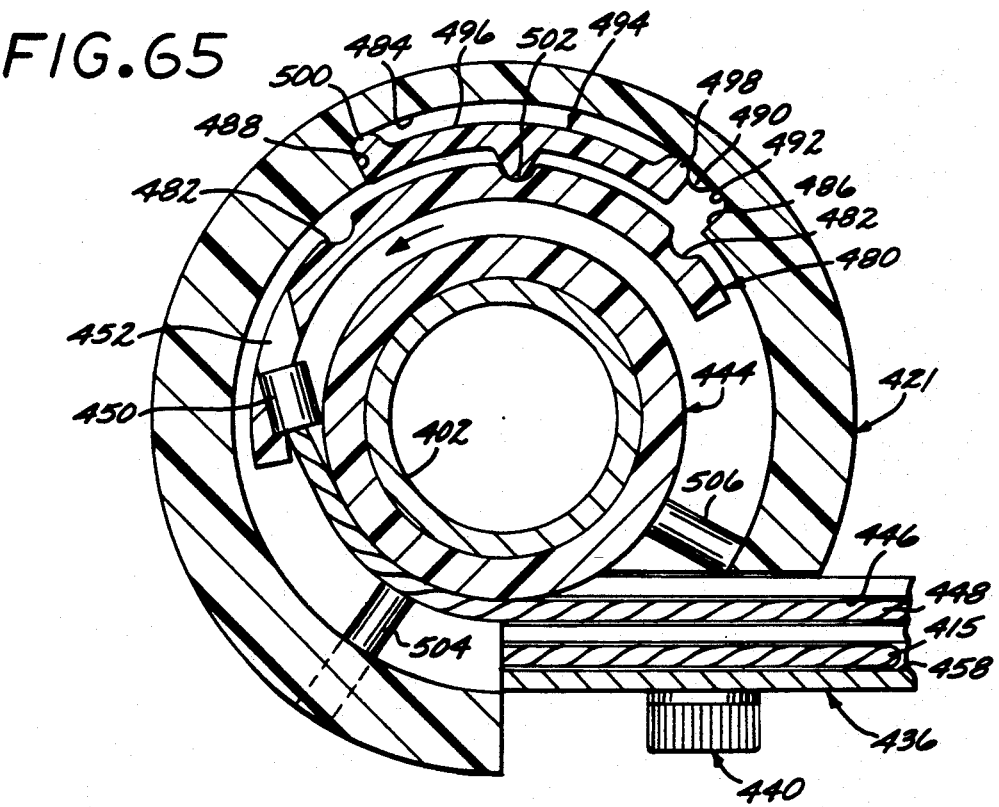

BICYCLE DERAILLEUR CABLE ACTUATING SYSTEM

RELATED APPLICATION

The present application is a continuation-in-part of application Ser. No. 07/672,431, filed Mar. 20, 1991 for Bicycle Derailleur Cable Actuating System now U.S. Pat. No. 5,102,372.

BACKGROUND OF THE INVENTION

1. Field of the Invention

The present invention relates in general to derailleur-type bicycle shifting systems, and more particularly to such a system wherein front and rear derailleur mechanisms are precisely controlled by respective rotatable handgrip shift actuators.

2. Description of the Prior Art

There has been a long-felt but previously unfulfilled need in the art for a bicycle derailleur shifting system which does not require that a hand, or least a thumb, be removed from the handlebar during shifting. Many derailleur shifting devices are actuated by levers mounted on the down tube of the frame, while some are mounted on the top tube and others on the handlebar. Such levers mounted on the down tube or the top tube all require that a hand be completely removed from the handlebar during shifting. Some derailleur shifting levers mounted on the handlebar can be actuated by taking a thumb off the handlebar and pushing the lever with the thumb, but this also diminishes control of the bicycle, and is awkward, so most riders simply take their hand off the handlebar to move the shift lever. For both safety and convenience, it is desirable to be able to shift derailleur mechanisms with both hands right on the handlebars. Despite a long-felt need for such a derailleur shifting system, applicant is not aware of any prior art derailleur shifting system where the shifting events can be accomplished with both hands on the handlebar.

Typical prior art derailleur shifting mechanisms which require removal of the hand, or at least the thumb, from the handlebar are disclosed in the following U.S. Pat. Nos.: Ross 4,055,093; Hedrich 4,194,408; Cirami 4,201,095; Bonnard 4,384,864; and Strong 4,548,092.

There has also been a long-felt but previously unfulfilled need in the art for a bicycle derailleur shifting system which is capable of "overshifting," yet which is relatively uncomplicated and inexpensive. Overshifting is movement of the chain beyond the destination sprocket, and then back into alignment with the destination sprocket. It has long been known in the art that such overshifting is desirable during down-shifting events for earlier and smoother shifts. Most derailleur shifting systems do not have any built-in mechanism for accomplishing such overshifting, and require that the rider deliberately move the shifting lever beyond the location of the destination sprocket and then back to the destination sprocket. This requires two rider inputs, one being a determination of the desired extent of overshift, and the other being the time duration of the overshift. Satisfactory overshifting by this means requires considerable skill.

Applicant Patterson is the patentee in two prior U.S. Pat. Nos. 4,900,291 and 4,938,733, and is a co-inventor in said related application Ser. No. 07/672,431, all three of which disclose bicycle derailleur shifting apparatus having a built-in, automatic overshift feature. The present invention accomplishes the same automatic overshifting function with a simple and economical construction.

Applicants are aware of two additional prior art patents which disclose bicycle derailleur shifting apparatus having a built-in overshift feature. These are Yamasaki U.S. Patent 4,267,744 and Bonnard U.S. Pat. No. 4,384,864. Both of these are very complicated mechanisms. Each of these devices has a built-in determination of the amount of overshift travel, yet neither of them determines the timing of the overshift. This is left up to the rider, who must first move a lever to the overshift position, and then move the lever back to the normal shift position.

Another problem with the Yamasaki and Bonnard overshift mechanisms is that they each provide the same amount of overshift travel for each one of the sprockets of a rear derailleur freewheel. The problem with this is that in many derailleur systems, the most advantageous extent of overshift travel varies for different freewheel sprockets. Another problem with the built-in overshift features in both Yamasaki and Bonnard is that an optimum amount of overshift for the other freewheel sprockets is generally too much for the #1, lowest gear sprocket closest to the wheel. An optimum amount of overshift travel for the other freewheel sprockets is likely to cause derailling from the #1 sprocket, which could seriously damage the bicycle. Thus, since the overshift amount is the same for all sprockets, it is inherent that neither of the Yamasaki or Bonnard overshift mechanisms produces sufficient overshift travel for optimum down-shifting through most of the freewheel sprockets.

Another long-noted problem in the art is the provision of an accurate front derailleur system capable of handling not only "parallel riding" but also "cross-over riding." For example, with a two-chain wheel front derailleur system, for parallel riding the larger chain wheel will service the smaller rear freewheel sprockets, and the smaller chain wheel will service the larger freewheel sprockets. With cross-over riding, the chain may be crossed over from the larger chain wheel to relatively large freewheel sprockets, or the chain may be crossed over from the smaller chain wheel to relatively small freewheel sprockets. Such crossed-over chain locations have a propensity for causing undesirable "chain rasp," and the usual prior art solution to this problem was simply to provide a front derailleur chain cage having a relatively wide gap between the cage plates. While this may reduce chain rasp, it causes the further problems of inaccuracy in shifting, and frequent chain derailling. This problem was solved in the apparatus disclosed in applicant Patterson's aforesaid U.S. Pat. Nos. 4,900,291 and 4,938,733, and in said related application Ser. No. 07/672,431. It is also solved in a simple and economical way in the apparatus of the present invention.

A further problem in the art, which relates primarily to rear bicycle derailleur shifting systems, is that there are numerous points of lost motion in both the derailleur mechanism and its actuating cable which cumulatively add up to a considerable amount of overall lost motion, as for example from about 0.040 to about 0.070 inch. Applicants have found that for accurate index shifting, substantially all of this cumulative lost motion must first be taken up at the shift actuator before the overshift and actual shift increments of travel between adjacent sprockets are applied during a down-shifting event. The apparatus of applicant Patterson's aforesaid U.S. Pat. Nos. 4,900,291 and 4,938,733, and said related application Ser. No. 07/672,431 provide compensation for such cumulative lost motion, and apparatus of the present invention also provides compensation for such cumulative lost motion in a simple and economical way.

It has long been recognized in the art that rotary handgrip devices can be useful for controlling vehicle mechanisms, particularly on motorcycles, but also on bicycles. Several of such devices are disclosed in French Patent 829,283 to Braumandl. Other recently marketed devices are "simple spools" on the outside of the handlebar which have the disadvantages of (1) an undesirably large cable pull rate, (2) a correspondingly undesirably large torque required to be applied to the rotary shifter, and (3) requiring thumb actuation of a lever. The first such devices of which applicants are aware having been employed in cooperation with bicycle derailleur shifting apparatus are the rotating gear shifting devices disclosed in applicant Patterson's aforesaid U.S. Pat. Nos. 4,900,291 and 4,928,733, and in said related application Ser. No. 07/672,431. The present invention also provides such apparatus in a simple and economical form.

SUMMARY OF THE INVENTION

In view of these and other problems in the art, it is a general object of the present invention to solve the problems associated with prior art bicycle derailleur shifting systems.

Another object of the invention is to provide a bicycle derailleur shifting system which embodies a shift actuator that is conveniently rotatably mounted about the handlebar and so located as to not require the rider to remove a hand, or even a thumb, from the handlebar to effect a shifting event, thereby providing improved shifting convenience and safety.

Another object of the invention is to provide a bicycle derailleur shifting system embodying a handgrip shift actuator which is particularly simple in construction and economical to manufacture, yet which, in combination with the derailleur mechanism, has improved performance over most prior art derailleur shifting systems in all respects.

Another object of the invention is to provide bicycle derailleur shifting apparatus having a handgrip shift actuator embodying "shovel cam" and "jack spool" devices for pulling and releasing cable in response to rotational movements of the handgrip rotator.

Another object of the invention is to provide a novel shovel cam mechanism wherein an otherwise fixed cable end portion is looped over a cam lobe that slideably pulls cable when rotated in one direction and slideably releases cable when rotated in the opposite direction.

Another object of the invention is to provide a novel jack spool handgrip shift actuator of the character described in which the jack spool is cable-driven by the handgrip rotator.

Another object of the invention is to provide a novel jack spool handgrip shift actuator of the character described in which the jack spool is gear-driven by the handgrip rotator.

Another object of the invention is to provide a bicycle derailleur handgrip shift actuator of the character described in which gear detenting is provided between the handgrip rotator and a fixed body of the shift actuator.

A further object of the invention is to provide a bicycle derailleur jack spool handgrip shift actuator of the character described in which gear detenting is provided between the jack spool and a fixed structure.

A further object of the invention is to provide a jack spool-type bicycle derailleur rotary handgrip shift actuator of the character described, wherein utilization of the jack spool enables the derailleur control cable to exit the shift actuator in any desired direction, preferably generally parallel to the handlebar to minimize cable sliding friction.

Another object of the invention is to provide a bicycle derailleur shifting system which completely accounts and compensates for numerous lost motions in the derailleur mechanism and its actuating cable, thereby enabling precise index shifting to be accomplished.

Another object of the invention is to provide a bicycle derailleur handgrip shift actuator of the character described in which said lost motions are compensated for, at least in part, by means of a floating spring device which in some forms of the invention is engaged between the fixed body and rotator of the shift actuator, and in a gear-driven jack spool form of the invention is engaged between the jack spool and a fixed mounting member for the jack spool.

A further object of the invention is to provide a bicycle derailleur shifting system wherein cable lost motion factors such as cable housing compressability and warp are minimized and made very predictable to assist in accurately determining and compensating for all cumulative lost motion factors.

Another object of the invention is to provide a bicycle derailleur shifting system in which a rotary handgrip shift actuator cooperates with the derailleur mechanism so as to enable down-shifting to be easily accomplished with substantially uniform twisting effort by the rider for down-shifting through all of the gears, despite progressively increasing derailleur return spring loading for increasingly lower gear ratios.

Another object of the invention is to provide a rear bicycle derailleur shifting system in which the derailleur return spring force is compensated for so that down-shifting and up-shifting events require generally the same amount of force.

A further object of the invention is to provide a bicycle derailleur shifting system in which a rotary handgrip shift actuator cooperates with the derailleur mechanism in providing an optimum amount of overshift for down-shifting to each of the gears, despite variations that may be present in spacing between different sprockets, and despite a desirability to restrict the amount of overshift when down-shifting to the #1, lowest gear sprocket so as to avoid derailling.

A further object of the invention is to provide a bicycle derailleur shifting system wherein a rotary handgrip shift actuator has built-in overshift capability, yet is very simple in construction.

A further object of the invention is to provide a bicycle derailleur shifting system which has built-in overshift capability, yet does not require manual input to define all or part of the overshift actuation.

A further object of the invention is to provide a bicycle derailleur shifting system wherein a rotary handgrip shift actuator effects overshift increments an optimum amount relative to each derailleur sprocket for the most positive and accurate index shift events possible.

A further object of the invention is to provide a bicycle derailleur shifting system wherein a derailleur mechanism is actuated by a rotary handgrip shift actuator capable of fine-tuning the shift positions to avoid chain rasp, particularly during cross-over riding.

A further object of the invention is to provide a bicycle derailleur shifting system having built-in overshift, wherein the overshift timing is automatically established by the natural shifting movement, and does not require separate rider input.

A still further object of the invention is to provide a handgrip shift actuator of the character described embodying a novel "nautilus"-shaped cam device for pulling a derailleur control cable which compensates for increasing derailleur return spring force in down-shifting and decreasing return spring force in up-shifting, provides flexibility in adaptation to a variety of different derailleur mechanisms, and enables any desired amount of rotational movement of the handgrip rotator for any corresponding desired amount of lineal control cable pull.

Yet a further object of the invention is to provide a bicycle derailleur shifting system having a handgrip shift actuator rotatably mounted on a handlebar inboard of the handlebar end.

According to the invention, a bicycle equipped with front and rear derailleurs has front and rear handgrip shift actuators rotatably mounted over the handlebar, the front handgrip shift actuator being operatively associated with the front derailleur mechanism for shifting the front derailleur, and the rear shift actuator being operatively associated with the rear derailleur mechanism for shifting the rear derailleur. The rear handgrip shift actuator is preferably mounted on the right side of the handlebar and the front front handgrip shift actuator mounted on the left side of the handlebar to accommodate most riders, since the rear derailleur is shifted more frequently than the front derailleur.

In shovel cam forms of the invention, each handgrip shift actuator contains what applicants refer to as a "shovel cam" which has a rounded cam lobe that, in effect, picks up and expands the cable end portion within the actuator during down-shifting, and reverses the motion to release cable during up-shifting.

Each jack spool form of handgrip shift actuator of the invention contains a handgrip shifter rotator that is manually rotatable for shifting on an axis of rotation generally aligned with the handlebar, and what applicants refer to as a "jack spool" which is rotatable about an axis that is preferably generally normal to the handlebar. The shifter rotator is mechanically coupled to the jack spool such that rotation of the handgrip rotator in a down-shifting direction causes corresponding rotation of the jack spool in a down-shifting direction, and opposite rotation of the handgrip rotator in an up-shifting direction results in corresponding opposite up-shifting rotation of the jack spool. The derailleur control cable is connected to the jack spool so that down-shifting rotation of the jack spool pulls the control cable against the force of the derailleur return spring, and up-shifting rotation of the jack spool releases the control cable to go with the force of the derailleur return spring.

In some jack spool forms of the invention, the mechanical connection between the shifter rotator and the jack spool is a short cable connection. This cable connection is pulled during down-shifting rotation of the shifter rotator to cause down-shifting rotation of the jack spool and corresponding down-shifting pulling of the derailleur control cable. Up-shifting rotation of the handgrip rotator releases the cable connection, enabling the force of the derailleur return spring applied through the derailleur control cable to cause up-shifting rotation of the jack spool.

In other jack spool forms of the invention, the mechanical connection between the handgrip rotator and the jack spool is a gear drive connection, preferably but not necessarily a bevel gear connection. In the gear-driven jack spool forms, down-shifting rotation of the handgrip rotator directly motivates the jack spool in its down-shifting direction of rotation to take up on the derailleur control cable, while up-shifting rotation of the handgrip rotator directly motivates the jack spool in its up-shifting direction of rotation to release the derailleur control cable.

In both the shovel cam and jack spool forms of the invention, detenting for the various gear ratios (i.e., for placing the chain on the various rear freewheel sprockets or the various front chain wheels) may be effected between the shifter rotator and a body or structure fixed to the handlebar. In gear-driven jack spool forms of the invention, because the drive between the shifter rotator and the jack spool is a positive one in both the down-shifting and the up-shifting directions, the detenting is enabled to be directly between the jack spool and a body or structure fixed to the handlebar, for the most direct possible detenting between the shift actuator and the derailleur mechanism.

In all forms of the invention, the shifter actuator end portion of the derailleur control cable is preferably engaged around a "nautilus"-shaped cam. During down-shifting rotation of the cam, the control cable is pulled over progressively decreasing radii of the nautilus cam for progressively increasing pulling torque to compensate for progressively increasing derailleur return spring force. Conversely, during up-shifting rotation of the cam, the derailleur control cable is released off of progressively increasing radii of the nautilus cam according to progressively decreasing derailleur return spring force.

In forms of the invention which have gear detenting between the shifter rotator and a fixed body or structure, the shifter rotator has a series of detent notches preferably corresponding to the number of rear freewheel sprockets or front chain ring sprockets. These detent notches of the rotator ride on a spring member which slides between controlled limits in a groove located in the fixed structure secured to the handlebar. Slideable shifting movement of the spring member between its limits enables the shifter rotator to take up lost motions or "slop" in the derailleur system and its cable system during down-shifting before an actual shifting event occurs; and then allows for release of these lost motions during up-shifting. The sliding action of the spring member additionally provides an overshift increment of movement of the derailleur control cable during down-shifting.

In gear-driven jack spool forms of the invention, the jack spool may carry the series of detent notches corresponding to the number of rear freewheel sprockets or front chain ring sprockets, and detenting means such as spring biased detent ball means is carried in fixed structure that is secured to the handlebar. In this case, slideable shifting movement of a separate spring member between stop limits enables the rotator and jack spool to take up the aforesaid lost motions and provide an over-shift increment of movement of the control cable during down-shifting.

In all forms of the invention, the slideably shiftable spring may have its spring rate shifted from a relatively lower spring rate for down-shifting and a relatively higher spring rate for up-shifting, so as to substantially compensate for the higher force of the derailleur return spring during down-shifting. Alternatively, in all forms of the invention, the derailleur spring force may be compensated for by providing a gentler angle of inclination on the down-shifting slopes of the detent notches than on the up-shifting slopes.

The slideably shifting spring member referred to above which enables lost motion takeup and overshift cable movement during down-shifting preferably has an additional function of enabling the shifter rotator to rotationally move a relatively small nonshifting amount back and forth in any of the primary detented positions such that the rider is enabled to shift the chain back and forth in each chain ring or freewheel sprocket position so as to eliminate chain rasp, regardless of what position the chain may be on the rear derailleur freewheel, which is particulary important for cross-over riding.

The handgrip shift actuators of the present invention, are, according to current bicycle rider desires, now preferably mounted on the handlebar inboard of fixed handlebar grips. However, the shift actuators of the present invention are equally adaptable for mounting on the ends of the handlebars, or anywhere it is desired to mount them on the handlebars.

An important aspect of the present invention is the coaction between the handgrip shift actuator and any one of a number of different derailleur systems. Each of the various derailleur systems has its own special operating characteristics which can be accounted for in the jack spool nautilus-shaped cam of the present invention, these characteristics including a variety of lost motions in both the derailleur mechanism and its cable system, varying spacings between the freewheel or chain ring sprockets, derailleur return spring force and the rate of variation of that force as the derailleur mechanism shifts the chain either downwardly toward larger freewheel or chain ring sprockets or upwardly toward smaller freewheel or chain ring sprockets or upwardly towards smaller freewheel or chain ring sprockets, and the like. Applicants preferably provide a special nautilus cam with a contour specially configured to account and/or compensate for all of these special characteristics of any particular derailleur system, to the end that each shift from one freewheel sprocket or chain ring sprocket to another is an early, positive, and accurately aligned index shift. Thus, applicants' shift actuator cams cooperate with the derailleur systems in compensating for the sum of all of the lost motions in the derailleur systems and their cable systems, and in providing an optimum amount of overshift for down-shifting to each of the gears.

Built-in overshift is programmed on applicants' handgrip shift actuator cams so as to provide optimum overshift for each down-shift event. Such overshift does not require separate manual input for the timing of the overshift; the natural rotational movement of the handlebar shift actuator automatically times the overshift.

BRIEF DESCRIPTION OF THE DRAWINGS

These and other objects and advantages of the invention will become more apparent in reference to the following description and the accompanying drawings, wherein:

FIG. 3 is a further enlarged, fragmentary view taken on the line 3—3 in FIG. 1;

FIG. 4 is a fragmentary view taken on the line 4—4 in FIG. 3;

FIG. 5 is a fragmentary view, partly in section and partly in elevation, taken on the line 5—5 in FIG. 2;

FIG. 6 is an elevational view with portions broken away take on the line 6—6 in FIG. 2;

FIG. 7 is a cross-sectional view taken on the line 7—7 in FIG. 6;

FIG. 8 is a fragmentary elevational view, with portions broken away, taken on the line 8—8 in FIG. 2;

FIG. 9 is an enlarged fragentary elevational view illustrating an adjustment feature of the rear derailleur mechanism of FIG. 2;

FIG. 10 is a fragmentary sectional view taken on the line 10—10 in FIG. 2;

FIG. 12 is a diagrammatic view illustrating overshift;

FIG. 13 is a fragmentary elevational view of a front derailleur mechanism;

FIG. 14 is a diagrammatic view illustrating parallel riding;

FIG. 15 is a diagrammatic view illustrating cross-over riding;

FIG. 16 is a fragmentary plan view illustrating parallel riding;

FIG. 17 is a view similar to FIG. 16 illustrating cross-over riding;

FIG. 18 is a view similar to FIGS. 16 and 17 illustrating correction of the cross-over of FIG. 17 by shifting of the detent spring from one of its inner detented positions to the other;

FIG. 22 is a cross-sectional view taken on the line 22—22 in FIG. 21, illustrating a detent system embodied in the first shovel cam form of rear derailleur actuator according to the invention;

FIG. 22A is an elevational view of the detent spring embodied in the form of the invention shown in FIG. 22;

FIG. 23 is a cross-sectional view taken on the line 23—23 in FIG. 21, illustrating the shovel cam configuration wherein the cam lobe expands cable during down-shifting cable pulling, and releases cable during up-shifting, cable releasing;

FIG. 24 is a view similar to FIG. 22, illustrating a first increment of down-shifting movement of the rear derailleur handgrip shift actuator in which the detent spring is shifted from a relatively high spring constant to a relatively low spring constant so as to compensate for rear derailleur return spring force during down-shifting events;

FIG. 25 is a view similar to FIGS. 22 and 24 wherein the rear derailleur handgrip shift actuator of the invention is proceeding through a series of down-shifting events;

FIG. 26 is a view similar to FIGS. 22, 24 and 25, illustrating the relationship of the parts of the rear derailleur handgrip shift actuator at the completion of a series of down-shifting events;

FIG. 27 is a view similar to FIG. 23 illustrating the shovel cam and rear derailleur actuating cable relationship with the cable pulled to its fullest extent at the completion of a series of down-shifting events, the shovel cam corresponding in position to the positioning of the in FIG. 26;

FIG. 28 is a view similar to FIGS. 22 and 24-26 illustrating the initiation of a series of up-shifting events in which the detent spring has been moved to a higher spring rate position to compensate for alleviation of rear derailleur return spring force;

FIG. 29 is a view similar to FIG. 28 illustrating a progression of up-shifting events;

FIG. 30 is an enlarged, fragmentary view taken on the line 30—30 in FIG. 21 illustrating the cable end connection within the rear derailleur handgrip shift actuator;

FIG. 31 is an enlarged, fragmentary view taken on the line 31—31 in FIG. 30;

FIG. 32 is a cross-sectional view taken on the line 32—32 in FIG. 19, which is similar to FIG. 20 but illustrates the front handgrip shift actuator on the left-hand side of the handlebar;

FIG. 33 is an axial sectional view taken on line 33—33 in FIG. 32, which is similar to FIG. 21, but illustrates the front derailleur handgrip actuator;

FIG. 34 is a cross-sectional view taken on the line 34—34 in FIG. 33, illustrating the cable released position of the parts of the front derailleur actuator, with the rotational arrow indicating the start of a cable pulling actuation;

FIG. 34A shows a leaf spring member;

FIG. 35 is a view similar to FIG. 34 which illustrates the first increment of movement in a cable pulling actuation of the front derailleur actuator mechanism, in which the detent spring has been shifted to an overshift position;

FIG. 41 is a cross-sectional view taken on the line 41—41 in FIG. 40 corresponding to FIG. 22, illustrating the mechanism of FIG. 40 in its fully up-shifted condition;

FIG. 41A shows a leaf spring member;

FIG. 42 is a cross-sec view taken on the line 42—42 in FIG. 40, corresponding to FIG. 23, illustrating the mechanism of FIGS. 40 and 41 in the fully up-shifted condition;

FIG. 43 is a greatly enlarged fragmentary view illustrating the detenting arrangement in the second shovel cam form of rear derailleur actuator illustrated in FIGS. 40-42;

FIG. 49 is a cross-sectional view taken on the line 49—49 in FIG. 48, particularly illustrating a short cable drive connection between the handgrip rotator and the jack spool;

FIG. 50 is a fragmentary plan view, with portions broken away, taken on the line 50—50 in FIG. 48, further illustrating the short cable drive connection between the handgrip rotator and the jack spool, and illustrating the derailleur control cable output from the jack spool;

FIG. 53 is a fragmentary axial sectional view taken on the line 53—53 in FIG. 46, illustrating some structural details of the fixed and rotational portions of the left hand (front derailleur) handgrip shift actuator;

FIG. 54 is a cross-sectional view taken on the line 54—54 in FIG. 53;

FIG. 55 is another cross-sectional view taken on the line 55—55 in FIG. 53;

FIG. 56 is a further cross-sectional view taken on the line 56—56 in FIG. 53;

FIG. 57 is a fragmentary axial sectional view taken on the line 57—57 in FIG. 50, illustrating the front derailleur control cable output structure, including an adjustment barrel;

FIG. 60 is a fragmentary, further enlarged view taken on the line 60—60 in FIG. 48, particularly illustrating the detenting relationship between the shifter rotator and the fixed body of the shifter for a three chain ring front derailleur system, with the rotator in its fully up-shifted position so that the chain is placed on the smallest chain ring, the directional arrow indicating commencement of down-shifting rotational movement of the shifter rotator, FIGS. 60–63 illustrative successive down-shifting stages of rotation of the handgrip shift actuator from the fully up-shifted position of FIG. 60 to the fully down-shifted position of FIG. 63;

FIG. 61 is a view similar to FIG. 60, with the shifter rotator and detent spring shifted a first clockwise increment from the position of FIG. 60 sufficient to take up lost motions in the derailleur and its cable systems and to provide an overshift increment of cable movement, but insufficient to down-shift the chain from the small chain ring to the middle chain ring;

FIG. 60A shows a leaf spring;

FIG. 64 illustrates a first counterclockwise up-shifting increment of rotation of the shifter rotator and its detent structure from the position of FIG. 63, in which the detenting spring is shifted counterclockwise to its initial position of FIG. 60, with the lost motions being released, but with the chain still remaining on the large chain ring;

FIG. 65 illustrates a second counterclockwise up-shifting increment of rotation of the shifter rotator and its detent structure in which the chain is shifted to the intermediate chain ring; a third, final counterclockwise up-shifting increment of movement of the shifter rotator and its detent structure moving the parts back to their fully up-shifted positions of FIG. 60 in which the chain is on the small chain ring; fine-tuning rotational shifting of the rotator and its detent structure in which the detenting spring is shifted between its positions of FIGS. 60 and 65 without moving the chain from one chain ring to another enabling fine-tuning locating of the chain to avoid chain rasp;

DETAILED DESCRIPTION

FIGS. 1-18 illustrate a derailleur-equipped bicycle, generally designated 10, showing details of both the rear and front derailleur apparatus, presently preferred derailleur actuating cable systems, and defining locations in the derailleur and cable systems of lost motion or "slop" which are accurately accounted for in the present invention.

Figures 1, 2:
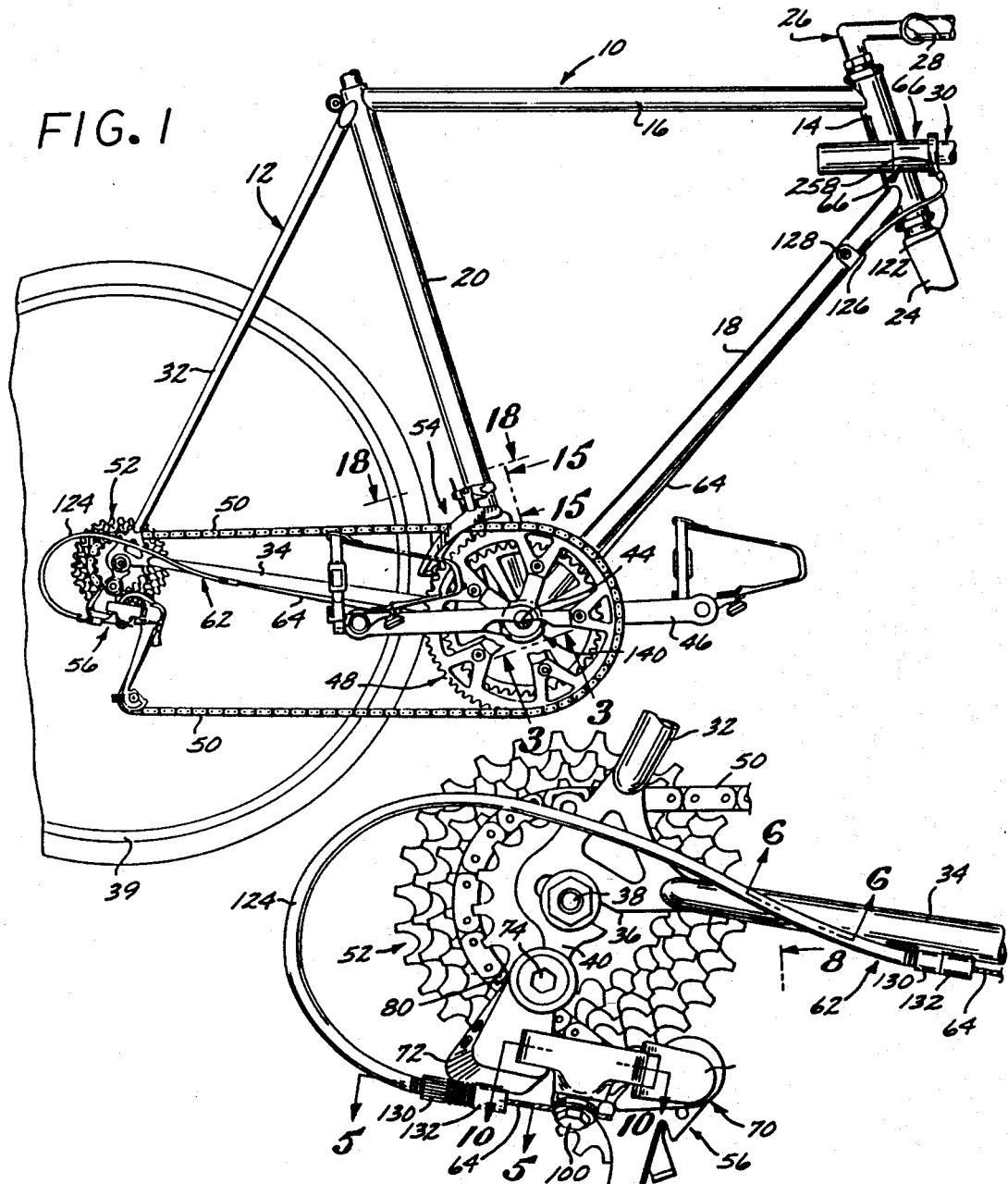
FIG. 1 is an fragmentary side elevational view of a bicycle embodying front and rear derailleurs, and front and rear derailleur shifters according to the present invention.
FIG. 2 is an enlarged fragmentary elevational view of the rear derailleur system of FIG. 1.

Bicycle 10 has a frame 12 including a head tube 14, top tube 16, main down tube 18, seat tube 20, bottom bracket 22, front fork 24, handlebar stem 26, handlebar 28 with end portions 30, and down fork 32 and bottom fork 34. Handlebar 28 illustrated in FIG. 1 is the traditional drop type, although the invention is equally applicable to any type of bicycle handlebar, such as the "mountain bike" type illustrated in FIG. 19. The rear ends of down fork 32 and bottom fork 34 are connected to a pair of spaced dropouts 36 within which the rear axle bolt 38 is fixedly mounted for supporting rear wheel 39. The rear wheel hub rotates on ball bearings about axle bolt 38, and a lateral extension of the wheel hub supports the rear derailleur freewheel on its outside, with ratchet means therebetween which engages when chain power is applied to the freewheel, and disengages to allow free rolling of the rear wheel relative to the derailleur freewheel. A derailleur hanger 40 is integrally formed with dropout 36, extending downwardly therefrom.

A pedal crank, generally designated 44, is journalled in bottom bracket 22, and includes a pair of pedal arms 46 on opposite sides of frame 12, and front derailleur chain ring cluster 48 on the right-hand side of frame 12 inboard of right-hand pedal crank 44. Chain ring cluster 48 shown in FIGS. 1 and 14–18 has two chain rings, the operation of which in connection with the present invention will be discussed in detail hereinafter. Actuation of a three-chain ring cluster is described hereinafter in connection with FIGS. 32–38. In FIG. 1, drive chain 50 is shown engaged over the larger of the two chain rings, and extends rearwardly therefrom into engagement with derailleur multiple freewheel 52 for applying power to rear wheel 39. The multiple freewheel 52 shown has a six-sprocket cluster.

Figure 19:
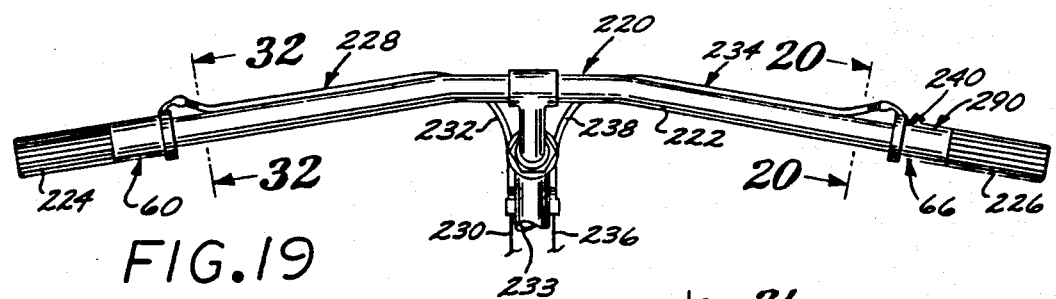
FIG. 19 is a fragmentary elevational view of the handlebar end portion of a mountain bike embodying a first shovel cam form of front and rear handgrip shifting mechanisms of the present invention.

The front derailleur mechanism is generally designated 54, and the rear derailleur mechanism is generally designated 56. Front control cable 58 connects front derailleur mechanism 54 to a front handgrip shift actuator 60 as shown in FIG. 19, connecting in the same manner that rear control cable 64 connects to the rear handgrip shift actuator 66 as shown in detail in FIGS. 19–31.

The rear derailleur cable system is generally designated 62, and includes rear control cable 64 which extends from rear derailleur mechanism 56 to rear handgrip shift actuator 66 that is mounted on right-hand handlebar end portion 30. The connection of rear control cable 64 to rear derailleur shift actuator 66 is described in detail in connection with FIGS. 19–31.

THE REAR DERAILLEUR MECHANISM

The apparatus of rear derailleur mechanism 56 is best illustrated in FIGS. 1, 2, and 8–11.

At the heart of rear derailleur mechanism 56 is a parallelogram generally designated 70 which has a rear support body pivotally but laterally fixedly connected to hanger 40, a pair of parallel links extending forwardly from the support body, and a shifter body attached to the forward ends of the links that is shiftable laterally inwardly toward the bicycle frame 12 under the influence of cable tension, and shiftable laterally outwardly away from frame 12 under the influence of a derailleur return spring contained in the parallelogram.

The rear support or mounting body is designated 72, and is pivotally mounted on a mounting bolt 74 which is threadedly connected to hanger 40 as best seen in FIG. 8. A helical pivot spring 76 around pivot bolt 74 is housed in support body 72 and biases support body 72 clockwise or forwardly about bolt 74. One end of spring 76 bears against body 72, while the other bears against a plate 78 as best seen in FIGS. 8 and 9. A support body angle adjust screw 80 on plate 78 bears against a shoulder 82 on hanger 40 for adjusting the effective torque of spring 76.

The forward shifter body 84 of parallelogram 70 is held parallel to support body 72 by the parallelogram linkage, and shifts transversely inwardly and outwardly relative to frame 12, and in particular, relative to multiple freewheel 52. An outer parallelogram link 86 connects support body 72 and shifter body 84 by means of respective pivot pins 88 and 90; and an inner parallelogram link 92 connects support body 72 and shifter body 84 through respective pivot pins 94 and 96.

Derailleur return spring 98 is best seen in FIG. 10, and is a helical spring with its coil located around pivot pin 96, and having respective arms which bear against shifter body 84 and link 92 so as to bias parallelogram 70 toward a flattened, more closed condition, thereby biasing shifter body 84 laterally outwardly relative to frame 12 and freewheel 52. A cable clamp 100 seen in FIGS. 2, 8 and 10 is mounted on outer parallelogram link 86 for clamping the end of cable 64. Increased tension on cable 64 pulls parallelogram 70 toward a more open, rectangular configuration, thereby moving shifter body 84 inwardly relative to frame 12 and freewheel 52.

A pulley cage 102 is pivotally supported on the inner end of shifter body 84, extending downwardly therefrom. An upper guide or jockey pulley 104 is freely rotatably supported in the upper part of pulley cage 102 adjacent shifter body 84, and a lower tension pulley 106 is freely rotatably mounted in the lower portion of pulley cage 102. Cage 102 consists of outer and inner cage plates 108 and 110, respectively, outer cage plate 108 being mounted on a cage pivot bolt 112 which projects from shifter body 84. Pulley cage 102 is biased clockwise or rearwardly by means of a cage pivot tension spring 114 inside shifter body 84 which works against body 84 and outer cage plate 108.

Chain 50 extends rearwardly from one of the two chain rings of chain ring cluster 48 over one of the six sprockets of multiple freewheel 52, then downwardly and forwardly over the front of guide pulley 104, then downwardly and rearwardly over the rear of tension pulley 106, and then forwardly back to the chain ring. Guide pulley 104 shifts laterally according to lateral movements of shifter body 84 under the influence of rear control cable 64 as directed by rear handgrip shift actuator 66 so as to shift chain 50 downwardly or upwardly from sprocket to sprocket of freewheel 52. As chain 50 shifts from a larger to a smaller sprocket on freewheel 52, more chain becomes available in the overall chain loop, and tension pulley 106 moves rearwardly under the influence of cage pivot tension spring 114 to take up this slack. Conversely, as chain 50 shifts from a smaller to a larger sprocket of freewheel 52, tension pulley 106 gives way forwardly against the force of tension spring 114 to provide the necessary additional chain length for the added circumference of the larger freewheel sprocket.

REAR DERAILLEUR CABLE SYSTEM

The rear derailleur cable system 62 is constructed to minimize and strictly limit lost motions or "slop" commonly found in bicycle shift cables, and make whatever lost motions that are inevitable as predictable as possible so they can be accurately taken up and compensated by the cam member in handgrip shift actuator 66. Such lost motions commonly occur from cable housing flexure under down-shifting cable tension toward rounding out of the cable housing, looseness of the cable in its housing, cable housing compression, cable stretch, and lost motion in cable adjustment barrels. Cable system 62 is also constructed to minimize friction between the cable and its housing so as to further reduce cable housing flexure, and to make down-shifting easier by substantially reducing the friction vector between housing and cable which opposes cable down-shifting movement, particuarly under the relatively high pulling force on the cable that is required for down-shifting.

Figure 20:
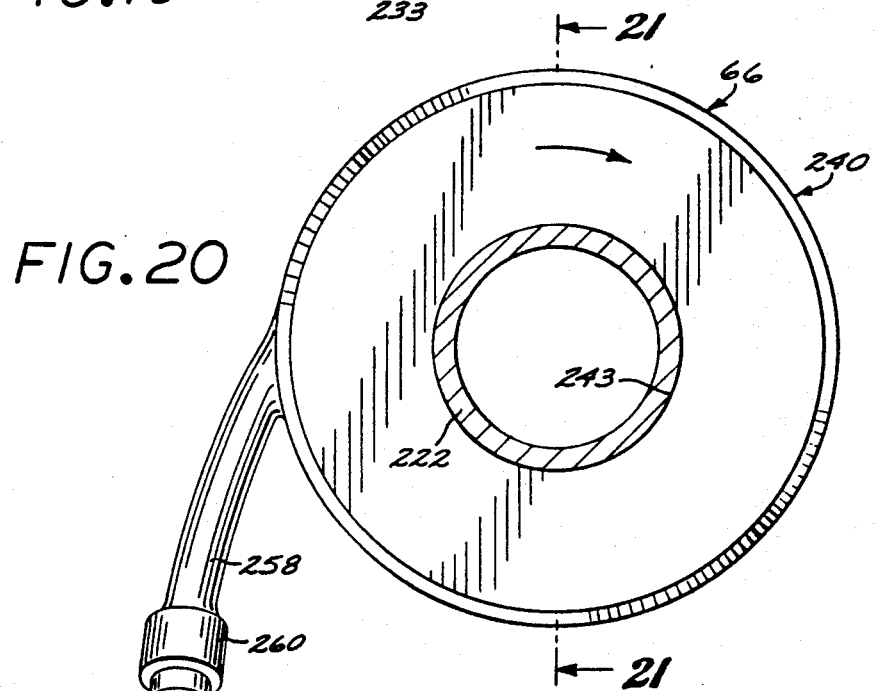
FIG. 20 is a cross-sectional view taken on the line 20—20 in FIG. 19, showing the inner end portion of the rear derailleur shovel cam handgrip shift actuator (relative to the handlebar end), and the rear control cable guide tube which extends therefrom.

With these factors in mind, the rear cable housing is provided in two relatively short sections, a forward cable housing section 122 which extends to a cable guide tube 258 as seen in FIG. 20 and operatively connects with shift actuator 66, and a rearward cable housing section 124 which extends from a rearward location on bottom fork 34 to rear derailleur mechanism 56. Most of the length of rear control cable 64 is thus free of housing, and has only minimal friction against a guide under bottom bracket 22 discussed hereinafter in connection with FIGS. 3 and 4. The shortness of cable housing sections 122 and 124 greatly reduces cable compression lost motion and makes it very predictable.

Cable compression is further greatly reduced by employing a substantially axially compressionless cable housing or casing described hereinafter in connection with FIGS. 6 and 7. The construction of such substantially compressionless cable housing also greatly reduces cable housing flexure under cable down-shifting tension, and makes such flexure and consequent lost motion very predictable.

Referring to FIG. 1, forward cable housing section 122 ends at a spring-loaded front cable housing adjustment barrel 126 through which cable 64 extends and which is adjustably threadedly engaged in a front bracket 128 that is affixed to the right-hand brazon near the upper end of down tube 18. Rearward cable housing section 124 ends at a rear housing adjustment barrel 130 through which cable 64 passes and which is threadedly adjustably engaged in a rear bracket 132 that is secured to derailleur support body 72. As best seen in FIG. 5, a reduced threaded portion 134 of adjustment barrel 130 carries a helical compression spring 136 which resists inadvertent rotation of barrel 130 relative to its bracket 132. There is inevitable clearance between the barrel and bracket threads, spring 136 shifting barrel 130 slightly to the left relative to bracket 132 when cable 64 is under relatively small tension when a shift is not being made. However, during a down-shift when cable 64 is under relatively large tension, barrel 130 will move toward bracket 132 through such thread clearance, which represents lost motion in the cable system. Similar lost motion will occur between front adjustment barrel 126 and its bracket 128. A ferrule 138 is crimped over the end of rearward housing section 124 and is engaged within an axial recess in adjustment barrel 130.

Referring now to FIGS. 3 and 4, a cable guide bracket 140 is secured underneath bottom bracket 22, and supports a pair of grooved, arcuate cable guides 142 and 144 under which the respective front and rear cables 58 and 64 freely slide. The front derailleur cable system, including cable 58, is the same as the forward portion of rear derailleur cable system 62. Thus, front cable 58 extends upwardly and forwardly along the main down tube 18, passing through an adjustment barrel like barrel 126 which is threaded into a bracket like bracket 128 mounted on the left-hand brazon, front cable 58 then having a cable housing section like section 122 of rear cable system 62 which extends from the adjustment barrel to a cable guide tube 258 as seen in FIGS. 32 and 34-38, and connects to front handgrip shift actuator 60. Rear cable 64 extends exposed from adjustment barrel 126 rearwardly alongside main down tube 18, under its guide 144, and thence rearwardly along bottom fork member 34 to the rear housing adjustment barrel 130.

FIGS. 6 and 7 illustrate the substantially axially compressionless cable housing, designated 150, which is employed for both of the cables 58 and 64, but shown with rear cable 64 therein. The core of housing 150 is an annular series of closely packed, primarily axially oriented wires 152 made of a tough metal such as steel. Wires 152 are arranged in a very slow or long helix, as for example a revolution in only about every three inches of length. The annular array of wires 152 is held in its circular configuration between an outer plastic jacket 154 and an inner plastic guide tube or liner 156. Inner guide tube 156 is made of a tough anti-friction plastic material such as a Delrin which, together with the short lengths of cable 150 in cable sections 122 and 124, greatly minimizes cable friction in the housing. Inner guide tube 156 is closely yet freely fitted about cable 64 to minimize lost motion in the curved portions of housing sections 122 and 124.

Applicants have determined that the substantially compressionless-type cable housing 150 not only substantially completely eliminates cable compression as a lost motion factor, but it also substantially minimizes the tendency for conventional cable to round out or give in a "monkey motion," thereby substantially eliminating two heretofore serious sources of lost motion.

SOURCES OF LOST MOTION IN REAR DERAILLEUR MECHANISM

While the aforesaid cable system preferably employed as a part of the present invention has only minimal and very predictable lost motion, every derailleur system has numerous sources of lost motion which cumulatively add up to a substantial amount of lost motion at cable connection 100, and this cumulative lost motion varies for almost every different derailleur system, over a range of from about 0.040 inch to about 0.070 inch. For positive index shifting with applicants' handgrip shift actuator 66, a separate shift actuator cam is preferably provided for each type of derailleur mechanism so as to positively take up and account for the cumulative lost motion in each different derailleur mechanism. Mode of operation of a first shovel cam form of such shift actuator for a rear derailleur mechanism is described in detail hereinafter in connection with FIGS. 19-31.

Figure 11:
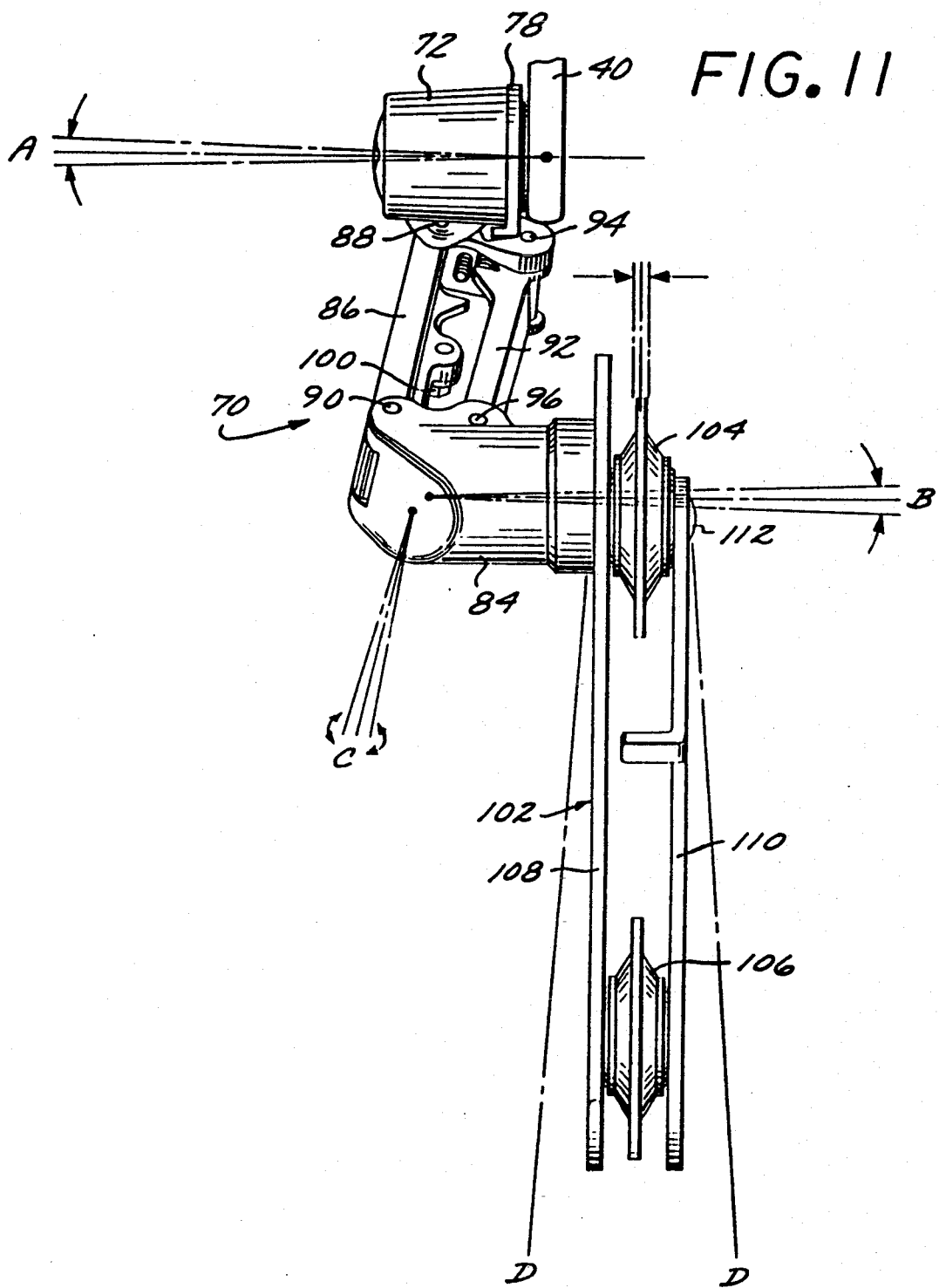
FIG. 11 is a perspective view of a portion of the derailleur mechanism shown in FIG. 2, indicating various points of lost motion.

FIG. 11 illustrates some of these points of lost motion or slop in conventional derailleur systems. First, there is a wobble type of lost motion of support body 72 on its pivot bolt 74 indicated at A in FIG. 11. Support body 72 torques downwardly or upwardly, depending upon whether the chain is being shifted inwardly to a larger freewheel sprocket or outwardly to a smaller freewheel sprocket. Next, there is lost motion at each of the four link pivot pins 88, 90, 94 and 96. When support body 72 torques or twists down as at A, then shifter body 84 twists upwardly, and when support body 72 torques or twists up, then shifter body 84 twists downwardly, these motions being indicated at B in FIG. 11. Whenever shifter body 84 twists, the parallelogram links 86 and 92 also twist as indicated at C in FIG. 11. Further, there is lost motion between cage pivot bolt 112 and shifter body 84, which translates into lost motion between pulley cage 102 and shifter body 84 as indicated at D in FIG. 11. Additionally, there is lateral lost motion of guide pulley 104 on its pivot axis.

OVERSHIFT

The cam mechanism in shift actuator 66, described hereinafter in detail in connection with FIGS. 21-29, is not only configured to account and compensate for the cumulative lost motions referred to above, but also for an overshift increment in the down-shift direction to a larger freewheel sprocket. This overshift increment serves several functions. It is the lateral angle at which guide pulley 104 addresses the chain to the next larger freewheel sprocket which causes the larger sprocket teeth to snag the chain. By moving guide pulley 104 inwardly somewhat beyond the next larger sprocket so that the chain in effect angles across the teeth of the larger sprocket, the sprocket teeth more readily snag the chain plates to provide an earlier, more positive shift. The overshift increment also causes the chain to have its final movement during a down-shifting event toward the destination sprocket from the direction of the next larger sprocket, whereby during a down-shifting event the chain makes its final approach to the destination sprocket in the same direction as it would for an up-shifting event. During an up-shifting event, as the chain approaches the smaller destination sprocket, cable tension is relaxed such that the cumulative lost motion has been relaxed or backlashed, and the force vector opposing cable movement to the final destination is small and stable because of low cable force laterally against the cable housing. The same factors hold true for a down-shift to a larger sprocket when overshift is employed so that the final destination is reached in the up-shift direction. Accordingly, both the down-shift and up-shift events to the same freewheel sprocket will result in the same accurate alignment of the chain with the sprocket. Initial alignment which is conveniently calculated for each freewheel sprocket during up-shifting thereby also provides the correct chain positioning for down-shifting to each sprocket.

FIG. 12 illustrates what is meant by "overshift." Each of FIGS. 12A, B and C diagrammatically illustrates rear derailleur freewheel 52 and its relationship to guide pulley 104 and chain 50 during a down-shifting event from freewheel sprocket #6, the smallest sprocket, to freewheel sprocket #5, the next smallest sprocket. The freewheel hub which overrides the wheel hub is diagrammatically illustrated as 160. The freewheel sprockets are numbered in their conventional order, from 1-6. In FIG. 12A, guide pulley 104 and chain 50 are operatively aligned with the #6 freewheel sprocket. A down-shift is to be made from sprocket #6 to sprocket #5, and FIG. 12B illustrates the overshift increment. Guide pulley 104 is moved or overshifted in the down-shifting direction substantially beyond alignment with the destination sprocket #5, moving chain 50 to this overshift position. Guide pulley 104 is then relaxed back to alignment with the destination sprocket #5, being moved under the influence of derailleur return spring 98 shown in FIG. 10, carrying chain 50 with it into accurate alignment with the destination sprocket #5 as shown in FIG. 12C. The final, aligned location of guide pulley 104 and chain 50 of FIG. 12C will be the same as the position of alignment for an up-shift from sprocket #4 to sprocket #5, the destination having been approached from the same direction with the cumulative lost motion released or backlashed, and the friction vector of the cable housing sections against the cable being the same.

THE FRONT DERAILLEUR MECHANISM

FIGS. 13 and 16-18 illustrate details of construction of front derailleur mechanism 54 shown generally in FIG. 1. The parallelogram is generally designated 170 and is best seen in FIG. 13. The fixed member of parallelogram 170 is a support body 172 which is clamped to seat tube 20 by means of a clamp 174. The derailleur cage is generally designated 176, and consists of outer and inner cage plates 178 and 180, respectively, which are connected by an upper bridge member 182 seen in FIG. 13, and a lower bridge member 184 seen in FIGS. 16, 17 and 18. An outer, upper parallelogram link 186 is pivotally connected at its ends to support body 172 and cage 176 by means of respective pivot pins 188 and 190. An inner, lower parallelogram link 192 is also pivotally connected at its ends to support body 172 and cage 176. The cage connection pin is designated 194, but the support body connection pin is masked behind a portion of the support body as viewed.

A helical spring 196 best seen in FIGS. 13 and 16 is engaged about outer pivot pin 194 for link 192, and bears against link 192 and cage 176 so as to bias parallelogram 170 and hence cage 176 inwardly toward frame member 20 and thus inwardly toward the smaller chain ring. Spring 196 is covered by a spring housing 198.

An actuator arm 200 extends upwardly and inwardly toward frame member 20 as an extension of the upper, outer link 186. Front derailleur cable 58 is attached to actuator arm 200 proximate its free end by means of a cable clamp 202 on actuator arm 200.

Front derailleur mechanism 54 is controlled by front handgrip shift actuator 60 through cable 58. The lost motion factors previously discussed with respect to the rear derailleur system are minimized in the front derailleur system by the simplicity of the mechanism and shortness of the cable. The lost motion factors may nevertheless be accounted for in the front derailleur handgrip shift actuator 60 in the same manner as discussed in detail with respect to the rear derailleur system and associated handgrip shift actuator 66.

FIG. 14 diagrammatically illustrates locations of chain 50 when a bicycle rider is riding "parallel." Chain ring cluster 48 of FIGS. 14-18 has two chain rings, a large chain ring 210 and a small chain ring 212. Rear freewheel 52 is a six-sprocket cluster, including sprockets numbered 1-6. In FIG. 14, chain cage 176 is longitudinally aligned with large chain ring 210, and also substantially aligned with freewheel sprocket #5. In normal parallel riding, when the chain is engaged over large chain ring 210, the rear derailleur mechanism will only be actuated to shift chain 50 between the three smallest freewheel sprockets, numbers 6, 5 and 4, and with any of these three freewheel sprockets, chain 50 will remain sufficiently aligned with cage 176 to avoid rasping against either of the outer or inner cage plates 178 and 180. Similarly, with cage 176 aligned with smaller chain ring 212, with normal parallel riding, the rear derailleur will only be actuated to locate the chain on one of the three largest freewheel sprockets, numbers 1, 2 and 3, and chain rasp will be avoided.

FIG. 15 illustrates the cross-over riding situation in which chain 50 is engaged on the larger chain ring 210, but where the rear derailleur has been actuated to place the chain over one of the three largest freewheel sprockets, numbers 1, 2 or 3. This will cause chain rasp against inner cage plate 180, unless an undesirably wide chain cage 176 is provided. Such a large chain cage is conventional to accommodate cross-over riding, but can readily lead to derailling. Still referring to FIG. 15, if the chain were located over the smaller chain ring 212, and located on one of the three smallest freewheel sprockets 4, 5 or 6, a reverse cross-over situation would occur in which the chain would rasp against outer cage plate 178.

FIG. 16 shows the parallel riding situation of FIG. 4, wherein chain 50 is engaged over the larger chain ring 10, and the chain is generally centered through cage 176. FIG. 17 shows the cross-over situation of FIG. 15, with the chain engaged over the larger chain ring 210 at the front, and engaged over one of the three largest freewheel sprockets 1, 2 or 3 at the rear. The chain is seen to be rasping against inner cage plate 180 at the front of chain cage 176. FIG. 18 shows chain 50 again properly aligned in chain cage 176 after a fine-tune adjustment has been made with the cam mechanism of front handgrip shift actuator 60, as described in detail hereinafter.

"MOUNTAIN BIKE"

The several forms of handgrip shift actuators of the present invention are herein shown and described in connection with a "mountain bike," which is a particularly popular type of bicycle at the present time. FIG. 19 illustrates the front end portion of a mountain bike which is generally designated 220, having a widespread handlebar 222 that angles slightly rearwardly. Conventional left and right grips 224 and 226, respectively, are located on the ends of handlebar 222. Front derailleur handgrip shift actuator 60 is engaged over handlebar 222 immediately inboard of left fixed grip 224, and rear derailleur handgrip shift actuator 66 is engaged over handlebar 222 immediately inboard of right fixed grip 226. Shift actuators 60 and 66 of the present invention are adaptable for placement at any position on the handlebar where there is a straight handlebar section. Preferably, they are placed inboard, or spaced from the end, of the handlebar as shown in FIGS. 1 and 19, but they are equally adaptable for placement proximate the ends of the handlebar.

The front derailleur cable system is generally designated 228, and includes front derailleur control cable 230 and its housing or casing 232. Front derailleur cable system 228 for mountain bike 220 is preferably the same system as that employed on a bicycle 10 shown in FIG. 1, with front cable housing or casing 232 terminating at an adjustment barrel arrangement like that shown in FIG. 5, front derailleur control cable 230 extending down alongside main down tube 233 and riding under the bottom bracket as shown in FIGS. 3 and 4, and with substantially compressionless cable housing like that shown in FIGS. 6 and 7.

The rear derailleur cable system is generally designated 234, and includes rear derailleur control cable 236, forward cable housing or casing 238, and a rearward cable housing (not shown) like that seen in FIGS. 1 and 2. Rear derailleur cable system 234 is preferably the same as rear derailleur cable system 62 shown in FIGS. 1-7 and described in detail above in connection with those Figures.

FIGS. 19-31 illustrate details of structure and operation of a first shovel cam form of rear derailleur handgrip shift actuator 66 according to the invention. In this first shovel cam form of the invention, compensation for the different effects of derailleur return spring 98 (see FIG. 10) between down-shifting and up-shifting is provided by a two-stage variable spring rate for the shift actuator detent spring, so that down-shifting and up-shifting events require substantially the same amount of handgrip shift actuator effort. In a second shovel cam form of rear derailleur handgrip shift actuator 66b, shown in FIGS. 40-43, such compensation for the force of rear derailleur return spring 98 is provided for by different detent notch side slopes for the down-shifting and up-shifting directions, as described hereinafter in detail in connection with FIGS. 40-43.

FIRST FORM OF REAR SHOVEL CAM DERAILLEUR HANDGRIP SHIFT ACTUATOR 66

FIGS. 19-31 illustrate a first shovel cam form of rear derailleur handgrip shift actuator, generally designated 66, wherein the detent spring is provided with a two-stage variable rate between down-shifting and up-shifting, being provided with a lighter spring rate for down-shifting events which work against the derailleur return spring, and a heavier spring rate for up-shifting events which work with the derailleur return spring. These different spring rates are effected synergistically with a rotational shifting of the detent spring that also provides compensation for lost motions or "slop" in the rear derailleur cable system and rear derailleur mechanism, as well as to provide an overshift increment of movement of the rear derailleur control cable. These different spring rates result in generally the same torqueing effort being required for down-shifting and up-shifting by handgrip shift actuator 66.

FIXED INNER PORTION OF REAR HANDGRIP SHIFT ACTUATOR 66

Rear derailleur shift actuator 66 includes a generally circular body 240 adapted to be fixedly secured to the right-hand part of handlebar 222 inboard of the right-hand fixed handlebar grip 26. Actuator body 240 includes an inner mandrel portion 242 having an annular central opening 43 which allows it to fit over handlebar 222. A threaded radial bore 244 in mandrel portion 242 of body 240 receives a set screw 246, preferably an allen wrench screw, which locks mandrel 242 fixedly on handlebar 222.

A radially outwardly facing arcuate recess 248 in mandrel 242 is adapted to receive a generally complementary arcuate spring member 250, which is preferably made of a tough, resilient resin such as a Delrin, but which could be made of other suitable resin or spring metal. The features of mandrel 242 and spring member 250 which provide the dual spring rate will be described hereinafter in detail.

Fixed body 240 also includes an outer cowling portion 252 which is integral with and extends radially outwardly from mandrel portion 242 of body 240, and includes a generally flat radial portion 254, terminating at its radial outer edge with a cylindrical flange portion 256 which is axially oriented generally toward the end of handlebar 222.

A cable guide tube 258 extends generally tangentially from the outside of flange 256, its central passage registering with a generally tangential hole through the wall of flange 256 for entry of the rear derailleur control cable 64 into the cavity defined within cowling 252. Cable guide tube 258 curves downwardly and inwardly from the end of handlebar 222 for direction to rear derailleur cable system 62. Cable guide tube 258 terminates at its outer end with an end cup 260. A ferrule 262 is crimped over the end of forward cable housing section 122 of rear control cable 64, ferrule 262 seating in cable guide tube end cup 260.

Referring now to the arcuate recess 248 in the mandrel portion 242 of fixed body 240, it includes a pair of arcuately spaced slip surfaces 264 which terminate at respective generally radially oriented end abutment shoulders 266 and 268 of recess 248. Shoulder 266 may be characterized as the "down-shifting" shoulder, since detent spring 250 seats against it during down-shifting events; and shoulder 268 may be characterized as the "up-shifting" shoulder, since the detent spring seats against it during up-shifting events. A pair of ribs or projections 270 and 272 extend radially outwardly from recess 248 at the ends of slip surfaces 264, opposite respective abutment shoulders 266 and 268. Ribs or projections 270 and 272 are spaced apart from each other, but as a pair, they are offset closer to up-shifting shoulder 268 than down-shifting shoulder 266.

The arcuate spring member 250 for this form of the invention will now be described. Spring member 250 is a leaf spring which has an arcuate body portion 274, with ends thereof 275 and 276 which are adapted to seat against body shoulders 266 and 268 according to whether a down-shifting or up-shifting event is being effected. During a down-shifting event, spring end 275 will abut against end abutment shoulder 266, as seen in FIGS. 24–26, while during an up-shifting event spring end 276 will abut against abutment shoulder 268 as seen in FIGS. 22, 28 and 29.

Arcuate detent spring member 250 has two pairs of generally radially inwardly directed feet or ribs. One pair of these feet or ribs is designated 277 and 278, which are outer end feet located proximate respective ends 275 and 276 of acuate body portion 274 of the spring. The other pair of feet or ribs is designated as inner feet or ribs 280 and 82, since they are inwardly spaced from spring ends 275 and 76, and these inner feet or ribs 280 and 282 are spaced apart the same distance as the spacing between body projections or ribs 270 and 272. However, as a pair, inwardly directed spring ribs 280 and 282 are equally spaced from ends 275 and 276 of arcuate spring body portion 274.

A rounded shift indexing projection 284 exends generally radially outwardly from arcuate body portion 274 of spring member 250.

OUTER HANDGRIP ROTATING PORTION OF REAR HANDGRIP SHIFT ACTUATOR 66

The rotating portion of rear handgrip shift actuator 66 is generally designated 290, and is best seen in FIGS. 19 and 21-29. Handgrip rotating portion 290 includes an elongated cylindrical body 292 rotatably supported on handlebar 222 immediately inboard of the fixed right grip 226, which axially locates body 292 on handlebar 222 in the outboard direction. A foam rubber or neoprene grip 294 is fixedly mounted around rotatable cylindrical body 292 for radially enlarged and comfortable hand actuation of handgrip rotating portion 290.

A cable actuating flange structure generally designated 296 extends generally radially outwardly from the axially inner end of cylindrical body 292 (relative to the end of handlebar 222). Looking in stages axially away from the end of handlebar 222, cable actuating flange 296 has the following portions.

Figure 21:
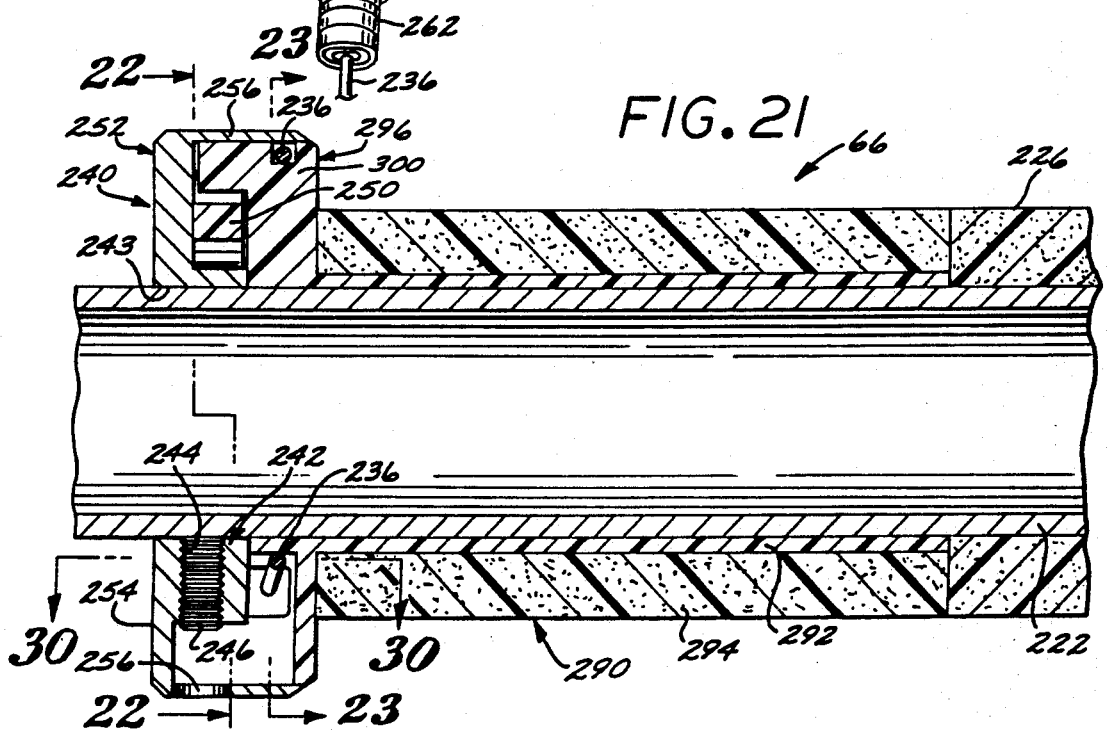
FIG. 21 is an axial sectional view (relative to the handlebar) taken on the ine 21—21 in FIG. 20, illustrating some of the details of construction of the rear handgrip actuator.

First, a disk portion 298 extending radially outwardly from the inner end of cylindrical body 292. In a prototype of the invention, disk portion 298 was made approximately 1 mm in thickness. Second, a cable actuating section generally designated 300, which projects axially from disk portion 298, and in said prototype of the invention had an approximately 3 mm axial exent from the disk portion 298. Cable actuating section 300 is best seen in the radial or diammetrical sections of FIGS. 23 and 27, and is also seen in FIG. 21. A rotationally oriented cable cam groove 302 in cable actuating section 300 opens generally radially outwardly so as to receive rear derailleur control cable 236. Cable actuating section 300 commences rotationally with a thin cylindrical cable slide section 304 which, working counterclockwise in FIGS. 23 and 27, transitions into a "shovel cam" generally designated 306. Shovel cam 306 has a transitional entry portion 308 leading from the thin cylindrical slide section 304, a radially progressing cam ramp portion 310, and primary cam lobe portion 312. The surface of shovel cam 306 is contained in groove 302. Cam groove 302 is generally defined between disk portion 298 of cable actuating flange structure 296 and a third component of cable actuating flange structure 296, which is a generally semicircular detent section 314 projecting axially from cable actuating section 300.

Detent section 314 of cable actuating flange structure 296 has an outer cylindrical surface which registers radially with disk portion 298. An axially thin angular cable guide 320 defines the leading portion of cable cam groove 302 on cable actuating section 300, fairing into detent section 314.

Detent section 314 has a series of radially inwardly opening, circularly spaced detent notches 322 within which the rounded indexing projection 284 of spring member 250 is successively received and detented to index shift drive chain 50 on the respective sprockets of rear derailleur multiple freewheel 52. In the rear derailleur handgrip shift actuator 66 illustrated in FIGS. 19-31, there are seven of these detent notches 322, corresponding to a multiple freewheel 52 having seven sprockets. These detent notches 322 are circularly spaced relative to each other to achieve accurate alignment of drive chain 50 with the respective sprockets of multiple freewheel 52 in the final respective gear-shifted positions of rear handgrip shift actuator 66. Corresponding to the lateral spacing between the various sprockets of multiple freewheel 52, the spacings between detent notches 322 may vary as required for accurate alignment of drive chain 50 with the respective sprockets of multiple freewheel 52.

As seen in full lines in FIGS. 23, 27, 30 and 31, and in dotted lines in FIGS. 22, 24–26, 28 and 29, a stationary cupped cable end bracket 324 is supported on the inner support portion 242 of fixed body 240. The end portion of rear control cable 64 extends through a hole 326 in bracket 324, with a cable end bead 328, usually of lead, being seated in cable end bracket 324. Cable end bracket 324 and cable end bead 328 seated therein secure the handgrip end of rear derailleur control cable 236 in a fixed position relative to actuator body 240 and handlebar 222.

As aforesaid, shovel cam 306 includes three portions, a transitional entry portion 308, a cam ramp portion 310, and a cam lobe portion 312. Cam lobe portion 312 has a cupped end 329. In the highest gear position illustrated in FIGS. 23-26, this cup end 329 engages over fixed cable end bracket 324 and cable end bead 328, this being the most counterclockwise position of handgrip rotating portion 290 as viewed in FIGS. 22-24. In the lowest gear position illustrated in FIGS. 26-28, cupped end 329 is rotationally spaced clockwise about 136° from cable end bracket 324 and end bead 328 as seen in FIG. 27.

MODE OF OPERATION OF REAR DERAILLEUR HANDGRIP SHIFT ACTUATOR 66 OF FIGS. 29-31

Sequential down-shifting events of rear derailleur handgrip shift actuator 66 are illustrated in FIGS. 24-27, with the full down-shifted position shown in FIGS. 26 and 27; and up-shifting events are illustrated in FIGS. 28 and 29, with the full up-shifted position illustrated in FIGS. 22 and 23.

REAR DERAILLEUR DOWN-SHIFTING EVENTS

Rear derailleur down-shifting events start from the full up-shifted position illustrated in FIGS. 22 and 23, and progress through FIGS. 24-27, to the full down-shifted position of FIGS. 26 and 27. Down-shifting is from the smallest sprocket of rear derailleur freewheel 52 (the highest gear ratio) through the series of freewheel sprockets to the largest (lowest gear) freewheel sprocket of freewheel 52. The mechanism of rear shift actuator 66 is preferably arranged so that actuator 66 is moved overhand toward the rider during down-shift events, and overhand away from the rider during up-shifting events. Thus, as viewed in FIG. 19, during down-shifting events, the top of shift actuator 66 is being pulled or rotated toward the bicycle rider. The same is true for FIG. 21. For down-shifting events, rear handgrip shift actuator 66 is rotated clockwise in FIGS. 20 and 22-27, with the full down-shifted position shown in FIGS. 26 and 27, the down-shifting directional arrows being shown in FIGS. 24-26.

Referring now to FIGS. 22 and 23, in which this first form of the invention is shown in its full up-shifted position, and therefore in position to start a series of down-shifting events, the parts are in the following locations. (1) Rear control cable 236 is in its most relaxed position, with cam lobe portion 312 of shovel cam 306 in its most counterclockwise position as seen in FIG. 23. (2) Indexing projection 284 on arcuate spring member 250 is lodged in the highest gear (most clockwise as seen in FIGS. 22 and 24) notch of the series 322 of spring detent notches. (3) The end 276 of arcuate spring member 250 (the counterclockwise end as viewed in FIGS. 22, 24-26, 28 and 29) is located against shoulder 268 of arcuate recess 248 in fixed body 240, as seen in FIG. 22. (4) The pair of radially outwardly directed projections 270 and 272 on fixed body 240 is rotationally aligned with the similarly arcuately spaced inner feet 280 and 282 of arcuate spring member 250, to provide the higher spring rate for previous up-shifting events, relative to down-shifting events. (5) Cable end bracket 324 and end bead 328 are received in the cupped end 329 of cable actuating section 300 of rotating handgrip portion 290.

The first step in the down-shifting sequence is best seen in FIGS. 22 and 24, arcuate spring member 250 having been moved from its up-shifting position of FIG. 22 where it abutted against shoulder 268 of fixed body 240 to the down-shifting position of FIG. 24 where the other end of spring member 250 abuts against shoulder 266 of fixed body 240. During this first increment of down-shifting movement, spring indexing projection 284 remains seated in the highest gear spring detent 322 so that with rotation (clockwise in FIGS. 22-24) of handgrip rotating portion 290, spring member 250 is shifted from abutment with fixed shoulder 268 to abutment with fixed shoulder 266, inner feet 280 and 282 of spring member 250 shifting off of the respective projections 270 and 272 so that the spring rate of spring 250 is reduced to the spring rate of the entire length of spring 250 between its outer end feet 277 and 278. This first increment of movement of rotating handgrip portion 290 accomplishes three things. First, shifting of spring 250 to the lower spring rate provides compensation for the increased derailleur return spring force during down-shifting events. Second, it provides handgrip rotating portion 290 a preliminary increment of rotational movement for initial takeup of rear control cable 236 to overcome lost motion in the rear derailleur mechanism and rear derailleur cable system as previously described. Third, it provides an overshift increment of cable movement for positive index shifting, as also previously described.

As down-shifting rotational movement of rotating handgrip portion 290 progresses clockwise as viewed in FIGS. 22-27, indexing projection 284 of arcuate spring member 250 is received in successive spring detents 322 from the highest gear detent as shown in FIG. 24, then through the next highest gear detent as shown in FIG. 25, and finally to the lowest gear detent as shown in FIG. 26.

FIGS. 23 and 27 best illustrate how cable-pulling actuation is accomplished during down-shifting rotational movement of handgrip rotating portion 290. Looking first at FIG. 23, which represents the fully up-shifted position of handgrip rotating portion 290, cam lobe 312 of shovel cam 306 is in its most counterclockwise location, closest to cable guide tube 258, with a substantial extent of rear control cable 236 bent around the small or minor diameter cylindrical cable guide section 304 of cable cam groove 302. Thus, in FIG. 23 cable 236 is let out to its most extended position. As handgrip rotating portion 290 is rotated to pull cable 236 through rear derailleur down-shifting events from the positions of FIGS. 22 and 23 to the final down-shifted positions of FIGS. 26 and 27, shovel cam lobe 312 rotates clockwise as seen in FIGS. 23 and 27 to expand the cable loop around shovel cam 306, progressively moving more and more of cable 23 off of the thin cylindrical cable slide section 304 of cam groove 302 onto the entry, ramp and lobe portions 308, 310 and 312, respectively, of shovel cam 306, thus pulling in cable 236 so as to progressively shift rear derailleur mechanism 56 across multiple freewheel 52.

Shovel cam 306 of the present invention provides a great deal of flexibility for adaptation to, and hence for retrofitting to, the variety of satisfactory rear derailleur mechanisms which have been on the market for the last few years. The differential between the smaller diameter of the thin cable slide section 304 and the larger diameter of shovel cam lobe portion 312 can be tailored to the amount of cable movement required for any particular rear derailleur mechanism, whether past, present or future. Conventional derailleur mechanisms at this time require approximately 0.760 inches of cable to be pulled in order to down-shift from the smallest to the largest freewheel sprocket. Testing has indicated that a diameter differential of from approximately 1 inch for cable slide section 304 to approximately 1.6 inches for cam lobe 312 of the invention will provide this 0.760 inches of cable pulling with approximately 136° of rotation of handgrip rotating portion 290, which is within a normal range of shifting rotation, and also within a normal torque range. For an experimental model of the present invention having a cable slide section 304 diameter of 1 inch and a cam lobe 312 diameter of 1.6 inches, the amount of rotation of handgrip rotating portion 290 can be calculated as pi times (1.6 minus 1, i.e. D-d), which is the 136° referred to above. Thus, there is a considerably greater amount of rotational movement of handgrip rotating portion 290 per increment of cable movement relative to the simple spool actuators noted in the Prior Art section, and hence a considerably greater mechanical advantage over the simple spool actuators, and therefore also the ability to space the rotating detents 322 further apart for more accurate detenting and minimization of wear on the detent walls.

With cable 236 in its released, highest gear position, a substantial extent of the cable within cowling 252 is wrapped around the thin cylindrical section 304 of cable actuating section 300, as seen in FIG. 23. According to the mode of operation of this form of the present invention, the loop of cable wire in cam groove 302 is expanded from this highest gear position to a larger diameter during down-shifting events, while the cable end, at end bead 328, remains stationary on fixed body 240. This is the opposite of conventional simple spool rotating actuators in which the cable end is rotated by the actuator, so that there can be no mechanical advantage. Thus, while a desirable, easy-operating rotable grip 290 of this form of the present invention can have any desired number of degrees of rotation between the highest and lowest gear ratios, as for example a particularly desirable rotational extent of approximately 136°, conventional simple spool shifters are restricted to only about 80° of rotational movement, making pulling much more difficult, detents disadvantageously disposed considerably closer together, and generally requiring derailleur mechanisms to be redesigned for larger amounts of cable movement than the normal approximately 0.760 inches of movement of cable pulling.

By adjusting the ratio of the larger diameter of cam lobe 312 and smaller diameter of cable slide section 304, the amount of cable movement, and correspondingly the amount of mechanical advantage obtained, can be adjusted to perfectly suit, and retrofit to, any existing rear derailleur mechanism. To the contrary, current simple spool handgrip shift actuators require complete redesigning of the derailleur mechanisms to fit the limited rotational capability of the actuator. The derailleur design must be compromised from optimum to order to do this.

The spiral, curving shape of shovel cam 306 has a "nautilus" configuration which varies as it progresses through the transition front entry portion 308, cam ramp portion 310, and cam lobe portion 312 so as to adapt to variations in cable pull requirements between the successive different sprockets of rear derailleur freewheel 52. Such cable pull variations are primarily the result of increasing derailleur return spring force for successive down-shifting events, and these variations are compensated for by contouring shovel cam 306 so as to provide a progressive decrease of cable pulling extent per degrees of rotation of handgrip rotating portion 290 during a series of cable-pulling down-shifting events.

The first form of rear derailleur handgrip shift actuator 66 illustrated in detail in FIGS. 20–31 relies primarily upon the two-stage spring rate of the arcuate detent spring member 250 to compensate for the relatively higher force required for down-shifting than up-shifting because of the higher derailleur return spring force during down-shifting. Nevertheless, the amount of pulling effort in down-shifting can be further adjusted, or fine-tuned, for each of the sprockets of rear multiple freewheel 52 by varying the angles of inclination of the sides of detent notches 322. This would be only a relatively small amount of adjustment for the first form of the rear derailleur actuator shown in detail in FIGS. 20–31, wherein the dual-rate detent spring 250 provides primary compensation for the difference in derailleur spring force between down-shifting and up-shifting. In a second form of rear derailleur handgrip shift actuator 66b shown in FIGS. 40–43, the primary means of compensation for the difference in rear derailleur return spring force between down-shifting and up-shifting is a difference in the angles of inclination of the opposite sides of the actuator spring detent notches.

It is presently preferred that the progressive height of shovel cam 306 as it progresses into cam lobe portion 312 from ramp portion 310 be sufficient for each of the sprockets of multiple freewheel 52 to cause the rear derailleur mechanism to move the chain a sufficient overshift amount beyond the destination freewheel sprocket in a down-shifting event so that the chain will approach the destination sprocket in the same direction as it would in an up-shifting event, the progressive shovel cam height being sufficient to first release the lost motion backlash in the rear derailleur and cable systems, and then allow some reverse chain movement toward the destination sprocket of freewheel 52. Such chain reversal is an observable phenomenon. In a conventional cable system, cable housing compression and warping are only substantially completely released or backlashed when the relatively higher cable tension friction vector that opposes down-shift cable movement is reversed to the relatively lesser cable friction vector of up-shift cable movement.

Applicants consider the maximum limit of the height of shovel cam lobe 312 for each down-shift event except the final one to sprocket #1 to be such that shovel cam lobe 312 not cause rear derailleur mechanism 56 to move chain 50 sufficiently far laterally inwardly to cause a double shift, i.e., to skip on over the destination sprocket to the next sprocket. For the largest, lowest gear sprocket #1, applicants consider the upper limit for the height of shovel cam lobe 312 to be such that it not cause rear derailleur mechanism 56 to move chain 50 laterally inwardly toward the sufficiently to derail chain 50 off of sprocket #1.

While applicants consider these to be the upper limits for the heights of shovel cam lobe 312 for the respective sprockets of freewheel 52, it is presently preferred that these heights of shovel cam lobe 312 not cause the derailleur mechanism to shift chain 50 laterally during any down-shifting event sufficiently to cause chain rasp against the next freewheel sprocket inboard of the destination sprocket. Nevertheless, for optimum positive index shifting, applicants prefer that each portion of shovel cam lobe 312 relating to a respective sprocket of multiple freewheel 52 be sufficiently high to bring chain 50 as close to the next freewheel sprocket as possible without the chain rasping against the next freewheel sprocket. These maximum and preferred upper limits are observable phenomena.

UP-SHIFTING OF THE REAR DERAILLEUR BY THE FIRST SHOVEL CAM FORM OF THE INVENTION SHOWN IN FIGS. 21-31

Up-shifting to a smaller freewheel sprocket does not require overshifting for accurate centering of the chain on the destination sprocket, and release of lost motions in the derailleur system and cable system is automatic. Up-shifting is illustrated in FIGS. 27-29, with the fully down-shifted position shown in FIGS. 27 and 28, and up-shifting movement shown in FIG. 29, the up-shifting actuation being illustrated by the rotation arrows shown in FIGS. 28 and 29.

In the fully down-shifted position from which up-shifting may be started, indexing projection 284 of detent spring member 250 is located in the most counterclockwise detent 322 as seen in FIGS. 26 and 28, while shovel cam 306 has cable 236 in its most retracted condition as seen in FIG. 27.

Up-shifting movement of handgrip rotation portion 290 is the opposite of down-shifting movement, and overhand away from the rider as viewed in FIG. 19, or counterclockwise as viewed in FIGS. 22-29. The first increment of such counterclockwise rotational movement of handgrip rotating portion 290 causes arcuate spring member 250 to shift counterclockwise relative to fixed body 240, which causes it to shift from its relatively low spring rate position of FIG. 26 to its relatively high spring rate position of FIG. 28, wherein inner feet 280 and 282 of spring 250 are engaged over ribs or projections 270 and 272 of fixed body 240 so that the handgrip shift actuator operating force is generally the same for up-shifting, which is with derailleur spring force, as for down-shifting, which is against derailleur spring force. This preliminary up-shifting rotation of rotating handgrip portion 290 which moves spring 250 to its higher spring rate position also releases the rear derailleur mechanism and cable system lost motions which may have been left after previous down-shifting. FIG. 29 illustrates handgrip rotating portion 290 progressing counterclockwise, in the up-shifting direction, with indexing projection 284 of spring 250 sequentially shifting between spring detents 322 which correspond to the respective freewheel sprockets.

FRONT HANDGRIP SHIFT ACTUATOR 60

Front handgrip shift actuator 60, which is preferably located immediately inboard of the fixed left handlebar grip 224, is shown in detail in FIGS. 32-39 with respect to both structure and operation. Front derailleur shift actuator 60 includes a generally circular body 240a similar to rear derailleur shift actuator body 240. Body 240a includes an inner mandrel support portion 242a which has an annular central opening allowing it to fit over handlebar 222. A threaded radial bore 244a in mandrel 242a receives a set screw 246a which both rotationally and axially locks mandrel 242a on handlebar 222.

A radially outwardly facing arcuate recess 248a in mandrel 242a is adapted to receive a generally complementary arcuate leaf spring member 250a, which is preferably made of a tough, resilient resin such as Delrin, but which could be made of other suitable resin or spring metal. In front handgrip shift actuator 60, the configuration of arcuate recess 248a cooperates with arcuate spring member 250a so as to (1) provide positive overshift between successive chain rings in the down-shifting direction from a smaller chain ring to a larger chain ring, and (2) enable the chain to be shifted slightly back and forth relative to the particular chain ring upon which it may be engaged so as to eliminate chain rasp or scraping. This requires that arcuate spring member 250a be positively retained in either of two rotational locations which are selective according to nonshifting rotational increments in both directions of the rotating handgrip member, as described in detail hereinafter.

Fixed body 240a has an outer cowling portion 252a which is integral with and extends radially outwardly from mandrel support portion 242a, and includes a generally flat radial portion 254a, terminating at its radial outer edge with a cylindrical flange portion 256a which is axially oriented generally toward the left end of handlebar 222. A cable guide tube 258a extends generally tangentially from the outside of flange 256a, its central passage registering with a generally tangential hole through the wall of flange 256a for entry of front derailleur control cable 230 into the cavity defined within cowling 252a. Cable guide tube 258a terminates at its outer end in the same manner as rear derailleur cable guide tube 258 as shown in FIG. 20.

Arcuate recess 248a differs considerably from the corresponding arcuate recess 248 of rear actuator 66. Recess 248a does have respective down-shift and up-shift end abutment shoulders 266a and 268a. The configuration of recess 248a is distinctive in having a pair of wide, radially outwardly projecting ribs 330 and 332 which, in part, define a pair of recess end notches 334 and 336. These recess end notches 334 and 336 are fully defined between the recess outer end abutment shoulders 266a and 268a on the one hand, and arcuately outwardly facing respective shoulders 338 and 340 on respective ribs 330 and 332.

Arcuate spring member 250a is constructed to cooperate with this configuration of recess 248a so as to provide both overshift and selective fine-tuning in front derailleur mechanism 54. Spring member 250a has an arcuate body portion 274a which terminates at ends 275a and 276a. A pair of end feet 277a and 278a proximate respective body ends 275a and 276a extend radially inwardly from body portion 274a, and have rounded cam tips. Arcuate spring member 250a is completed with a generally radially outwardly directed indexing projection 284a which is generally arcuately centrally located on body portion 274a.

Outer handgrip rotating portion 290a of front derailleur shift actuator 60 is essentially the same as outer rotating portion 290 of rear derailleur actuator 66, except for the number of its detent notches to accommodate a corresponding number of front derailleur chain rings, and the configuration of its "shovel cam" to accommodate the front derailleur shifting requirements. Thus, outer handgrip rotating portion 290a includes an elongated cylindrical body 292a, a foam rubber or neoprene grip 294a, and a cable actuating flange structure 296a which is similar to the corresponding flange structure 296 of the first form of rear derailleur handgrip shift actuator 66 previously described in detail. Thus, cable actuating flange structure 296a for front handgrip shift actuator 60 includes a radially oriented disk portion 298a, and a cable actuating section 300a which is generally like cable actuating section 300 of rear derailleur actuator 66 except that the configuration of the shovel cam corresponding to shovel cam 306 is specifically configured to accommodate the requirements of the front derailleur chain rings. Thus, the front actuator shovel cam has the same general configuration as shovel cam 306 of the rear actuator, with the same general mode of operation and beneficial results as set forth hereinabove.

Cable actuating flange structure 296a also includes a generally semicircular detent section 314a which is illustrated in FIGS. 34-38 as having three generally regularly spaced, radially inwardly directed spring detent notches 322a within which indexing projection 284a of spring member 250a is selectively engaged according to actuation by the rider.

Cable end bracket 324a is seen in FIGS. 33 and 34, as is cable end bead 328a. These are fixed relative to handlebar 222 in the same manner as cable end bracket 324 and bead 328 in the first form of rear derailleur actuator 66 shown in FIGS. 19-31.

MODE OF OPERATION OF FRONT HANDGRIP SHIFT ACTUATOR 60

Figure 36:
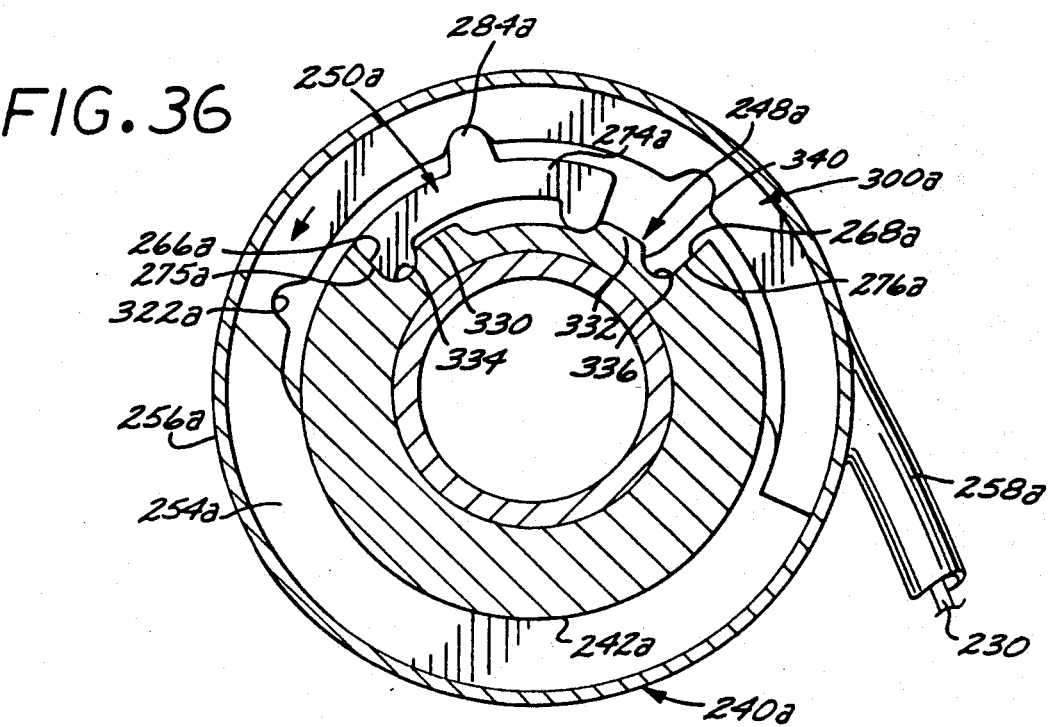
FIG. 36 is a similar view which illustrates continuing cable pulling actuation of the front derailleur during down-shifting.

Front handgrip shift actuator 60 has a two-stage mode of operation somewhat similar to the two-stage operation of the first form of rear derailleur handgrip shift actuator 66 previously described in detail, but serving the two principal purposes of taking up overshift, and then allowing the rider lateral chain shifting options to avoid chain rasp regardless of the lateral location of the rear portion of the chain on multiple freewheel 52. To accomplish these purposes, detent spring 250a of front shift actuator 60 has two rotationally specific positions, one being a fully up-shifted, detented position shown in FIGS. 34 and 38 wherein spring member 250a as viewed in FIGS. 34-38 is in its most clockwise position relative to front shift actuator body 240a, and the other position of spring member 250a being in a most counterclockwise, detented location relative to fixed body 240a as seen in FIGS. 35-37 which is the location of spring 250a during down-shifting events.

The rotational interlock between indexing projection 284a of spring member 250a and spring detent notches 322a on shift actuator rotator 290a is stronger than the rotational interlock between end feet 277a and 278a of spring 250a within fixed end notches 334 and 336 of fixed body 240a. Accordingly, at the initiation of a down-shifting event for the front derailleur, as illustrated in FIGS. 34 and 35, handgrip rotating portion 290a will carry spring member 250a from the fully up-shifted position of FIG. 34 counterclockwise to the down-shifting position of FIG. 35. This prioritized increment of movement of spring 250a will allow rotating handgrip portion 290a to pull front derailleur cable 230 to an overshift location of drive chain 50 relative to the front derailleur destination chain ring to which it is being moved, e.g., from the smallest front derailleur chain ring to the middle front derailleur chain ring of a three-chain ring cluster. The relative locations of the parts in this situation are illustrated in FIG. 36, wherein indexing projection 284a of spring 250a is located in middle spring detent 322a of handgrip rotator 290a, and spring 250a is located in its most counterclockwise position.

Figure 37:
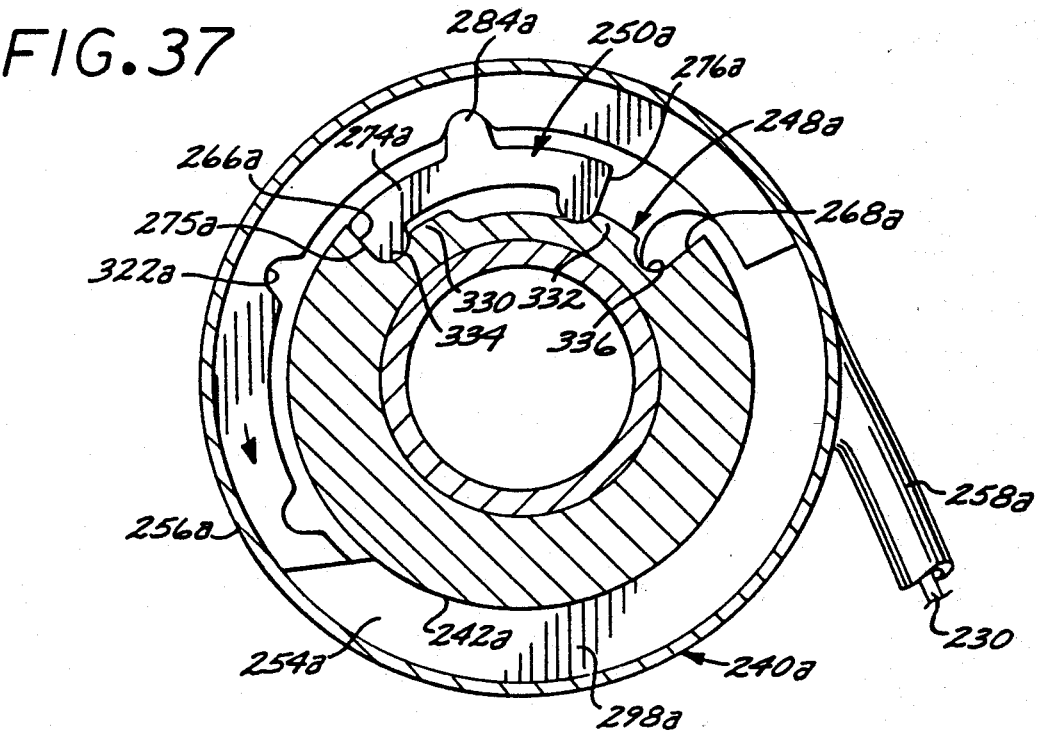
FIG. 37 is a similar view which illustrates completion of a series of front derailleur down-shifting events.

With chain 50 thus engaged in an overshifted position on the middle front derailleur chain ring, further down-shifting rotation of handgrip rotator 290a (counterclockwise as viewed in FIGS. 34-37) will move the most clockwise detent 322a of handgrip rotator 290a into engagement with spring indexing projection 284a, as shown in FIG. 37. This corresponds to the largest, lowest gear chain ring, still with an overshift component of outward lateral chain location due to the counterclockwise detented position of spring 250a as seen in FIGS. 35, 36 and 37.

Figure 38:
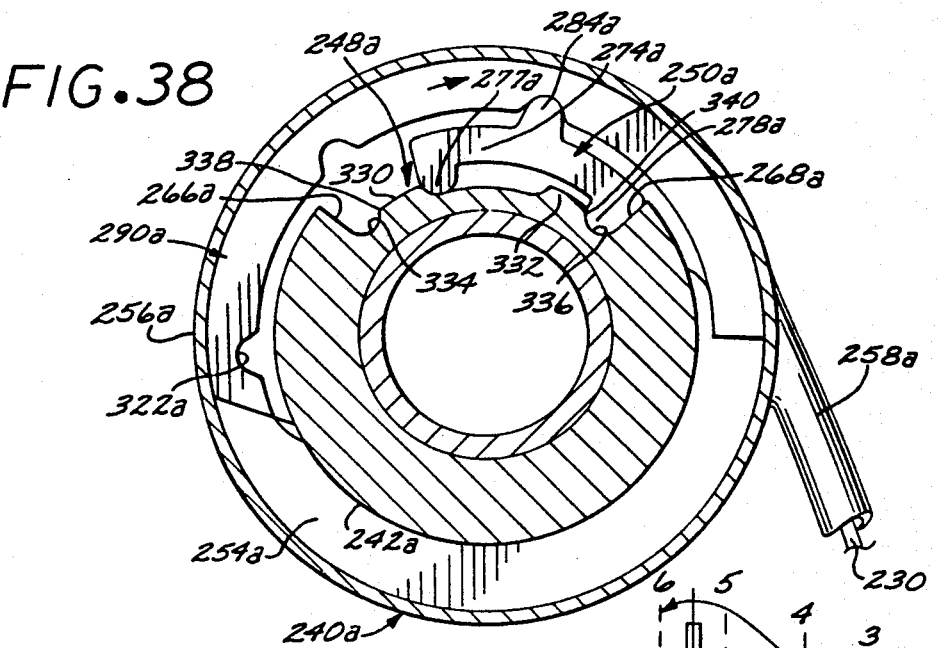
FIG. 38 is a similar view which illustrates the commencement of a series of front derailleur up-shifting events.

Thus, while the overshifting increments of movement of chain 50 during down-shifting are automatically accommodated by the counterclockwise movement of spring 250a as viewed in FIGS. 34-37, the lateral chain location can be fine-tuned to avoid chain rasp in any one of the three chain ring locations by rotation of front actuator rotator 290a overhand away from the rider a sufficient amount to shift spring 250a clockwise as seen in FIGS. 34 and 38, but insufficiently to shift up from a larger chain ring to a next smaller chain ring. The rider thus has two optional fine-tune positions for the chain, as required to eliminate chain rasp according to the lateral location of the rear portion of chain 50 on multiple freewheel 52, the down-shifting location of spring 250a as viewed in FIGS. 35-37, or the up-shifting position of spring 250a as viewed in FIGS. 34 and 38.

Up-shifting from larger chain rings to smaller chain rings is illustrated in FIG. 38 where the rotational arrow for handgrip rotator 290a is in the clockwise direction, indicating overhand rotation of rotator 290a away from the rider. During such up-shifting, front handgrip shift actuator 60 operates in reverse from down-shifting, its first increment of movement moving detent spring 250a clockwise or to the right as seen in FIG. 38 to release any overshift chain positioning that may have remained from down-shifting, and then further movement shifting successive spring detent notches 322a of rotator 290a into detented cooperation with spring indexing projection 284a. Again, as with a series of down-shifting events, such a series of up-shifting events leaves the rider with the option of two detented positions of handgrip rotator 290a so as to avoid chain rasp according to the lateral location of the rear portion of chain 50 on multiple freewheel 52.

Figure 39:
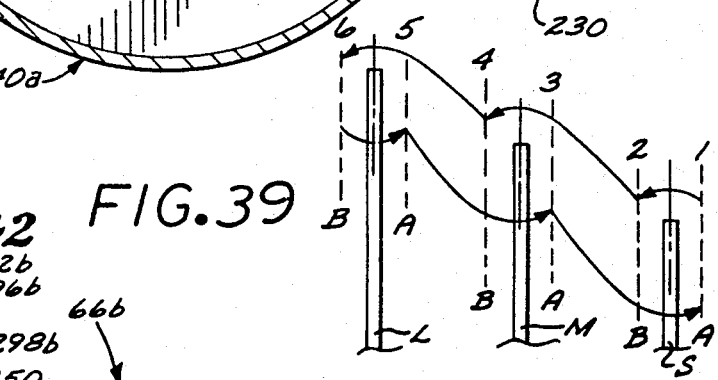
FIG. 39 is a diagrammatic view illustrating sequences of down-shifting and up-shifting events for a three-chain ring front derailleur mechanism.
Figure 40:
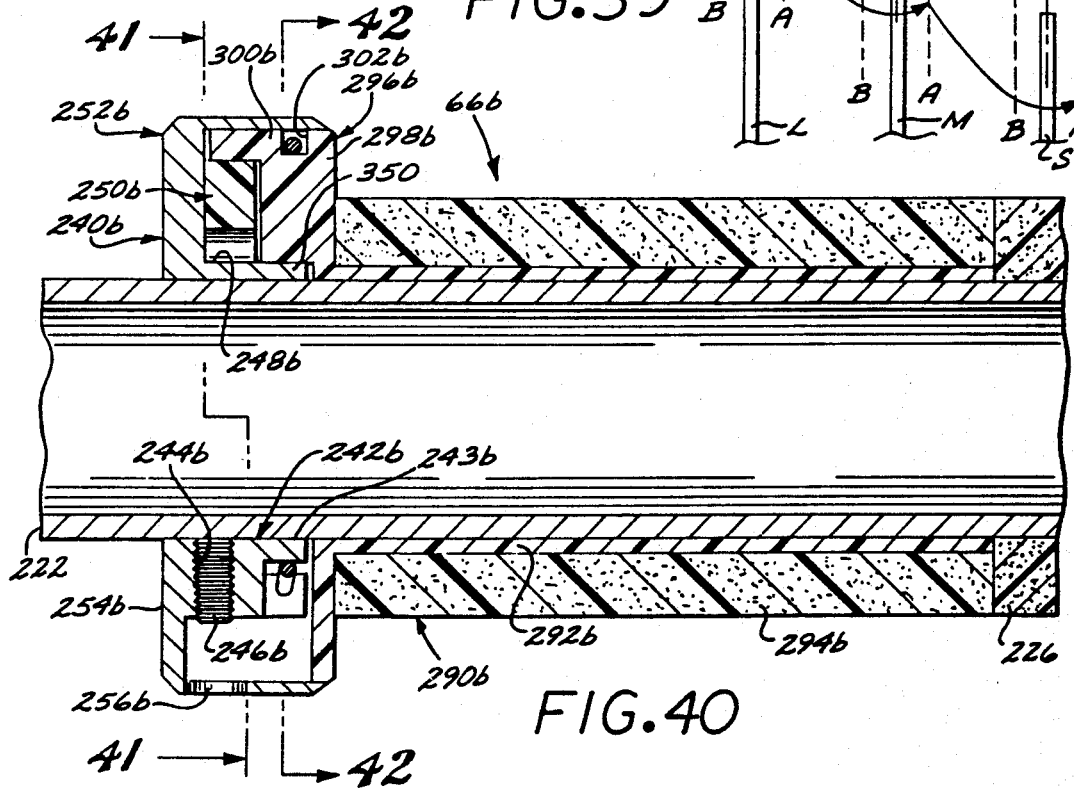
FIG. 40 is a view similar to FIG. 21 for a second shovel cam form of rear derailleur actuator according to the invention.

FIG. 39 diagrammatically illustrates sequences of down-shifting and up-shifting events for a three chain ring front derailleur system. In FIG. 39 the upper series of curving arrows represents three down-shifting events, while the lower series of curving arrows represents three up-shifting events. Looking from right to left in FIG. 39, at the right-hand side is the smallest of the three front derailleur chain rings; in the middle is the middle or intermediate size chain ring; and at the left side is the large chain ring. These are designated S, M and L, respectively, in FIG. 39. Vertical dotted lines bracket each of these three chain rings S, M and L, indicating each of the two chain positions available to the rider for each of the three chain rings S, M and L.

At the top of FIG. 39, numbers 1 and 2 indicate the two optional chain positions on opposite sides of the small chain ring, numbers 3 and 4 indicate the two optional chain locations on opposite sides of the middle chain ring, and numbers 5 and 6 indicate the two optional positions on opposite sides of the large chain ring. At the bottom of FIG. 39, positions 1 and 2 are also marked A and B, positions 3 and 4 are also marked A and B, and positions 5 and 6 are also marked A and B. A represents the up-shifted location of spring 250a illustrated in FIGS. 34 and 38, while B illustrates the down-shifted position of spring 250a illustrated in FIGS. 35-37.

In a down-shifting sequence, chain 50 will start at either position 1 or position 2, with the starting position of spring 250a at either respective position A or B, according to rider adjustment to avoid chain rasp. If the chain is in position 1, and spring 250a in position A, the first increment of movement in a down-shifting event will be from position 1 to position 2, moving the spring from its position A to its position B. The middle upper arrow indicates movement from position 2 to position 4, indicating overshift lateral chain movement from small chain ring S to middle chain ring M, with an overshift increment of movement of the chain beyond middle chain ring M to position 4, which is enabled by shifting of spring 250a to its B position. Further down-shifting to large chain ring L is indicated by the left-hand upper arrow and similarly involves an overshift increment to the position 6, wherein spring 250a is in its position B.

In any of these three chain ring locations, small, middle or large, front shift actuator rotator 290a can be rotationally adjusted to place spring 250a in either of its detented locations A or B to avoid chain rasp, which is generally determined by the sprocket of rear multiple freewheel 52 upon which the chain is located at the time. Thus, chain 50 may optionally be located in either position 1 or 2 for the small chain ring S, position 3 or 4 for the middle chain ring M, or position 5 or 6 for the large chain ring L.

Up-shifting from large chain ring L through middle chain ring M to small chain ring S leaves these same anti-chain rasp options. At the start of a series of up-shifting events, the chain will be in either position 6 or position 5, with detent spring 250a correspondingly in either respective position B or position A. If in position 6/B, the first increment of movement of front derailleur shifter 60 will move the chain to position 5 and detent spring 250a to position A. Continuing up-shifting movement of shifter rotator 290a will shift the chain laterally inwardly from large chain ring L past the position 4/B to the position 3/A for positive shifting of the chain onto middle chain ring M; and further up-shifting rotation of handgrip rotator 290a will then shift the chain past position 2/B to position 1/A for positive shifting of chain 50 onto small chain ring S.

Thus, in both the down-shifting and up-shifting directions, overshift is automatically provided for by detented rotational shifting of spring 250a on mandrel 242a, and in each shifting event the rider is left with the option of selecting two chain positions which are slightly on opposite sides of the respective three chain rings so as to assure the ability to eliminate chain rasp.

SECOND SHOVEL CAM FORM OF REAR DERAILLEUR HANDGRIP SHIFT ACTUATOR 66b

FIGS. 40-43 illustrate a second shovel cam form of rear derailleur handgrip shift actuator, generally designated 66b, wherein the detent spring has a fixed spring rate for both down-shifting events working against the derailleur return spring and up-shifting events working with the derailleur return spring. In this second form of rear derailleur handgrip shift actuator 66b shown in FIGS. 40-43, the primary means for compensation of the difference in rear derailleur return spring force between down-shifting and up-shifting events is a difference in the angles of inclination of the opposite sides of the actuator spring detent notches. The actuator spring notches can be angled to suit any prior, present or future rear derailleur mechanism to compensate for the higher derailleur return spring force during down-shifting than during up-shifting, and also to fine-tune the shifting for each of the sprockets of rear multiple freewheel 52. The detent spring in the second form of the invention presently to be described rotationally shifts to different locations between down-shifting and up-shifting in the same manner as the detent spring in the first form derailleur actuator shown in FIGS. 19-31 so as to provide compensation for lost motions or "slop" in the rear derailleur cable system and rear derailleur mechanism, as well as to provide an overshift increment of movement of the rear derailleur control cable.

Rear derailleur shift actuator 66b of FIGS. 40-43 is constructed the same and has the same mode of operation as rear derailleur shift actuator 66 shown in FIGS. 19-31, except only for the configurations of the detent spring member, mandrel arcuate recess for the detent spring member, and the side slopes of the spring detent notches in the handgrip rotator.

Thus, rear derailleur shift actuator 66b includes a generally circular body 240b adapted to be fixedly secured to the right-hand part of handlebar 222 inboard of the right-hand fixed handlebar grip 226. Actuator body 240b includes an inner mandrel portion 242b having an annular central opening 243b which allows it to fit over handlebar 222. A threaded radial bore 244b in mandrel 242b receives a set screw 246b, preferably an allen wrench screw, which locks mandrel 242b fixedly on handlebar 222.

Radially outwardly facing arcuate recess 248b in mandrel 242b receives generally complementary arcuate spring member 250b, which is preferably made of a tough, resilient resin such as a Delrin, but which could be made of other suitable resin or a spring metal material.

Fixed body 240b also includes outer cowling portion 252b which is integral with and extends radially outwardly from mandrel 242b, and includes generally flat radial portion 254b and outer cylindrical flange portion 256b. Cable guide tube 258b is structurally and operationally the same as cable guide tube 258 best shown in FIG. 20.

Arcuate recess 248b in mandrel 242b differs from the corresponding arcuate recess 248 in the first form of rear derailleur actuating mechanism 66 in that it has an uninterrupted arcuate slip surface 264b which allows for constant spring rate of arcuate spring member 250b. Arcuate recess 248b has generally radially oriented end abutment shoulders 266b and 268b.

Referring now specifically to detent spring member 250b, it has an arcuate body portion 274b which is generally complementary to arcuate recess 248b, and which has ends 275b and 276b. Spring member 250b has only one pair of generally radially inwardly directed feet, which are end feet 277b and 278b. Otherwise, the inner surface of spring body 274b is uninterrupted. Rounded indexing projection 284b projects generally radially outwardly from spring body 274b, generally centrally located between ends 275b and 276b of spring body 274b.

OUTER HANDGRIP ROTATING PORTION OF REAR HANDGRIP SHIFT ACTUATOR 66b

The rotating portion of the second form of rear handgrip shift actuator 66b is generally designated 290b, and is the same in both structure and operation as the rotator 290 for the first form of rear handgrip shift actuator 66, with two exceptions. First, its spring detent notches have shallower angles of inclination on their down-shifting sides than on their up-shifting sides so as to compensate for the higher rear derailleur return spring loading in the down-shifting direction. Second, cable slide section 304 of actuator 66 has been replaced by a fixed cable-wrap flange, as described in detail below. Thus, handgrip rotator 290b includes an elongated cylindrical body 292b rotatably supported on handlebar 222 immediately inboard of a fixed right grip 226, which axially locates body 292b on handlebar 222 in the outboard direction. A foam rubber or neoprene grip 294b is fixedly mounted around rotatable cylindrical body 292b for radially enlarged and comfortable hand actuation of rotating portion 290b.

A cable actuating flange structure generally designated 296b extends generally radially outwardly from the axially inner end of cylindrical body 292b (relative to the end of handlebar 222). Cable actuating flange structure 296b includes radially oriented disk portion 298b and outer cable actuating section 300b. Cable actuating section 300b includes a cable cam groove 302b which is preferably the same as cable cam groove 302 of the first form of rear handgrip shift actuator 66, including similarly contoured shovel cam 306b having a transitional entry portion 308b, a cam ramp portion 310b and a cam lobe portion 312b.

In the shift actuator form 66b, inner support mandrel 242b includes a fixed axial flange 350 directed toward the handlebar end and radially immediately adjacent handlebar 222. This fixed axial flange 350 replaces cable slide section 304 of rotating handgrip portion 290 of the first form 66 of rear derailleur actuator. Thus, the also-fixed end portion of cable 236 wraps around fixed flange tube 350 before it enters cable cam groove 302b, which eliminates any rubbing of the cable end portion as was characterisic of the sliding contact between the cable end portion and the cable slide portion 304 of handgrip rotator 290 of the first form of derailleur actuator 66.

Continuing with cable actuating flange stucture 296b, it includes a generally semi-circular detent section 314b which has a series of spaced, generally radially inwardly opening spring detents 322b, seven of these being shown in FIG. 41 to accommodate seven sprockets of a multiple freewheel 52, the rounded spring indexing projection 284b being successively received in these detent notches 322b. Each of spring detent notches 322b has a relatively shallow angle of inclination for addressing rounded spring indexing projection 284b on its cable pulling side 360, as for example approximately 30°, and has a relatively steep angle of inclination for addressing the rounded indexing projection 284b on its cable release side 362, as for example approximately 60°. This difference between the angles of inclination on the cable pulling sides 360 of detent grooves 322b and the cable release sides 362 of spring detents 322b substantially equalizes the difference in the amount of force exerted by the rear derailleur cable return spring between cable pulling and cable releasing for respective down-shifting movements of actuator 66b and up-shifting movements of actuator 66b. As best seen in FIG. 43, rounded spring indexing projection 284b has an included angle that is somewhat less than 60° to accommodate an approximately 60° angle of inclination for cable release sides 362 of spring detents 322b. Thus, the cable release side of indexing projection 284b is somewhat less than approximately 30°. If desired, the cable pulling side of rounded indexing projection 284b could have a greater included angle, although somewhat less than 60°.

The cable end within shifter 66b terminates with an end bead 328b seated in a cable end bracket 324b, and these may be the same as end bead 328 and end bracket 324 shown and described with the first form of rear handgrip shift actuator 66; alternatively, the cable end may be brought to the outside of cowling 252 through a hole in cowling disk 254b, with the cable end bead located externally.

Figure 44:
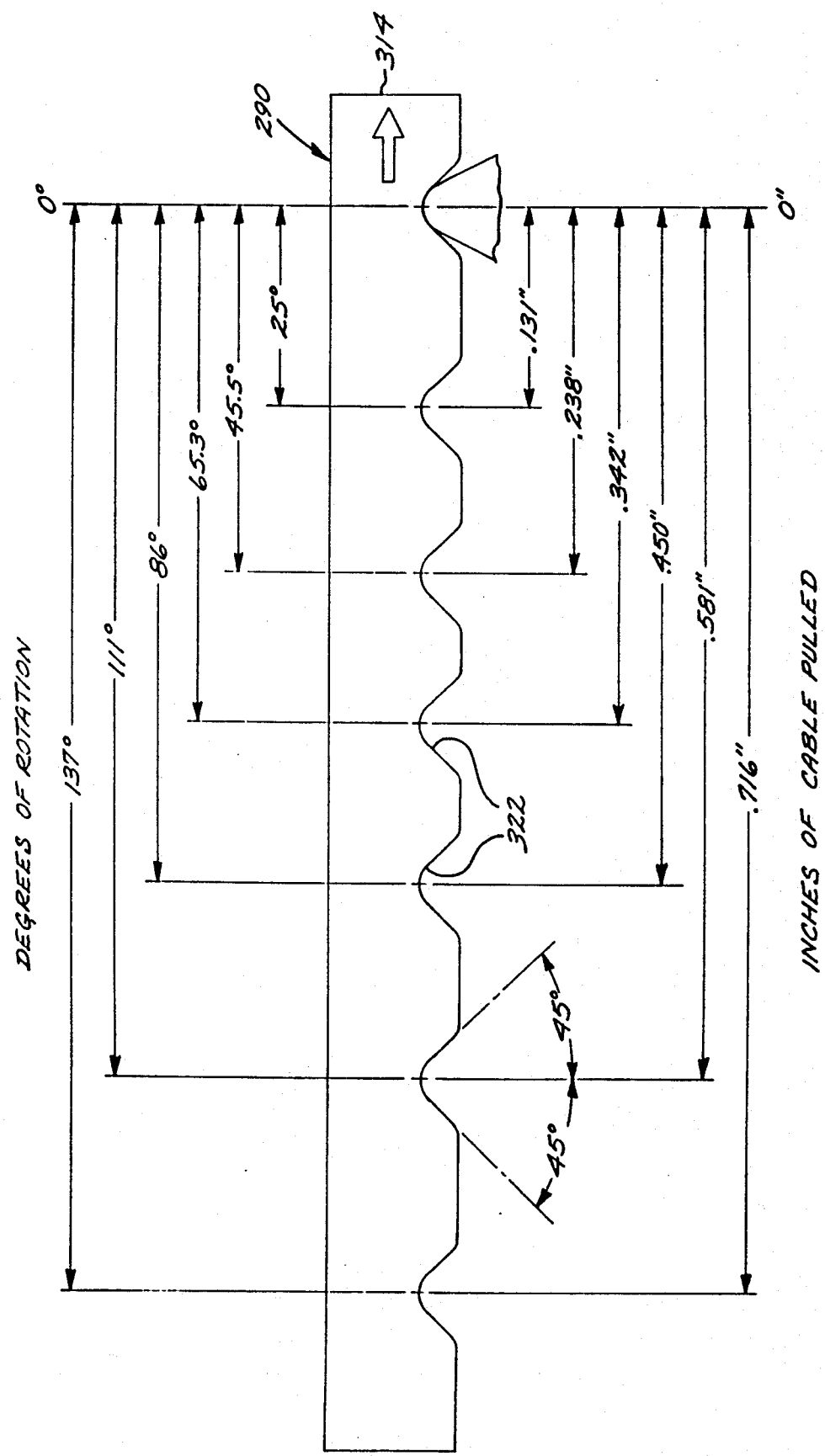
FIG. 44 is a laid-out diagrammatical view which illustrates the detenting arrangement, and representative cable pulling extents and corresponding handgrip actuator rotational extents for the first shovel cam form of rear hand actuator illustrated in FIGS. 19-31.

FIG. 44 is a diagrammatic illustration of the detent section 314 of rotator 290 for rear handgrip actuator 66, giving representative values for the amount of cable pulled and the number of degrees of rotation of handgrip rotator 290 for the various detents 322. In FIG. 44 detent section 314 of handgrip rotator 290 has been laid out flat for clarity and understanding.

Figure 45:
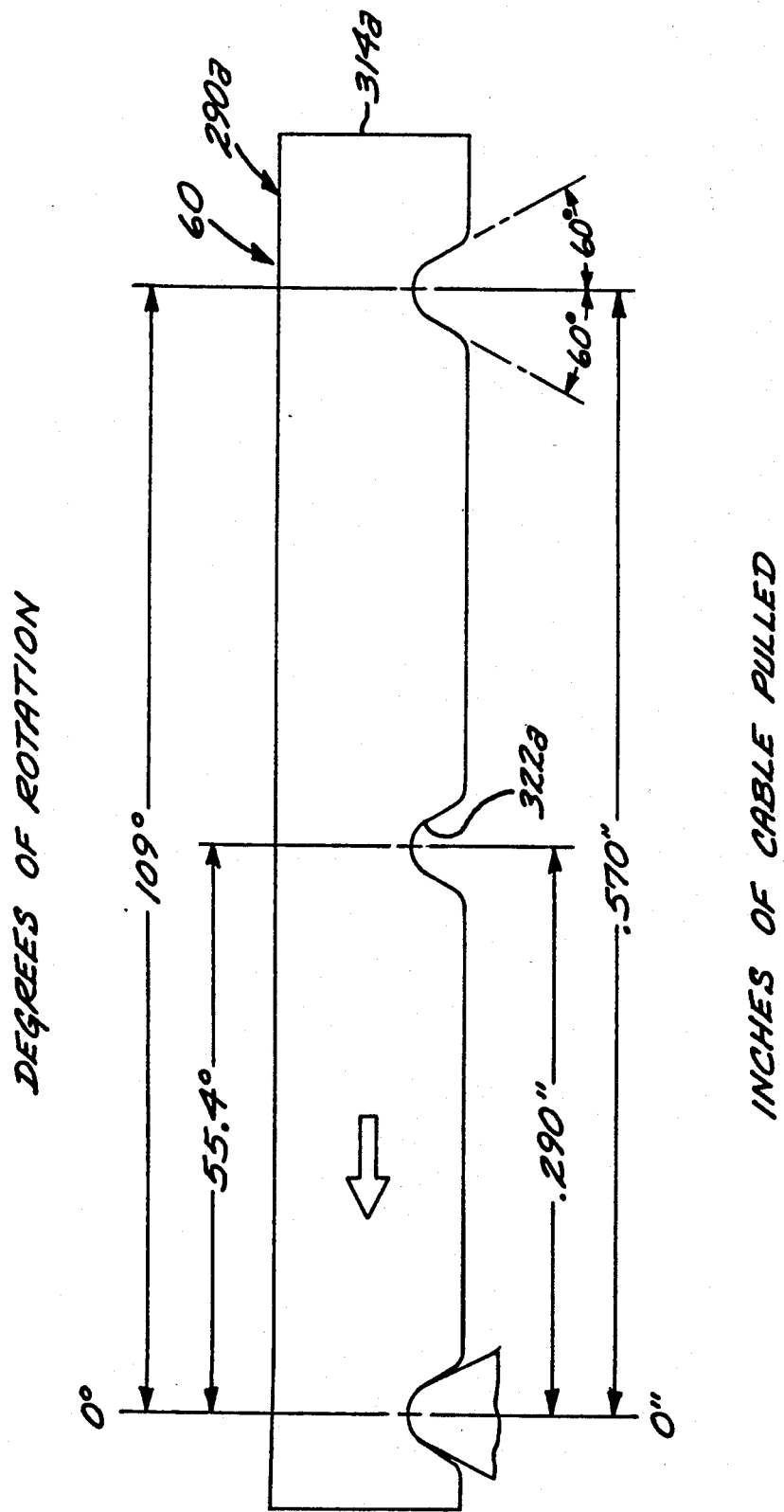
FIG. 45 corresponds with FIG. 44 with respect to the front derailleur shift actuator illustrated in FIGS. 32-39.

FIG. 45 is a view similar to FIG. 44 but for detent section 314a of rotator 290a for front derailleur shift actuator 60, also indicating representative amounts of cable pull and degrees of rotation for the various detents 322a.

JACK SPOOL FORMS OF HANDGRIP SHIFT ACTUATOR

The following description of the jack spool forms of handgrip shift actuator according to the invention will be prefaced by a brief review of the "shovel cam" forms of the invention so that the differences between the jack spool forms and the shovel cam forms can best be appreciated in the following Detailed Description.

The first shovel cam form of handgrip shift actuator according to the present invention is illustrated in FIGS. 19-39, and utilizes a cam lobe which directly slideably pulls and releases the derailleur control cable to effect respective down-shifting and up-shifting, the cable having its handgrip shifter end fixedly secured in the shifter body that is stationary relative to the handlebar. The first shovel cam form had a thin cylindrical "slide" section that rotated with the cam lobe and added a small amount of sliding friction to a larger amount of sliding friction between the cam lobe and the cable.

The second shovel cam form illustrated in FIGS. 40-43 differs from the first shovel cam form in that the slide section of the shovel cam and its small amount of cable friction are eliminated by laying the fixed end portion of the cable around a thin fixed tube.

Both of these shovel cam forms of the invention required that the cable exit the shifter body at a substantial angle relative to the common axis of the handlebar and shift actuator, adding further friction of the actuator cable exit structure to the derailleur shifter cable. Despite these regions of cable friction, which all represent relatively low amounts of friction, the shovel cam forms of shift actuator function excellently, and far better than most prior art bicycle derailleur shifters.

The forms of handgrip shift actuator presently to be described are illustrated in FIGS. 46-74, and are referred to by applicants as their "jack spool" handgrip shift actuators. As will be appreciated from the following description and accompanying drawings, the jack spool arrangement is intrinsically a very low friction apparatus. It eliminates cable sliding friction in the conversion of handgrip rotary motion to cable translation movement, and enables the cable to exit the shifter body at any desired angle, preferably generally parallel to the handlebar, which substantially eliminates cable exit friction.

Figure 46:
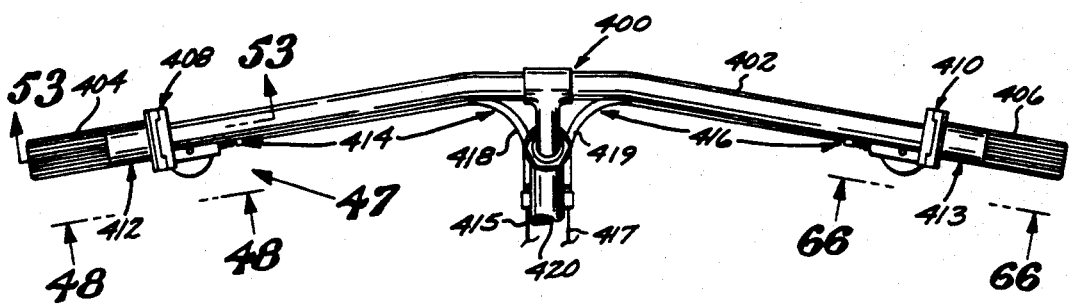
FIG. 46 is a fragmentary elevational view similar to FIG. 19 showing the handlebar end portion of a mountain bike embodying a first jack spool form of front and rear handgrip shifting mechanisms of the present invention.
Figure 47:
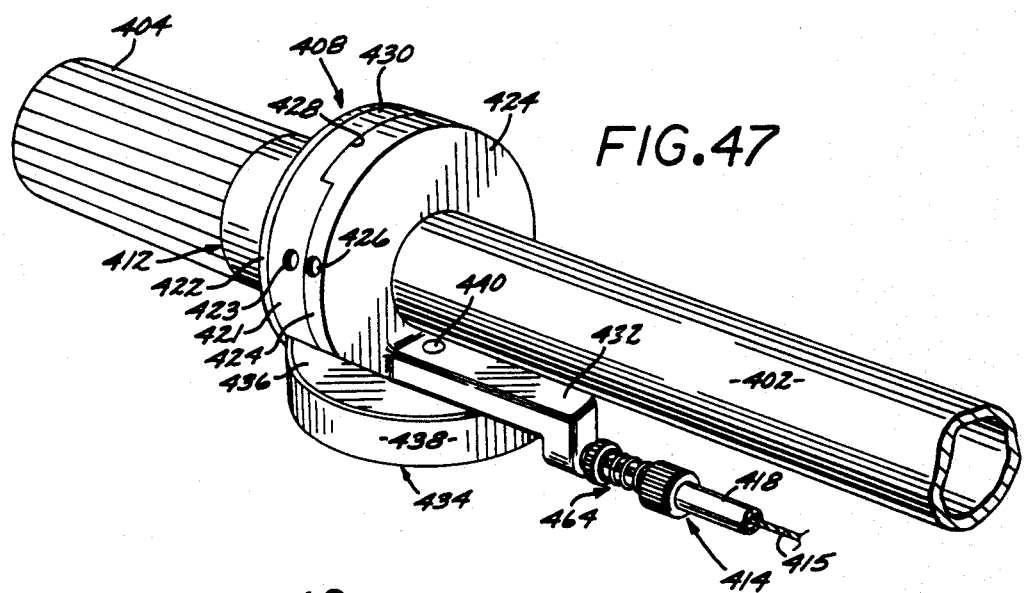
FIG. 47 is an enlarged fragmentary perspective view taken in the region generally designated 47 in FIG. 46, illustrating and left end portion of the handlebar and the front jack spool handgrip shift actuator mounted thereon.

FIG. 46, like FIG. 19, illustrates the front end portion of a "mountain bike" which is generally designated 400, having a widespread handlebar 402 that angles slightly rearwardly. Conventional fixed left and right grips 404 and 406, respectively, are located on the ends of handlebar 402. The front derailleur handgrip shift actuator is generally designated 408, and is engaged over handlebar 402 immediately inboard of left fixed grip 404. The rear derailleur handgrip shift actuator is generally designated 410, and is engaged over handlebar 402 immediately inboard of right fixed grip 406. Front derailleur shift actuator 408 includes a shifter rotator generally designated 412, while rear derailleur shift actuator 410 includes a shifter rotator generally designated 413. The exposed portions of these respective rotators 412 and 413 are preferably covered with foam rubber or foam neoprene for good grip and comfortable shifting.

The front derailleur control cable system which connects the front handgrip shift actuator to the front derailleur mechanism is generally designated 414, and includes front derailleur control cable 415. The rear derailleur control cable system is generally designated 416, and includes rear derailleur control cable 417. Front derailleur cable system 414 is preferably the same system as that employed on a bicycle 10 shown in FIG. 1, with front cable housing or casing 418 terminating at an adjustment barrel arrangement like that shown in FIG. 5, front derailleur control cable 415 extending down alongside main downtube 420 and riding under the bottom bracket as shown in FIGS. 3 and 4, and with substantially compressionless cable housing like that shown in FIGS. 6 and 7.

The rear derailleur controller cable system 416 also includes forward cable housing or casing 419, and a rearward cable housing like that seen in FIGS. 1 and 2. Rear derailleur control cable system 416 is preferably the same as rear derailleur cable system 62 shown in FIGS. 1-7 and described in detail above in connection with those figures.

FRONT DERAILLEUR JACK SPOOL SHIFT ACTUATOR

FIGS. 47-65 illustrate details of structure and operation of a first "jack spool" form of the invention in connection with front derailleur handgrip shift actuator 408 proximate the left end portion of handlebar 402. These details of structure and operation are generally the same for rear derailleur handgrip shift actuator 410 shown in FIGS. 66-69, with the exception that the mechanism of front derailleur shift actuator 408 shown in detail in FIGS. 47-65 has three detents corresponding to the three front derailleur chain rings, while rear derailleur shift actuator 410 of FIGS. 66-69 has seven detents corresponding to seven rear derailleur freewheel sprockets. Additionally, there can be some fine-tune variations in the detent spacings for the various sprockets, and this is more frequently appropriate for rear derailleur shift actuator 410 than for front derailleur shift actuator 408.

CABLE PULL/RELEASE DRIVE SYSTEM FOR FRONT DERAILLEUR SHIFT ACTUATOR 408

Front derailleur shift actuator 408 includes a generally circular main body 421 which is locked to handlebar 402 by means of a set screw 423. An outboard cover plate 422 for main body 421 is supported on rotor 412, as best seen in FIG. 53. A generally circular jack spool support ring 424 is generally flush against main body 421 on the inboard side of main body 421. Jack spool support ring 424 is locked to handlebar 402 by means of a set screw 426. Rotational interlock is provided between body 421 and jack spool support ring 424 by means of an arcuate locator recess 428 in body 421 which receives a complementary arcuate locator projection 430 in support ring 424. Such rotational interlock is important because there is much more relative rotational force between main body 421 and support ring 424 than there is axial force on either or both of body 421 and support ring 424 relative to each other and to handlebar 402.

A jack spool support bar 432 is integral with jack spool support ring 424, extending from support ring 424 in the inboard direction generally parallel to handlebar 402, and generally on the opposite peripheral side of handlebar 402 relative to support ring locator projection 430. The jack spool itself is generally designated 436, and is first seen in some detail in FIGS. 49 and 50. It includes a housing 438. Jack spool 436 is pivotally mounted on generally flat side 433 of support bar 432 by means of a pivot bolt 440 which has a washer 442. Thus, jack spool 436 is substantially parallel to support bar 432 and handlebar 402 which, as will be seen in subsequent views, enables front derailleur actuator cable 415 to emerge tangentially from jack spool 436 substantially parallel to handlebar 402, which is the most desirable anti-friction exit direction for cable 415. The general planar direction of jack spool 436 is at right angles to the general planar directions of main body 421 and support ring 424.

Jack spool 436 may be peripherally positioned at any desired location around handlebar 402, so as to best suit the layout of cable system 414 and the rider. A presently preferred peripheral location of jack spool 436 on handlebar 402 is best visualized in FIG. 46. In this location of jack spool 436, relative to front end portion 400 of the bike, it is forward of handlebar 402 with its axis of rotation slightly below handlebar 402, and its planar direction is generally vertically oriented.

Figure 51:
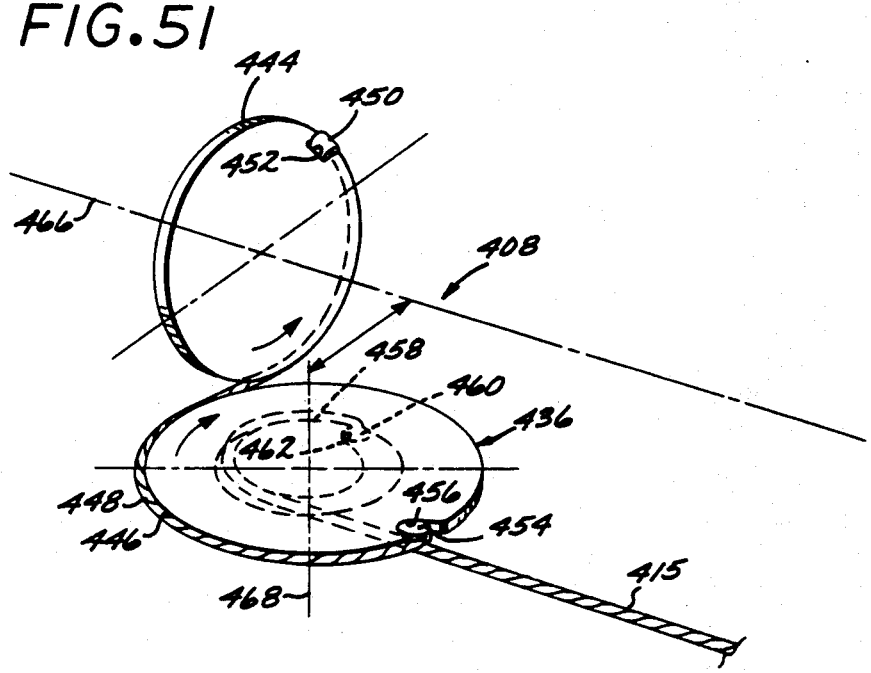
FIG. 51 is a simplified schematic perspective view illustrating the relationship between the handgrip rotator and the jack spool, with arrows indicating a down-shifting control cable takeup mode of operation.
Figure 52:
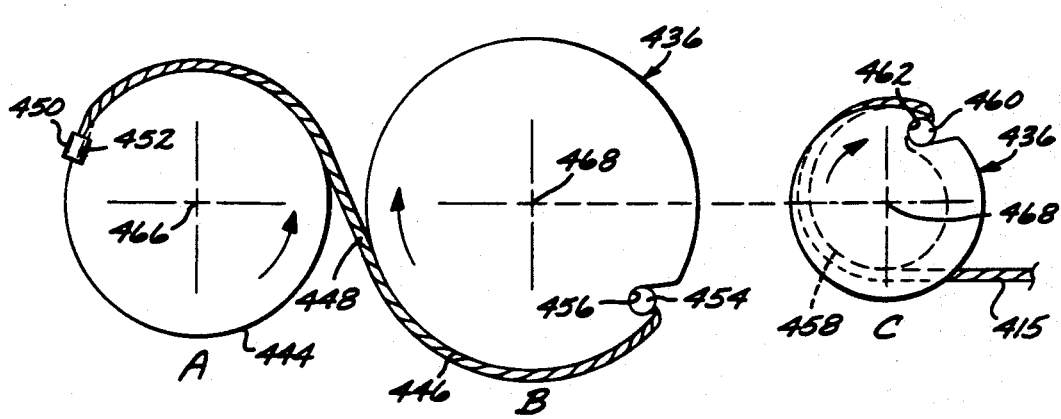
FIG. 52 is another simplified schematic view, this time with the handgrip rotator and jack spool laid out in flat plan, with the short cable-driven portion of the jack spool separated from the control cable drive portion of the jack spool, with the directional arrows again indicating a down-shifting takeup mode of operation.
Figure 58:
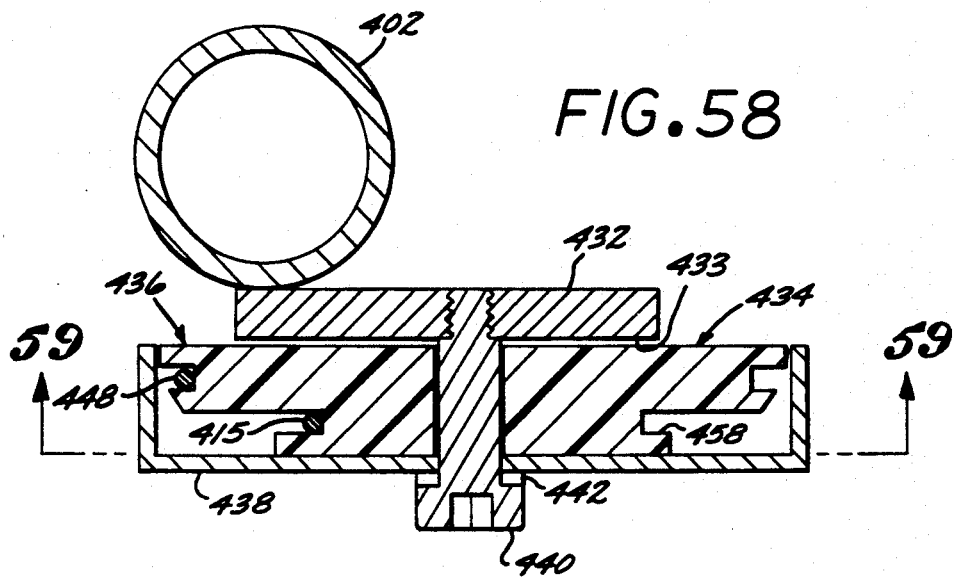
FIG. 58 is a further enlarged sectional view taken on the line 58—58 in FIG. 48, the section being axial relative to the jack spool and transverse relative to the handlebar, illustrating details of construction of the jack spool and placement of the short drive cable and derailleur control cable thereon.

A front derailleur handgrip drive pulley 444 is mounted on the inboard end of front derailleur shifter rotator 412 for rotation with rotator 412. Drive pulley 444 is shown in FIGS. 49-53 and 60-65. Jack spool 436 has a circular arc input cable groove 446 seen in FIGS. 49-52 and 58-65. A short jack spool drive cable 448 is connected at one end to actuator rotator drive pulley 444, and at its other end to jack spool 436. Drive cable 448 has an end bead that seats in a notch 452 in handgrip drive pulley 444, as seen in FIGS. 49, 51, 52 and 60-65. A similar cable end bead 454 on the other end of drive cable 448 seats in a notch 456 in jack spool 436, as seen in FIGS. 51, 52 and 59.

Figure 59:
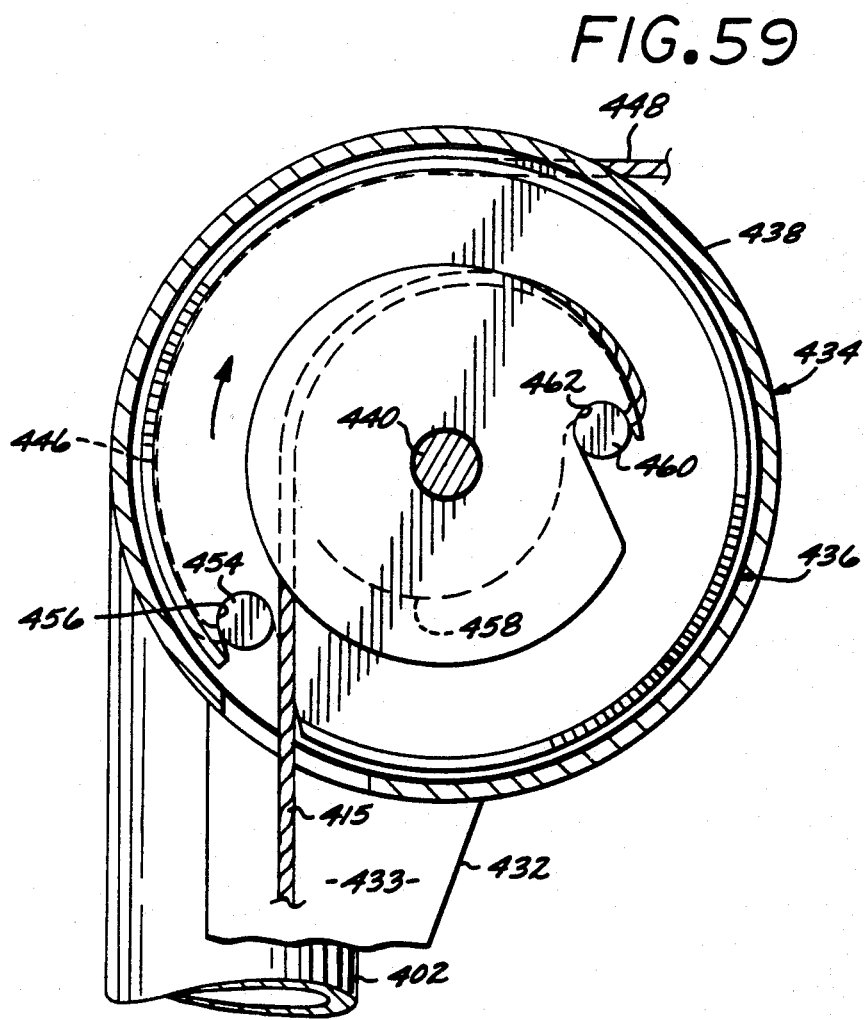
FIG. 59 is a fragmentary sectional view taken on the line 59—59 in FIG. 58, with the jack spool itself being shown in elevation, particularly illustrating the relationship between the jack spool and the rotator-driven short cable on the one hand, and the jack spool and the derailleur control cable on the other hand.

Front derailleur control cable 415 engages in a jack spool output cable groove 458, and has an end bead 460 which seats in a notch 462 in jack spool 436, as diagrammatically illustrated in FIGS. 51 and 52, and as shown structurally in FIG. 59. Output cable groove 458 has a nautilus cam configuration which provides progressively increasing cable pulling force during down-shifting events so as to compensate for progressively increasing derailleur return spring force, as described in detail hereinafter in the section describing the mode of operation of front derailleur shift actuator 408.

To assist in visualizing the relative orientations of the rotational axes of handgrip rotator drive pulley 444 and jack spool 436, in FIGS. 49-52 the rotator drive pulley centerline has been designated 466 and the jack spool centerline has been designated 468.

FIG. 53 illustrates an outboard cylindrical sleeve portion 470 of fixed main body 421, and an overlapping outboard cylindrical sleeve portion 472 of shifter rotator 412. These sleeve portions 470 and 472, and hence the entire handgrip shift actuator 408, are restrained from outboard movement by an outboard retainer ring 474 engaged around handlebar 402 and coupled to handlebar 402 by means of a set screw 476.

DETENTING SYSTEM FOR FRONT DERAILLEUR SHIFT ACTUATOR 408

Figure 62:
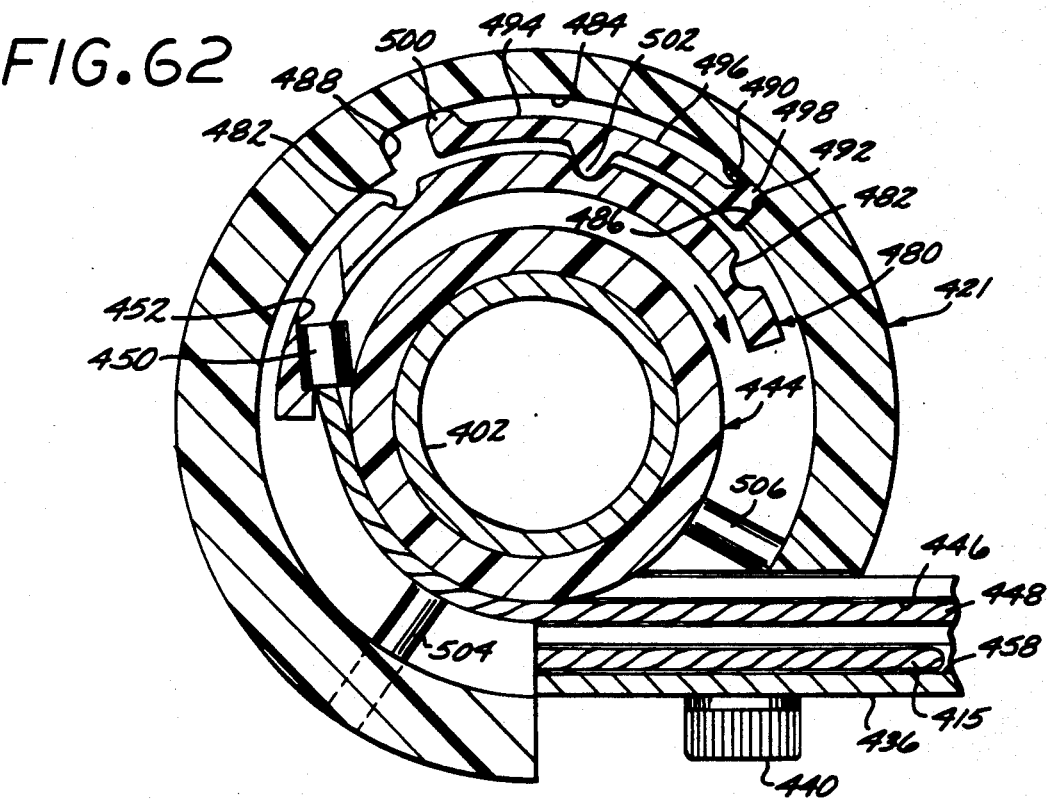
FIG. 62 illustrates a second clockwise down-shifting increment of rotation of the shifter rotator in which the front derailleur mechanism has been moved sufficiently to place the chain on the intermediate chain ring.
Figure 63:
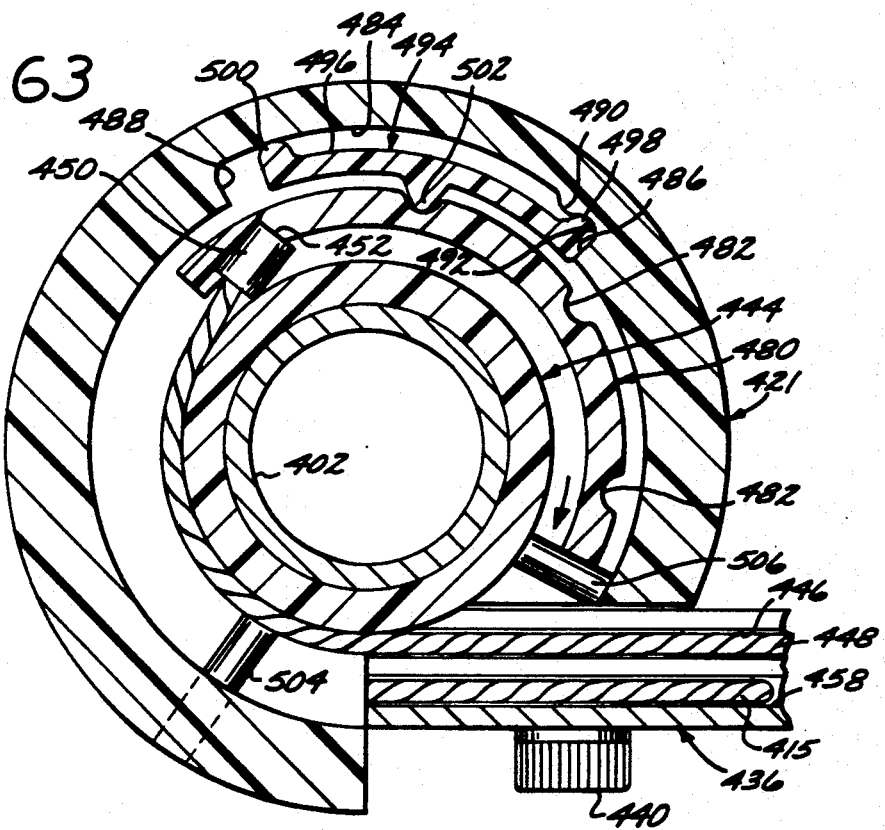
FIG. 63 illustrates a final clockwise down-shifting increment of movement of the shifter rotator and its detent structure to place the chain on the large chain ring, this completing the down-shifting sequence of events.

FIGS. 60-65 illustrate a detenting system for front derailleur handgrip shift actuator 408 which is adapted to accommodate a three-chain ring front derailleur system, for operative location of the chain on each of the three chain rings, for takeup and release of various lost motions in the front derailleur system and its cable system, and for providing takeup and release of chain overshift. FIG. 60 illustrates the front derailleur detenting system in its fully up-shifted position with the chain on the smallest of the three chain rings, and with the lost motions and overshift released. This is the most counterclockwise position of front derailleur shifter rotator 412 in the sequence of views in FIGS. 60-65. A down-shifting event from the relaxed, smallest chain ring position of FIG. 60 is illustrated in FIGS. 61-63, and involves clockwise rotation of front derailleur handgrip shift rotator 412 from the position of FIG. 60 to the position of FIG. 63. This corresponds to overhand movement of the top of front derailleur shifter rotator 412 toward the rider as viewed in FIG. 46, which is the most comfortable and natural rotational mode for down-shifting, particularly in view of the relatively large down-shifting force required from the rider. Upshifting from the largest chain ring to the smallest chain ring is illustrated in FIGS. 64 and 65, and involves counterclockwise rotation of shifter rotator 412 as viewed in FIGS. 64 and 65, with the top portion of rotator 412 moving overhand and away from the rider as viewed in FIG. 46.

The front derailleur actuator detenting system includes as a primary component an arcuate detent structure 480 which is integral with rotator 412. Detent structure 480 is seen in detail in the transverse sectional views of FIGS. 60-65, with a small axial sectional illustration of detent structure 480 being seen in FIG. 53. Three spaced, radially outwardly facing detent notches 482 are provided in arcuate detent structure 480. For front derailleur rotator 412, these detent notches 482 are normally regularly or uniformly spaced, but may, if desired, be relatively spaced from each other slightly differently from regular spacing for fine-tune accommodation of various front derailleur mechanisms.

A radially inwardly facing, elongated, arcuate spring recess 484 is provided in fixed main body 421. Arcuate spring recess 484 is radially outwardly spaced from arcuate detent structure 480, and is in general axial registry with detent notches 482. Spring recess 484 has a radially oriented right-hand or clockwise end shoulder 486 as viewed in FIGS. 60-65, which provides an end stop for the detent spring (described hereinafter) during down-shifting cable pulling. A similar radially oriented opposite end shoulder 488 at the left-hand or counterclockwise end of spring recess 484 as viewed in FIGS. 60-65 provides a stop for the detent spring during up-shifting. Rounded dimple or nub 490 projects radially inwardly from the bottom of spring recess 484 spaced slightly to the left or counterclockwise of shoulder 486, so that a radially inwardly facing, rounded recess 492 is provided as a part of spring recess 484 between dimple 490 and shoulder 486.

The detent spring is generally designated 494. It is a leaf spring that includes an elongated, arcuate spring body 496 which is disposed in arcuate spring recess 484, being generally complementary to spring recess 484. The arcuate outer surface of detent spring body 496 is spaced radially inwardly from the bottom surface of spring recess 484 (i.e., the radially outward surface of spring recess 484) to accommodate radial bending of spring body 496 during the detenting function. This radial spacing between the opposing surfaces of spring recess 484 and spring body 496 is provided by radially outwardly directed, rounded end feet 498 and 500 on detent spring 494, end feet 498 and 500 leaving most of the length of elongated spring body 496 spaced radially inwardly from the bottom surface of spring recess 484, and thus providing the space necessary between spring body 496 and main fixed body 421 to allow for radially outward flexing of spring body 496 during shifting between detent notches 482 in arcuate detent structure 480. Detent spring 494 includes a rounded detenting projection 502 which projects radially inwardly from an intermediate location on elongated spring body 496. Detenting projection 502 is normally biased radially inwardly by spring 494 into a detenting position in one of the three detent notches 482 in structure 480 as seen in each of FIGS. 60-65, and during shifting rides along the radially outer arcuate surface of detent structure 480 between detent notches 482.

A radially oriented up-shifting stop post 504 is fixedly secured in main body 421, extending radially inwardly from the shell of body 421 into the path of rotation of arcuate detent structure 480 so that stop post 504 is encountered by arcuate detent structure 480 in its fully up-shifted, most counterclockwise rotational position as seen in FIG. 60. Thus, up-shifting stop post 504 stops detent structure 480 and shifter rotator 412 in their fully up-shifted positions as seen in FIG. 60. A similar down-shifting stop post 506 is fixedly mounted in main body 421, extending inwardly from the shell of body 421 so as to stop arcuate detent structure 480 and shifter rotator 412 in the fully down-shifted, most clockwise position as shown in FIG. 63.

CABLE PULL/RELEASE MODE OF OPERATION OF FRONT HANDGRIP SHIFT ACTUATOR 408

The mode of operation of front derailleur handgrip shift actuator 408 will be considered in three phases: (1) operation of the connection between shifter rotator 412 and jack spool 436 through the short drive cable 448 for takeup and release of front derailleur control cable 415; (2) operation of the detenting system between shifter rotator 412 and fixed main body 421 for location of the bicycle chain relative to the three front derailleur chain rings; and (3) fine-tuning to avoid chain rasp in general, and during crossover riding.

The first phase of operation, which involves the pull and release connection between shifter rotator 412 and jack spool 436, is best illustrated in FIGS. 49-52, 58 and 59, but is also seen in part in FIGS. 60-65. FIGS. 51, 52 and 59 are of particular importance in that they illustrate the nautilus cam shape of jack spool output cable groove 458 which progressively provides increasing torque that compensates for the increasing opposing force of the front derailleur return spring in the downshifting direction, and conversely provides progressively decreasing torque that compensates for decreasing opposing force of the derailleur return spring in the up-shifting direction.

Referring primarily to FIGS. 51, 52 and 59, operation of the pull and release drive connection between shifter rotator drive pulley 444 and jack spool 436 will first be considered for the down-shifting direction. FIGS. 51, 52 and 59 illustrate drive pulley 444 and jack spool 436 in a partially down-shifted position. Further down-shifting rotation of rotator drive pulley 444, which is counterclockwise as viewed in FIGS. 51 and 52A, pulls short jack spool drive cable 448 which causes jack spool 436 to rotate clockwise in FIGS. 51 and 52B and C, and in FIG. 59. This produces down-shifting takeup translational movement of control cable 415 as indicated in FIGS. 51, 52C and 59.

Cable release from the partially down-shifted position of FIGS. 51, 52 and 59 for up-shifting is accomplished by rotations of the parts in the opposite direction from the rotational arrows shown in FIGS. 51, 52 and 59; drive pulley 444 being rotated clockwise in FIGS. 51 and 52A, with jack spool 436 being rotated counterclockwise in FIGS. 51, 52B and C, and in FIG. 59.

The nautilus cam shape of jack spool output cable groove 458 (in which front derailleur control cable 415 is guided) is best seen in FIGS. 51, 52C and 59, and is a smooth, continuous curve from a smallest, highest torque tangential control cable exit radius in the lowest gear/largest chain ring position to a largest, lowest torque tangential control cable exit radius in the highest gear/smallest chain ring position. Thus, clockwise rotation of the nautilus-shaped jack spool output cable groove 458 in FIGS. 51, 52C and 59 provides a decreasing radius for increasing down-shifting pulling torque on control cable 415, while counterclockwise rotation of the nautilus-shaped output cable groove 458 in FIGS. 51, 52C and 59 provides an increasing radius for decreasing up-shifting pulling torque on control cable 415.

The nautilus cam configuration of jack spool output cable groove 458 thus substantially fully compensates for and balances out the progressive increase in front derailleur return spring tension during down-shifting from the smallest chain ring to the largest chain ring, and the progressive decrease in front derailleur return spring tension during up-shifting from the largest chain ring to the smallest chain ring.

In terms of the extent of lineal cable movement, front derailleur mechanisms are conventionally set up so that a relatively large amount of lineal cable pull movement is required to down-shift from the smallest chain ring to the intermediate chain ring, and a relatively small amount of lineal cable pull movement is required to down-shift from the intermediate chain ring to the large chain ring, which is just the opposite of the torque requirements to effect such down-shifting. Since the nautilus configuration of jack spool output groove 458 provides much more lineal cable movement between the smallest chain ring and the intermediate chain ring than between the intermediate chain ring and the largest chain ring, the lineal cable movement requirements of the front derailleur mechanism are substantially compensated for by the lineal cable movements provided by the nautilus-shaped jack spool output cable groove 458. This means that the amount of rotational movement of shifter rotator 412 and its drive pulley 444 is approximately the same for the down-shifting increment between the smallest chain ring and the intermediate chain ring as it is for the down-shifting increment between the intermediate chain ring and the largest chain ring (and this while the increasing derailleur return spring tension is fully compensated for by the nautilus configuration of jack spool output cable groove 458). This enables the arcuate spacing between successive detent notches 482 to be generally uniform as seen in FIGS. 60-65, which is most convenient and natural for bicycle rider input, although such spacing may be varied as desired for fine-tune variations to accommodate variations in specific front derailleur mechanisms. The compensation by the nautilus configuration of jack spool output cable groove 458 for the lineal cable movement requirements of the conventional front derailleur mechanism, while at the same time compensating for the front derailleur return spring tension variations, is a truly synergistic cooperation.

It is presently preferred for simplicity in handgrip shift actuator 408 to provide the nautilus cam shape in jack spool output cable groove 458 as shown and described above. The nautilus cam configuration may alternatively be provided in either shift actuator drive pulley 444 or jack spool input cable groove 446, but this would unnecessarily complicate the device which is kept relatively simple by having the peripheries of shift actuator drive pulley 444 and jack spool input cable groove 446 at a constant spacing regardless of their relative rotational positions for different shifting positions.

DETENTING PHASE OF MODE OF OPERATION OF FRONT HANDGRIP SHIFT ACTUATOR 408

The detenting phase of the mode of operation of front handgrip shift actuator 408 will now be described in detail in connection with FIGS. 60-65. Arcuate detenting structure 480 is integral with front derailleur shifter rotator 412 so as to rotate therewith. Arcuate detent structure 480 is shown in its fully up-shifted position in FIG. 60 corresponding to the smallest of the three chain rings, and a complete down-shifting sequence is illustrated between FIG. 60 and FIG. 63. Detent structure 480 is shown in its most counterclockwise position in FIG. 60, and is shifted clockwise as indicated by the rotational arrows in FIGS. 60-63 from this fully up-shifted position of FIG. 60 to its most clockwise, fully down-shifted position of FIG. 63 corresponding to the largest of the three chain rings. During such down-shifting rotational movement of detent structure 480, short jack spool drive cable 448 is pulled by shifter rotator 412 on drive pulley 444 through cable end bead/drive notch connection 450/452 synchronously with the rotational movement of arcuate detent structure 480. Main body 421, within which detent spring 494 is internally recessed, remains fixed for all detenting positions.

In the fully up-shifted, most counterclockwise position of arcuate detent structure 480, detent spring 494 is in its left-hand, counterclockwise position as viewed in FIG. 60, having been brought to this position during previous up-shifting by engagement of spring detenting projection 502 in the most counterclockwise of the three detent recesses 482, as seen in FIG. 64. Thus, in the position of FIG. 60, the left end of detent spring 494 abuts against end shoulder 488 in body 421, and the right-hand end foot 498 of spring 494 is located on the left-hand or counterclockwise side of body dimple 490. In FIG. 60 spring detenting projection 502 is located in the most clockwise of the three detenting notches 482.

DOWN-SHIFTING

The first increment of down-shifting clockwise movement of detent structure 480 is shown between FIG. 60 and FIG. 61, and is defined and limited by clockwise or right-hand shifting of detenting spring 494 during which spring end foot 498 rides over body dimple 490 into body recess 492, where such shifting of spring 494 is stopped by engagement of the right-hand or clockwise end of spring 494 against body end shoulder 486. Engagement of spring detenting projection 502 in the most clockwise detent notch 482 is prioritized by being stronger or more secure than the more rounded and less deep engagement of spring end foot 498 against body dimple 490. Thus, in the first shifted increment position shown in FIG. 61, although spring 494 has shifted to its most clockwise position, detent structure 480 has not rotationally shifted relative to spring 494. This first shifting increment from FIG. 60 to FIG. 61 pulls jack spool drive cable 448, and hence front derailleur control cable 415, sufficiently for control cable 415 to take up any lost motions or slack in the front derailleur mechanism and its control cable system 414 and, more importantly, pulls control cable 415 to an overshift position. It will be noted that the counterclockwise end of arcuate detent structure 480 abuts against up-shifting stop post 504 in FIG. 60, while this first increment of shifting movement spaces the end of detent structure 480 away from up-shifting stop post 504.

The second increment of down-shifting clockwise rotation of arcuate detent structure 480 is shown between FIGS. 61 and 62, and defines the front derailleur shifting actuation between the small chain ring and the intermediate chain ring. In this second down-shifting increment, the clockwise rotational torque of detent structure 480 is greater than for the first increment of movement between FIGS. 60 and 61, and is sufficient to cam spring detenting projection 502 radially outwardly from the most clockwise detent notch 482 against the biasing force of spring body 496 such that spring detenting projection 502 then rides along the arcuate outer surface of detent structure 480 until spring detenting projection 502 is snapped into the intermediate detent recess 482 with the chain on the intermediate chain ring. This snap-in engagement between detenting projection 502 and intermediate detent notch 482 provides a positive tactual input to the rider which indicates location of the chain on the intermediate chain ring.

The final down-shifting increment is shown between FIG. 62 and FIG. 63, and involves further clockwise rotation of shifter rotator 412 and hence of arcuate detent structure 480, which causes spring detenting projection 502 to be cammed radially outwardly out of intermediate detent notch 482 and again onto the arcuate outer peripheral surface of detent structure 480, detenting projection 502 then riding along on the arcuate outer surface of detent structure 480 until spring detenting projection 502 finally snaps into the most counterclockwise of the three detent notches 482 as seen in FIG. 63, which is sensed by the rider as indicating that the chain is now located on the largest, lowest gear ratio chain ring. Engagement of the clockwise end of arcuate detent structure 480 against down-shifting stop post 506 precludes any further clockwise rotation of arcuate detent structure 480 and hence shifter rotator 412.

Although not shown in the front derailleur actuator detenting system illustrated in FIGS. 60-65, it is to be understood that rider input force may be equalized between down-shifting and up-shifting in the detenting system of FIGS. 60-65 either by employing a dual detenting spring rate system as illustrated in FIGS. 22, 24-26, 28 and 29 and described in detail in connection with those figures; or by employing a system with differing down-shifting and up-shifting detent notch side angles as shown in FIGS. 41-43 and described in detail in connection with those figures.

If during the foregoing down-shifting sequence the rider desires to leave the chain on the intermediate chain ring, when the rider relaxes his or her grip on the shifter rotator 412, the overshift movement of control cable 415 will be released such that the chain will be moved in the up-shifting direction into registry with the intermediate chain ring. If, on the other hand, the down-shifting sequence involves shifting from the small chain ring through the intermediate chain ring to the large chain ring, then the overshift movement of control cable 415 will be carried through this shifting sequence, and when shifter rotator 412 is relaxed by the rider the overshift cable movement will be released to place the chain in accurate registry with the large chain ring. Similarly, a down-shift from the intermediate chain ring to the large chain ring will involve release of the overshift when the rider releases shifter rotator 412.

All aspects of overshifting have previously been described herein in connection with the "shovel cam" forms of the invention shown in FIGS. 19-43, including a general description of overshift, description of initial lost motion takeup prior to overshift, description of overshift movement including associated cam lobe heights, and release of the overshift at the end of a shifting event which returns the chain to sprocket or chain ring alignment. All of such description applies equally as well to all of the jack spool forms of the invention shown in FIGS. 46-74, and is therefore hereby incorporated by reference in the present description of the jack spool forms of the invention.

UP-SHIFTING

The first up-shifting increment of movement of the parts is shown between FIG. 63 and FIG. 64, and involves a first counterclockwise increment of rotational movement of arcuate detent structure 480 during which the prioritized relatively strong engagement of spring detenting projection 502 in the most counterclockwise of the three detent notches 482 overcomes the relatively weak engagement of right-hand spring end foot 498 behind body dimple 490, causing spring 494 to be shifted to the left or counterclockwise to the position of FIG. 64 in which the left-hand end of spring 494 abuts against body end shoulder 488. This first up-shifting increment from FIG. 63 to FIG. 64 does not result in any material chain shifting movement from the largest chain ring toward the intermediate chain ring, and any lost motions in the front derailleur mechanism and front cable system remain released or relaxed as they were when shifter rotator 412 was relaxed by the rider at the conclusion of the down-shifting events.

Further counterclockwise shifting rotation of arcuate detent structure 480 to shift the chain from the large chain ring to the intermediate chain ring is shown between FIG. 64 and FIG. 65, during which spring detenting projection 502 is cammed out of the most counterclockwise detent notch 482 and rides along the arcuate outer periphery of detent structure 480 so as to snap into registry with intermediate detent notch 482 to place the chain into engagement with the intermediate chain ring, with derailleur and cable system lost motions remaining released. This snap-in engagement of detenting projection 502 into the intermediate detent notch 482 is again sensed by the rider.

The final up-shifting counterclockwise increment of rotation of shifter rotator 412 and arcuate detent structure 480 relative to fixed body 421 is shown between FIG. 65 and FIG. 60. This increment involves camming of spring detenting projection 502 out of intermediate detent notch 482, sliding detenting projection 502 along the arcuate outer peripheral surface of detent spring 494, and then snapping of spring detenting projection 502 into the most clockwise of the three detent notches 482 to complete the full up-shifting event. At the end of this up-shifting event, any lost motions in the front derailleur mechanism and cable system remain released for proper alignment of the chain on the smallest of the three chain rings, and detent structure 480 and shifter rotator 412 are precluded from any further counterclockwise rotational movement by engagement of the counterclockwise end of detent structure 480 against up-shifting stop post 504 that is fixed within body 421.

FRONT DERAILLEUR FINE-TUNING TO AVOID CHAIN RASP

Referring to FIGS. 60 and 61, detent spring 494 will be seen to have two discrete rotationally specific positions in fixed body 421. In FIG. 60, spring 494 is in a fully up-shifted counterclockwise position in body 421, and in FIG. 61 spring 494 is in a down-shifting clockwise position in body 421. These two discrete positions are defined by spring end foot 498 being on the counterclockwise or left-hand side of body dimple 490 in FIG. 60, and being on the clockwise or right-hand side of dimple 490 in recess 492 in FIG. 61. Since engagement of spring detenting projection 502 in any of the three detent notches 482 is prioritized over engagement of spring end foot 498 against either side of body dimple 490, a small amount of rotational movement of shifter rotator 412 in the clockwise direction will move spring 494 from its position of FIG. 60 to its position of FIG. 61, and a similar small amount of counterclockwise rotation of shifter rotator 412 will move spring 494 counterclockwise from its position of FIG. 61 to its position of FIG. 60. Such movements of spring 494 in body 421 can be effected by the rider without any shifting of the chain from one chain ring to another because of the prioritized engagement of spring detenting projection 502 in any of the three detent notches 482 over engagement of spring end foot 498 against body dimple 490. These two rotationally specific positions of spring 494 in body 421 are translated through arcuate detent structure 480 and jack spool 436 to control cable 415, providing the rider with two optional lateral positions of the bicycle chain relative to any one of the three chain rings for avoiding chain rasp. These lateral chain shifting options for avoiding chain rasp are available to the rider regardless of the lateral location of the rear portion of the chain on the multiple freewheel, both in "parallel riding" and "cross-over riding," as described above in connection with FIGS. 14 and 15.

REAR HANDGRIP SHIFT ACTUATOR 410

FIGS. 66–69 illustrate details of structure and operation of the jack spool form of the invention in connection with rear derailleur handgrip shift actuator 410 located proximate the right end portion of handlebar 402. These details of structure and operation are generally the same for rear derailleur handgrip shift actuator 410 as for front deraileur handgrip shift actuator 408 except that arcuate detent structure 480a, seen in FIG. 66, has seven detents 482a corresponding to seven rear derailleur freewheel sprockets, instead of the three detents for front derailleur shift actuator 408.

Figure 48:
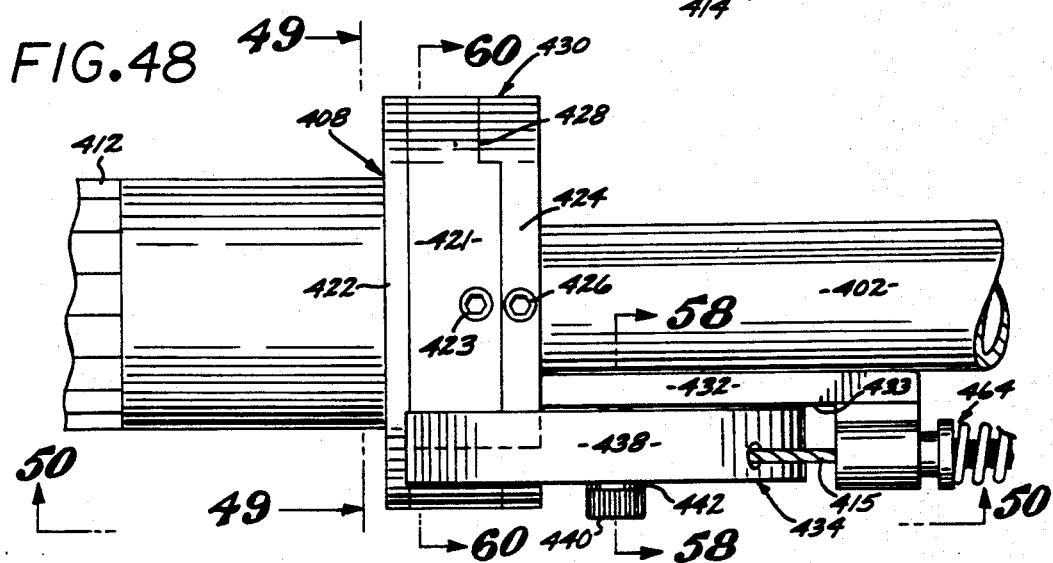
FIG. 48 is a further enlarged fragmentary elevational view taken on the line 48—48 in FIG. 46.
Figure 66:
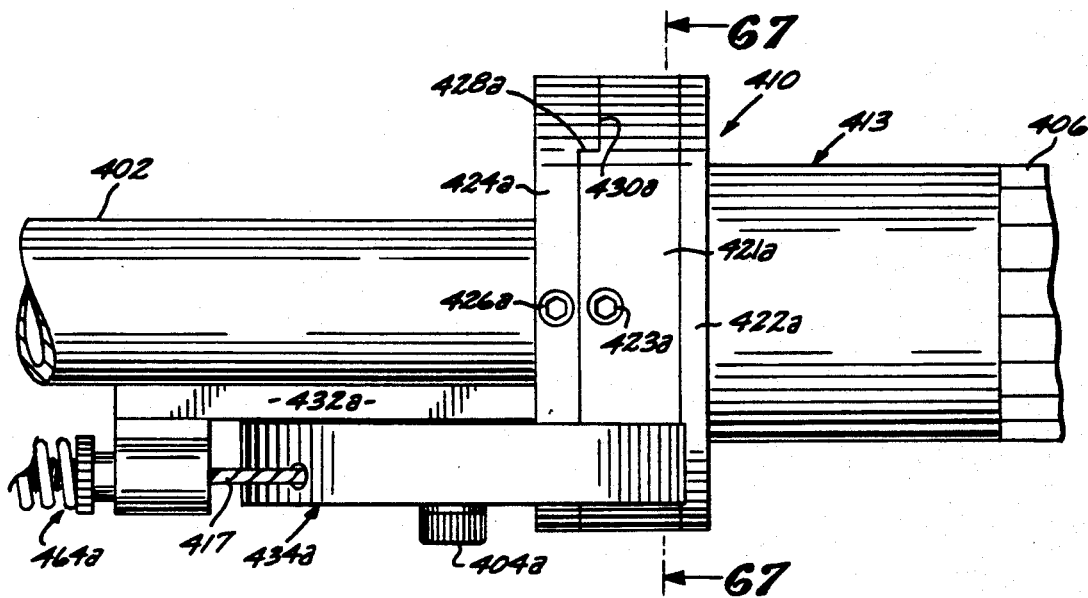
FIG. 66 is an enlarged, fragmentary elevational view taken on the line 66—66 in FIG. 46 illustrating the rear derailleur handgrip shift actuator proximate the right-hand end portion of the handlebar, this view being similar to but reversed from FIG. 48.

Rear derailleur shift actuator 410 is shown in elevation in FIG. 66, which is the same as FIG. 48 for front derailleur handgrip shift actuator 408, except that the parts are reversed since rear derailleur shift actuator 410 is located proximate the right end of handlebar 402, with rear derailleur shifter rotator 413 extending in the outboard direction to the conventional fixed right-hand grip 406. Thus, fixed main body 421a has outboard cover plate 422a which is rotatable as a part of shifter rotator 413, main body 421a being locked to handlebar 402 by means of set screw 423a. Jack spool support ring 424a is also locked to handlebar 402 by means of a set screw 426a. Body 421a and support ring 424a are secured against relative rotation by means of interlocking arcuate locator recess 428a in body 421a and arcuate locator projection 430a in support ring 424a. Jack spool support bar 432a is integral with support ring 424a, extending in the inboard direction, or to the left as viewed in FIG. 66, generally parallel to handlebar 402. Outboard movement of body 421a and support ring 424a is further prevented by means of a retainer ring like ring 474 shown in FIG. 53.

The jack spool assembly is generally designated 434a, and includes jack spool 436a, jack spool housing 438a, and jack spool pivot bolt 440a which is fixedly supported on support bar 432a.

Figure 67:
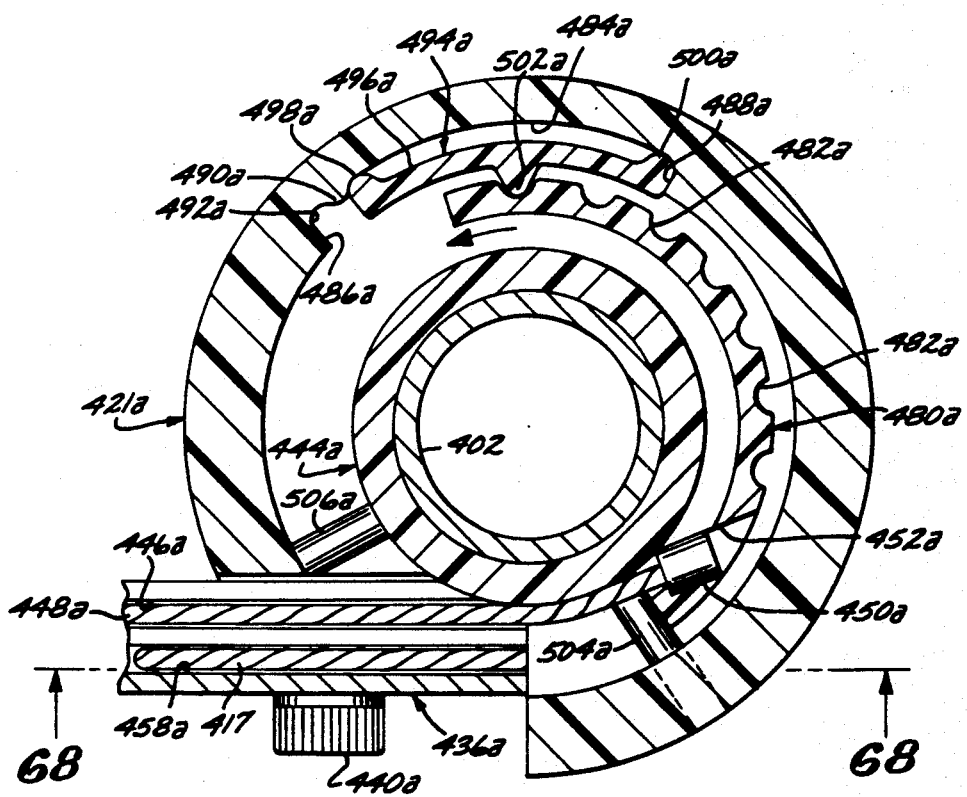
FIG. 67 is a further enlarged, fragmentary cross-sectional view taken on the line 67—67 in FIG. 66, illustrating the rear derailleur shifter rotator and its detent structure and spring in their fully up-shifted, most clockwise locations relative to the fixed body of the shift actuator, preparatory to counterclockwise movement of the rotator and its detent structure as indicated by the directional arrow for takeup of lost motions and an overshift increment, and then a series of down-shifting events in which the chain is shifted from the smallest, highest gear ratio freewheel sprocket to the largest, lowest gear ratio freewheel sprocket.
Figure 68:
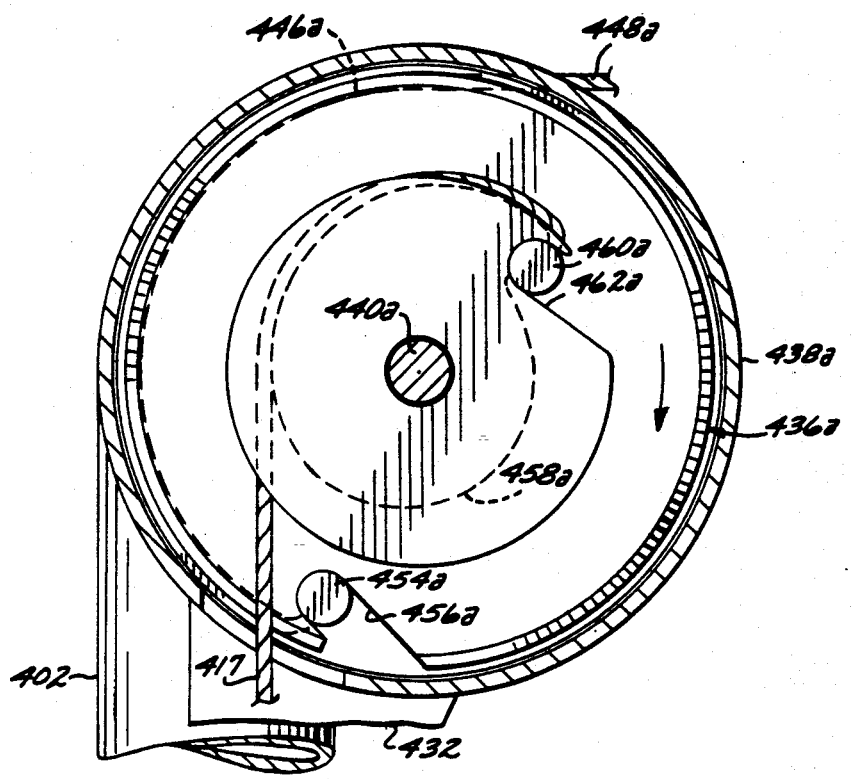
FIG. 68 is a fragmentary sectional view taken on the line 68—68 in FIG. 67, illustrating the jack spool of the rear derailleur shift actuator in its fully up-shifted position.
Figure 69:
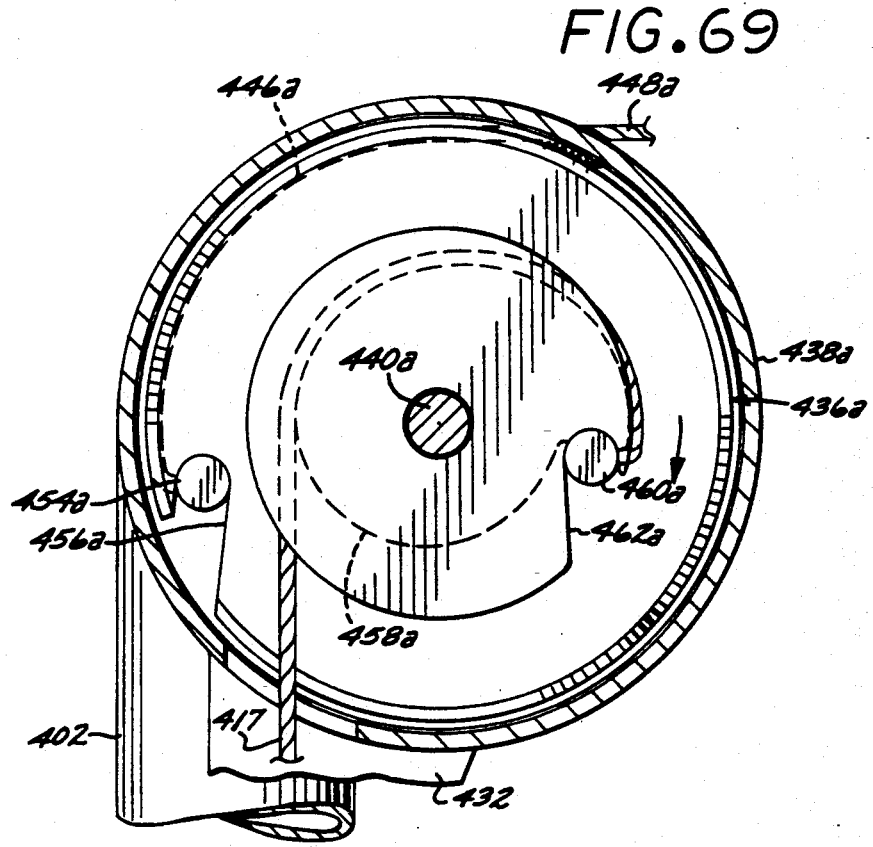
FIG. 69 is a view like FIG. 68, but with the jack spool in a partially down-shifted position relative to the position of FIG. 68, as indicated by the directional arrows in FIGS. 68 and 69.

Referring now particularly to FIG. 67, rear derailleur shifter rotator 413 has drive pulley 444a located thereon, while jack spool 436a has input cable groove 446a thereon. Short jack spool drive cable 448a drivingly interconnects shifter rotator 413 with jack spool 436a, being driven on rotator drive pulley 444a and extending into jack spool input cable groove 446a. Drive cable 448a has an input or drive end bead 450a located in drive notch 452a of rotator 413, and, now looking at FIGS. 68 and 69, an output or driven end bead 454a engaged in a notch 456a in jack spool input cable groove 446a. Jack spool output cable groove 458a for rear derailleur control cable 417 is shown in FIG. 67, but is best seen in FIGS. 68 and 69 which illustrate the nautilus cam shape of jack spool output cable groove 458a which provides decreasing radius and hence increasing torque during down-shifting takeup rotation of shifter rotator 413, and increasing radius and therefore decreasing torque for up-shifting rotation of shifter rotator 413. As seen in FIGS. 68 and 69, rear derailleur control cable 417 has a cable end bead 460a that is engaged in a notch 462a in jack spool output cable groove 458a. FIG. 66 shows cable output structure 464a, including an adjustment barrel, for rear derailleur control cable 417.

Referring again particularly to FIG. 67, arcuate detent structure 480a, which is integral with rear derailleur shifter rotator 413, has seven radially outwardly opening spaced detent notches 482a, corresponding to a seven-gear multiple freewheel. Detent notches 482a may be generally regularly spaced around the periphery of arcuate detent structure 480a, but they may be irregularly displaced from one another as required to (1) vary the rate of twist of shifter rotator 413 to compensate for increasing torque in the down-shifting direction and decreasing torque in the up-shifting direction, (2) compensate for irregularities in the rear derailleur mechanism over the range of freewheel sprockets, and (3) compensate for any particular manufacturer's variation in the spacing between the freewheel sprockets.

Radially inwardly directed arcuate recess 484a in fixed body 421a has stop shoulders 486a and 488a at its opposite ends which provide respective down-shifting and up-shifting spring stops, and arcuate recess 484a also includes a radially inwardly directed, rounded dimple 490a adjacent down-shifting end shoulder 486a, with rounded recess 492a defined between dimple 490a and shoulder 486a. The detent spring is generally designated 494a, and is a leaf spring that rides in spring recess 484a. Detent spring 494a includes elongated, arcuate spring body 496a which has rounded, radially outwardly directed end feet 498a and 500a. Rounded detenting projection 502a is integral with spring body 496a and projects radially inwardly for detenting engagement within sequential detent notches 482a during shifting operations.

FIG. 67 shows the parts of rear derailleur shift actuator 410 in their fully up-shifted positions, with arcuate detent structure 480a abutted in the up-shifted stop position against up-shifting stop post 504a that is affixed in body 421a. In this fully up-shifted position, detent spring 494a is in its clockwise position within body 421a, with the clockwise end of spring 494a abutting against body shoulder 488a, and spring end foot 498a clockwise or to the right of body dimple 490a. In this position of the parts, spring detenting projection 502a is engaged in the most counterclockwise of the seven detents 482a in detent structure 480a.

The first down-shifting increment of movement of shifter rotator 413, which is counterclockwise as viewed in FIG. 67, causes detent structure 480a to shift detent spring 494a counterclockwise or to the left in spring recess 484a so that the counterclockwise end of spring 494a is shifted into abutment with body shoulder 486a, spring end foot 498a riding over body dimple 490a into body end recess 492a. This first counterclockwise increment of movement of rotator 413 and detent structure 480a pulls jack spool drive cable 448a and hence rear derailleur control cable 417 a sufficient amount to take up substantially all of the lost motions or slack in both the rear derailleur mechanism and rear derailleur control cable system 416, and to provide a desired amount of overshift movement of rear derailleur control cable 417.

Continued down-shifting rotation of shifter rotator 413 and arcuate detent structure 480a counterclockwise as viewed in FIG. 67 will cause the remaining six open detent notches 482a as viewed in FIG. 67 to shift sequentially into registry with spring detenting projection 502a causing the bicycle chain to sequentially shift downwardly from the smallest freewheel sprocket to the largest freewheel sprocket, at which point the counterclockwise end of arcuate detent structure 480a will abut against down-shifting stop post 506a, preventing any further down-shifting movement of shifter rotator 413 or the bicycle chain.

Conversely, from such fully down-shifted position of the parts, the first up-shifting rotational movement of shifter rotator 413 and hence of arcuate detent structure 480a clockwise (contrary to the directional arrow) in FIG. 67 will shift detent spring 494a clockwise to the position shown in FIG. 67, with the clockwise end of spring 494a in abutment with body stop shoulder 488a and spring end foot 498a on the clockwise side of body dimple 490a. Release of rear derailleur handgrip shift actuator 410 at the end of down-shifting will already have released the lost motions or slack in the rear derailleur mechanism and rear derailleur cable system 414. Continued up-shifting rotation of shifter rotator 413 and hence of arcuate detent structure 480a clockwise as viewed in FIG. 67 will progressively release rear derailleur control cable 417 so as to successively up-shift the bicycle chain between the freewheel sprockets until the fully up-shifted position of the parts illustrated in FIG. 67 is achieved, with spring detenting projection 502a engaged in the most counterclockwise of the series of detent notches 482a, and detent structure 480a abutted against up-shifting stop post 504a.

Still referring to FIG. 67, detent spring 494a will be seen to have two discrete rotationally specific positions in fixed body 421a, the fully up-shifted clockwise position of FIG. 67, and a down-shifting counterclockwise position to which spring 494a shifts during the first down-shifting increment of movement of shifter rotator 413 and hence of arcuate detent structure 480a. These two discrete positions are defined by spring end foot 498a being on opposite sides of body dimple 490a. Since engagement of spring detenting projection 502a in any of the seven detent notches 482a is prioritized over engagement of spring end foot 498a against either side of body dimple 490a, a small amount of rotational movement of shifter rotator 413 will move spring 494a between these two positions in body 421a. As was the case for the front derailleur actuator, such movements of spring 494a in body 421a can be effected by the rider without any shifting of the chain from one freewheel sprocket to another because of the prioritized engagement of spring detenting projection 502a in any of the seven detent notches 482a over engagement of spring end foot 498a against body dimple 490a. These two rotationally specific positions of spring 494a in body 421a are translated through arcuate detent structure 480a and jack spool 436a to rear derailleur control cable 417, providing the rider with two optional lateral positions of the bicycle chain relative to any one of the seven freewheel sprockets for avoiding chain rasp. These lateral chain shifting options for avoiding chain rasp will not be as frequently required for the rear freewheel sprockets as for the front chain rings, but may be particularly useful in cross-over riding.

FIGS. 68 and 69 illustrate down-shifting rotational movement of jack spool 436a which is clockwise as viewed in FIGS. 68 and 69, corresponding to down-shifting rotational movement of arcuate detent structure 480a as indicated by the directional arrow in FIG. 67. The down-shifting rotational movement of shifter rotator 413 will cause pulling movement of jack spool drive cable 448a on jack spool input cable groove 446a through engagement of cable output end bead 454a in notch 456a, causing clockwise down-shifting rotation of jack spool 436a as viewed in FIGS. 68 and 69. FIG. 69 shows jack spool 436a rotationally displaced from its position in FIG. 68 as a result of such down-shifting rotation. This down-shifting rotational movement of jack spool 436a results in synchronous clockwise down-shifting rotational movement of jack spool output cable groove 458a, and hence down-shift pulling translational movement of rear derailleur control cable 417 through engagement of its end bead 460a in notch 462a. The initial such pulling movement of control cable 417 will be gauged by the counterclockwise shifting of detent spring 494a from its position of FIG. 67 into abutment with body shoulder 486a, with accompanying takeup of lost motions and overshift movement in the rear derailleur mechanism and rear derailleur control cable system 416. Then, further such pulling movement of control cable 417 will cause the actual down-shifting events.

GEAR DRIVEN JACK SPOOL EMBODIMENTS

Figure 70:
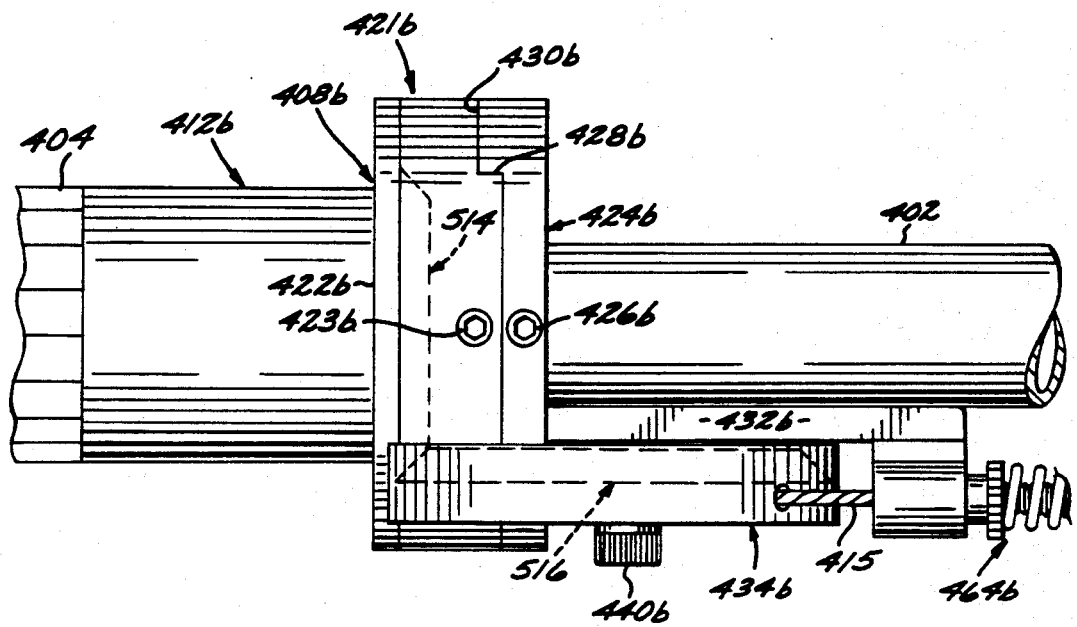
FIG. 70 is a fragmentary elevational view similar to FIG. 48, illustrating a front derailleur jack spool handgrip shift actuator embodying a bevel gear drive connection (shown in dashed lines) between the shifter rotator and the jack spool in place of the short cable drive connection previously illustrated.
Figure 71:
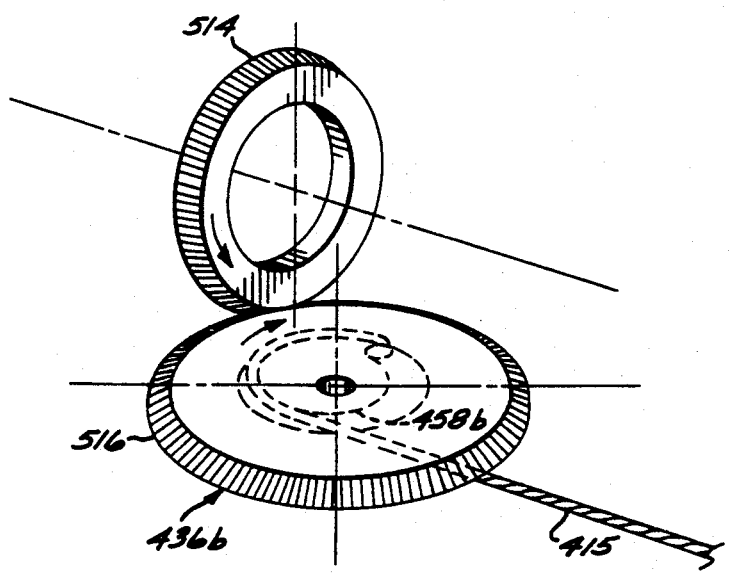
FIG. 71 is a simplified perspective schematic illustration similar to FIG. 51 showing the geared connection between the shifter rotaor drive bevel gear and the jack spool driven bevel gear, with the directional arrows indicating down-shifting directional movement.

FIGS. 70 and 71 illustrate a jack spool form of the invention in which the front handgrip shift actuator, in this case generally designated 408b, through its shifter rotator 412b, drives jack spool 436b by means of a pair of bevel gears, a drive bevel gear 514 being mounted on and driven by rotator 412b, and a driven bevel gear 516 being a part of jack spool 436b.

The gear driven form of the invention shown in FIGS. 70 and 71 for the front derailleur shift actuator 408b is the same both in structure and mode of operation as the short cable driven form 408 shown in FIGS. 46-65 and described in detail in connection with those figures, with the exception that the bevel jack spool drive replaces the short cable jack spool drive in the form shown in FIGS. 70 and 71. Thus, the gear driven shift actuator form 408b of FIGS. 70 and 71 may have the same detenting system construction and mode of operation as that shown in FIGS. 60-65 for front handgrip shift actuator 408 and described in detail in connection therewith. Similarly, rear derailleur handgrip shift actuator 410 shown in FIGS. 66-69 may embody a jack spool gear drive like that shown in FIGS. 70 and 71 instead of the short cable jack spool drive of FIGS. 66-69 and otherwise have the same structure and mode of operation as those illustrated in FIGS. 66-69 and described in detail in connection with those figures, including the structure and mode of operation of the rear derailleur detenting system shown in FIG. 67.

Thus, front derailleur handgrip shift actuator 408b of FIGS. 70 and 71 includes shifter rotator 412b which is rotatable about handlebar 402, main body 421b which is fixedly secured to handlebar 402, and round main body cover plate 422b which rotates with shifter rotator 412b. Main body 421b is fixedly secured to handlebar 402 by means of set screw 423b, as well as by means of a retainer ring arrangement like that shown in FIG. 53 for retainer ring 474.

Jack spool support ring 424b is fixed to handlebar 402 by set screw 426b, and support ring 424b and main body 421b are locked against relative rotation by arcuate recess 428b in body 421b being engaged by arcuate projection 430b on support ring 424b. Jack spool support bar 432b is integral with support ring 424b, extending in the inboard direction generally parallel to handlebar 402. Jack spool assembly 434b includes jack spool 436b which is rotatable on pivot bolt 440b that is mounted on support bar 432b.

Jack spool drive gear 514 is fixedly mounted on shifter rotator 412b for coaxial rotation with rotator 412b. Drive gear 514 has an annular peripheral gear rack facing generally in the inboard direction with a bevel that is approximately 45° relative to the common axis of rotation of bevel gear 514 and shifter rotator 412b. Thus, the angle of incidence of the gear rack of drive gear 514 is also approximately 45° offset from the general plane of drive gear 514.

Jack spool driven gear 516 is fixedly mounted on jack spool 436b, and its axis of rotation is at substantially right angles to the axis of rotation of drive gear 514. Driven gear 516 has an annular peripheral gear rack that is substantially 45° offset from its axis of rotation, and placed so as to be in complementary, meshing engagement with the annular gear rack of drive gear 514. Thus, the annular gear rack of driven gear 516 is also set at approximately 45° relative to the general plane of driven gear 516. This general plane of driven gear 516 is the same as the general plane of jack spool 436b, which is substantially parallel to handlebar 402, this being the presently preferred direction for exit of front derailleur control cable 415 from jack spool 436b.

Although substantially 45°-angled gear racks are shown in FIGS. 70 and 71 for drive gear 514 and driven gear 516, it is to be understood that any other desired complementary angles may be employed within the scope of the invention, as for example bevel angles relative to the axes of rotation of 60°/30° for drive gear 514/driven gear 516, or 30°/60° for drive gear 514/driven gear 516, or any other desired complementary bevel angles. Alternatively, if desired, the gear rack for drive gear 514 may be a flat circular rack facing in the general inboard direction, and the circular rack for driven gear 516 a complementary cylindrical spur gear arrangement; or vice versa, the generally flat gear rack may be on driven gear 516, and the generally cylindrical spur gear arrangement on the drive gear 514.

FIG. 71 illustrates the down-shifting directions of rotation for gears 514 and 516, the down-shifting direction for drive gear 514 being counterclockwise and the down-shifting direction for the driven gear 516 being clockwise. Front derailleur control cable 415 is engaged with jack spool output cable groove 458b which has a nautilus configuration such that cable pulling for down-shifting by clockwise rotation of jack spool 436b will cause a decreasing pulling radius with corresponding increasing torque, and cable releasing for up-shifting will cause an increasing nautilus radius and decreasing torque.

GEAR DRIVEN FORM WITH DIRECT JACK SPOOL DETENTING

FIGS. 72-76 illustrate another gear driven jack spool form of the invention which differs from the form shown in FIGS. 70 and 71 in both the detenting deployment and the mechanism for taking up lost motions and providing overshift. In the form of FIGS. 72-76, the detenting is between the jack spool itself and structure that is fixed relative to handlebar 402. This provides a slightly more direct, and hence more positive, detenting for front derailleur control cable 415, and hence the front derailleur mechanism, than the previously shown and described forms of the invention wherein the detenting is associated with shifter rotator 412b. The mechanism for taking up lost motions and providing overshift is directly associated with the jack spool. Having the detenting directly associated with the jack spool instead of the shifter rotator requires a positive drive between the shifter rotator and the jack spool in both rotational directions, which is accomplished by the gear drive arrangement.

Figure 72:
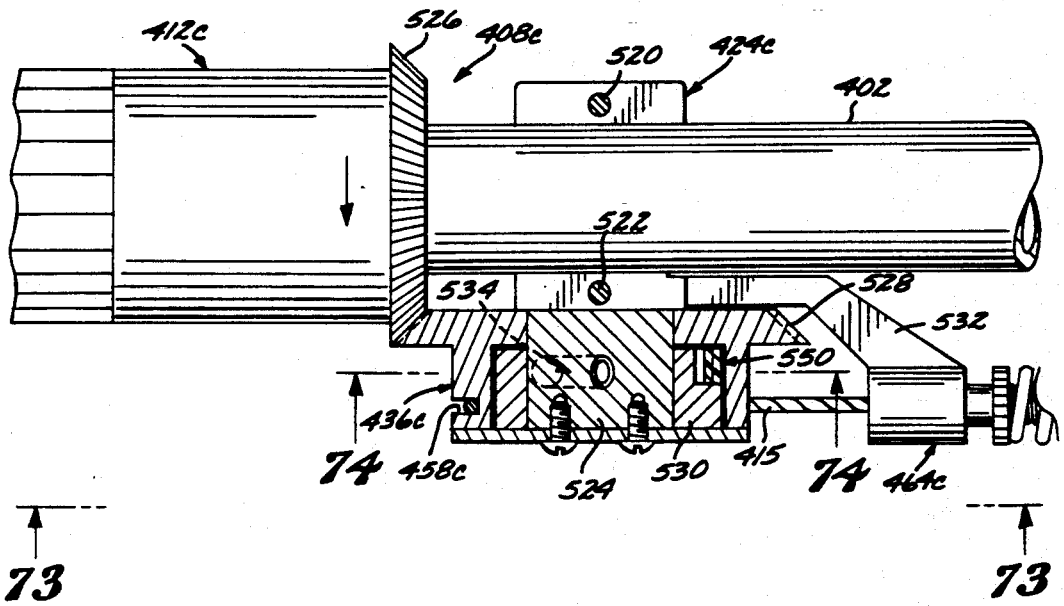
FIG. 72 is a fragmentary elevational view, with portions broken away and partly in section, illustrating a gear-driven jack spool form of the invention in which detenting is accomplished directly between the jack spool and fixed structure of the actuator, the directional arrow indicating down-shifting rotational movement of the handgrip rotator.
Figure 73:
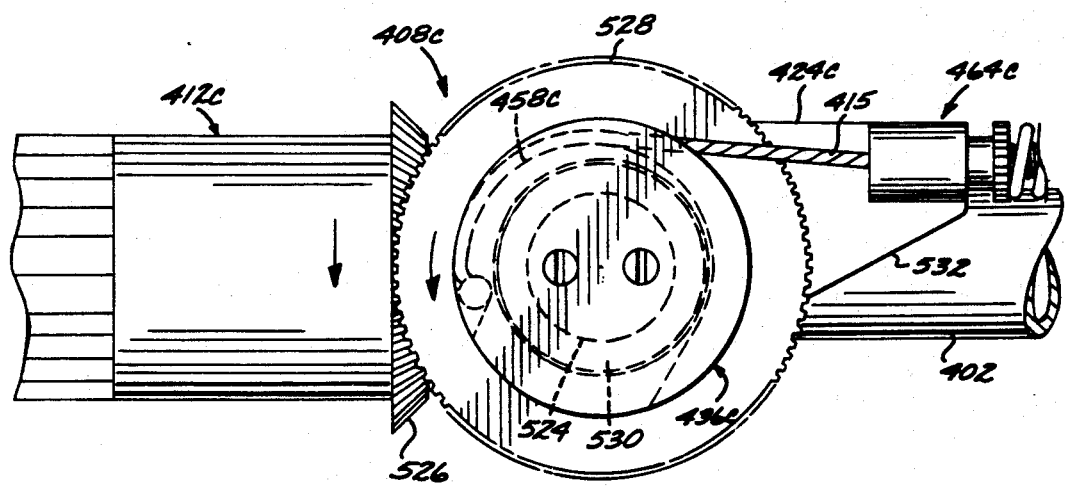
FIG. 73 is a fragmentary elevational view taken on the line 73—73 in FIG. 72, with dashed lines illustrating the operative connection between the jack spool and the front derailleur control cable, the directional arrows indicating down-shifting rotational movement of the handgrip rotator and jack spool.

Referring first to FIGS. 72 and 73, the front handgrip shift actuator is generally designated 408c, and includes shifter rotator 412c. Since the detenting mechanism is in the jack spool and not in a fixed main body as in the previous forms of the invention, no similar fixed main body is required in the present form. The jack spool mechanism is supported on a fixed jack spool support bracket 424c which takes the place of the support ring of the previous forms. Support bracket 424c is split, as best seen in FIG. 72, so as to be slideable over handlebar 402, and is clamped to handlebar 402 by means of a pair of clamp bolts 520 and 522. A jack spool mounting post 524 forms an integral part of support bracket 424c, mounting post 524 projecting in a direction generally radially outwardly from the axis of handlebar 402.

The jack spool is generally designated 436c, and is rotatably mounted on mounting post 524, i.e., with its axis of rotation generally perpendicular to the longitudinal axis of handlebar 402. A drive bevel gear 526 is coaxially mounted on shifter rotator 412c so as to rotate therewith. An outer, bevel gear ring 528 is a part of jack spool 436c and is rotationally driven by gear 526, the drive connection between gears 526 and 528 serving to effect takeup and release of front derailleur control cable 415 according to respective down-shifting and up-shifting rotational movements of shifter rotator 412c.

An inner, rotationally driven ring portion 530 of jack spool 436c is concentric within gear ring 528 and has jack spool output cable groove 458c in its periphery. The jack spool end of front derailleur control cable 415 is anchored as previously shown and described in output cable groove 458c on gear ring 528, and extends inboard generally parallel to handlebar 402 through cable output structure 464c and thence through the front derailleur control cable system 414 to the front derailleur mechanism. Cable output structure 464c is mounted on an arm 532 which extends integrally from jack spool support bracket 424c generally in the inboard direction and laterally outwardly from handlebar 402 as best seen in FIG. 72. Alternatively, output structure 464c may be mounted on a separate bracket (not shown) supported on handlebar 402 inboard of bracket 424c. Output cable groove 458c has the nautilus configuration previously described in detail, with the same mode of operation and beneficial results.

Figure 74:
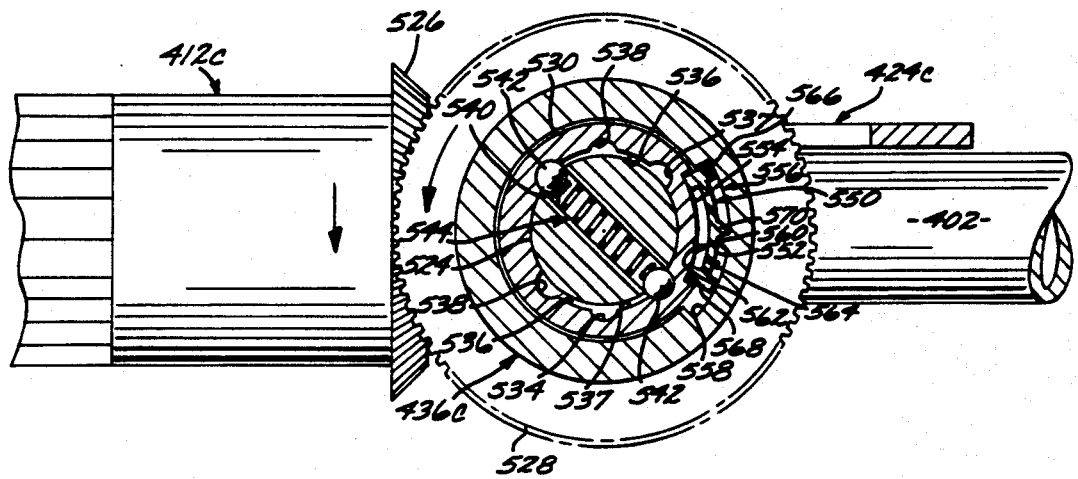
FIG. 74 is a fragmentary sectional view taken on the line 74—74 in FIG. 72, illustrating details of construction of the direct detenting between the jack spool and fixed structure, and also rotational separation of the jack spool driven gear ring and detenting ring portions, with rotationally interconnecting spring means enabling lost motion takeup and release, overshifting and anti-rasp fine-tuning, the jack spool ring portions being shown in their fully up-shifted, most clockwise positions.
Figure 75:
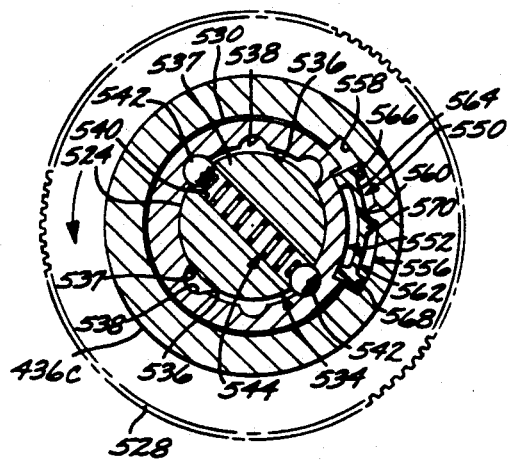
FIG. 75 is a fragmentary view of a portion of FIG. 74, with the gear ring shifted counterclockwise relative to the detenting ring in a first down-shifting increment of movement position for taking up lost motions and overshift movement.
Figure 76:
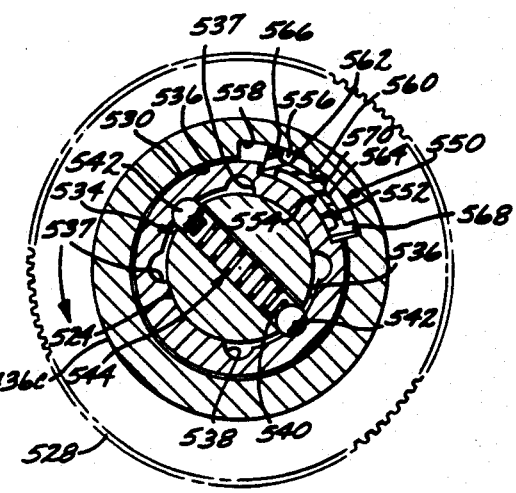
FIG. 76 is a view similar to FIG. 75, with the detenting ring down-shifted counterclockwise to the intermediate chain ring position.

The jack spool detenting system is generally designated 534, and is seen in each of FIGS. 72, 73 and 74. Detenting system 534 is operative between jack spool inner ring 530 and jack spool mounting post 524. A pair of generally diametrically opposed arcuate detenting grooves 536 are disposed in the inner periphery of jack spool inner ring portion 530, with generally diametrically opposed solid portions 537 of inner ring portion 530 extending between detenting grooves 536, these solid portions 537 presenting positive ball detent end stops for both the down-shifting direction and the up-shifting direction as best seen in FIGS. 74-76. Each of the detenting grooves 536 contains three detent notches 538 which are shown regularly arcuately spaced, with two of the notches 538 located immediately adjacent solid stop portions 537 and the third notch being intermediately located. The spacing between detent notches 538 may be adjusted for fine-tuning purposes as with the other forms of the invention.

A diametrical bore 540 extends through fixed mounting post 524 in axial registry with detenting grooves 536 relative to mounting post 524 and jack spool inner ring portion 530. A pair of detenting balls 542 is disposed in the opposite ends of bore 540 so as to provide detent projections which project radially outwardly from the ends of bore 540 into detenting engagement with detenting grooves 536, and more specifically with detent notches 538. A helical compression spring 544 extends through bore 540 so as to bias balls 542 into detenting engagement with the respective detent notches 538. Thus, each of the two detent balls 542 serves the same detenting function relative to one of the two respective detenting grooves 536 and its detent notches 538. Although two detent balls 542 and their respective detent notches 538 are preferred for maximum detenting function, it is to be understood that if desired a single detent ball 542 and its respective detent notches 538 may be employed. Such a single ball arrangement is preferred for the rear derailleur handgrip shift actuator, as described hereinafter.

FIGS. 74-76 illustrate a lost motion and overshift compensator, generally designated 550, which is preferably employed between driven bevel gear ring 528 and jack spool inner ring portion 530 for taking up lost motions or slack in the front derailleur mechanism and front derailleur control cable system 414 and providing an overshift increment of motion during down-shifting, and conversely for releasing such lost motions and overshift increment during up-shifting. In FIGS. 74-76, the entire jack spool 436c is shown in its most clockwise positioning, including both gear ring 28 and inner ring portion 530, corresponding to the fully up-shifted positions of the parts. This fully up-shifted position is defined by abutment of the end stops of solid portions 537 against detent balls 542.

Lost motion and overshift compensator 550 includes a radially outwardly opening arcuate recess 552 in cylindrical portion 530. This arcuate recess 552 has a radially outwardly facing arcuate surface 554 which terminates at radially oriented end shoulders of recess 552. An opposing radially inwardly facing arcuate recess 556 is provided in gear ring 528. While arcuate recess 556 is generally in opposing registry with arcuate recess 552, it is longer in arcuate extent. Arcuate recess 556 has a radially inwardly facing arcuate slip surface 558 which terminates at radial end shoulders of recess 556. A rounded dimple 560 projects radially inwardly from slip surface 558 intermediate the ends of arcuate recess 556.

A lost motion and overshift leaf spring 562 is disposed within the cavity formed by the pair of arcuate recesses 552 and 556. Spring 562 has an elongated, resilient arcuate spring body 564 with radially enlarged end feet 566 and 568 at its opposite ends, end feet 566 and 568 each extending radially through substantially the full depths of recesses 552 and 556. A rounded dimple 570 projects radially outwardly from the resilient spring body 564 intermediate end feet 566 and 568. This spring dimple 570 radially overlaps gear ring dimple 560.

Spring end feet 566 and 568 are located proximate the respective opposite end shoulders of radially outwardly facing arcuate recess 552, so that there is no material relative movement between lost motion spring 562 and jack spool inner ring portion 530. In contrast, the radially inwardly facing arcuate recess 556 is considerably longer in arcuate extent than lost motion and overshift spring 562, so that in operation of lost motion and overshift compensator 550 there will be substantial arcuate spacing between one or the other of the end shoulders of arcuate recess 556 and spring 562.

The mode of operation of lost motion and overshift compensator 550 will now be described. FIG. 74 illustrates the parts in their fully up-shifted, most clockwise positions. Here, inner ring portion 530 is stopped in its most clockwise position by engagement of its solid portions 537 against detent balls 542, and gear ring 528 is stopped in its most clockwise position by engagement of the counterclockwise shoulder of its arcuate recess 556 against spring end foot 566. Gear ring dimple 560 lies clockwise of spring dimple 570.

At the commencement of a down-shifting rotational input of shifter rotator 412c, which is overhand toward the rider as indicated by the downward directional arrows in FIGS. 72 and 73, with the bicycle chain on the small chain ring, gear ring 528 shifts counterclockwise as indicated by the directional arrows in FIGS. 73-76 an increment of movement relative to inner ring portion 530 in which the clockwise shoulder in its arcuate recess 556 moves into engagement with spring end foot 568 and its dimple 560 shifts to the counterclockwise side of spring dimple 570 against the resiliency of spring body 564. This first increment of movement from the position shown in FIG. 74 to that shown in FIG. 75 causes gear ring 528 to pull front derailleur control cable 415 a sufficient amount to take up the lost motions or slack in the front derailleur mechanism and front derailleur control cable 414 and to provide a desired amount of front derailleur overshift movement, without shifting the chain off of the small chain ring. The retention force of detent balls 542 in their respective detent notches 538 is prioritized to be greater than the spring biasing force on its dimple 570 so as to allow this first increment of movement without down-shifting.

Further overhand down-shifting rotational movement of shifter rotator 412c toward the rider, and corresponding further counterclockwise rotation of gear ring 528, moves lost motion and overshift spring 562 and inner ring portion 530 counterclockwise so as to cause down-shifting rotation of gear ring 528 and inner ring portion 530 as a unit against the detenting force of balls 542 so as to shift balls 542 from the highest gear ratio position shown in FIGS. 74 and 75 to the intermediate gear ratio position of FIG. 76 defined by intermediate ball detent notches 538, gear ring 528 pulling cable 415 such as to shift the chain to the intermediate chain ring. Additional such rotation notches 538, with gear ring 528 pulling cable 415 such as to shift the chain to the large chain ring. Release of shift actuator 408c by the rider in either of these down-shifted positions releases the overshift and lost motion takeups for accurate chain alignment with the respective chain rings.

From such lowest gear ratio positions of the parts, overhand rotation of shifter rotator 412c away from the rider (contrary to the directional arrows in FIGS. 73-76) to initiate up-shifting will first move gear ring 528 relative to inner ring portion 530 clockwise back to their relative positioning illustrated in FIG. 74, during which first up-shifting increment of movement the lost motions in the front derailleur mechanism and front derailleur control cable system 414 remain released. Then, further clockwise rotation of gear ring 528 will carry inner ring portion 530 with it in their same relative positions of FIG. 74, with detent balls 42 sequencing through detent notches 538 back to the highest gear ratio position illustrated in FIG. 74.

The gear driven form of the invention shown in FIGS. 72-76 provides the same lateral chain shifting options for avoiding chain rasp as described above in detail in connection with FIGS. 60 and 61 because jack spool gear ring 528 has two rotationally specific positions relative to jack spool inner ring portion 530 for any of the three ball-detented positions of inner ring portion 530. The ball detenting is prioritized over the engagement between gear ring dimple 560 against spring dimple 570, so that in any of the three gears, the rider, by shifting shifter rotator 412c back and forth, can shift gear ring 528 back and forth between the position shown in FIG. 74 in which ring dimple 560 is clockwise or to the right of spring dimple 570 and the position of FIGS. 75 and 76 in which gear ring dimple 560 is counterclockwise or to the left of spring dimple 570. Such two rotationally specific positions of jack spool gear ring 528 relative to jack spool inner ring portion 530 are translated through control cable 415 into corresponding lateral shifting movements of the chain relative to whichever of the three chain rings the chain is lodged on so as to permit selective avoidance of chain rasp.

Although the gear driven form of the invention shown in FIGS. 72-76 is illustrated with 45° angle gear bevels, it is to be understood that any other desired gear arrangements may be employed as described hereinabove in connection with FIGS. 70 and 71, within the scope of the invention. Also, although the gear driven forms of FIGS. 70-76 are illustrated with respect to front derailleur shifter 408, it is to be understood that the gear driven jack spool forms of FIGS. 70-76 are equally applicable to rear derailleur handgrip shift actuator 410.

The single ball arrangement previously referred to provides an elongated arcuate extent for the rack of detenting grooves 536 which is preferable for the detenting apparatus of FIGS. 72-76 when applied to rear derailleur handgrip shift actuator 410, in view of the larger number of detent notches 538 required for shifting the rear derailleur mechanism as compared with the number of detent notches 538 required for shifting the front derailleur mechanism.

THE GENERAL OPERATIONAL FEATURES OF THE INVENTION ARE EQUALLY APPLICABLE TO THE JACK SPOOL AND SHOVEL CAM FORMS

FIG. 39 was described in connection with shovel cam front derailleur actuator 6J of FIGS. 19 and 33-38, FIG. 39 diagrammatically illustrating sequences of down-shifting and up-shifting events for a three chain ring front derailleur system. The illustration of FIG. 39 and accompanying detailed description are equally applicable to the jack spool forms of front derailleur actuator 408 shown in FIGS. 46-65, 408b shown in FIGS. 70 and 71, and 408c shown in FIGS. 72-74. Accordingly, FIG. 39 and its accompanying detailed description are hereby incorporated by reference as a part of the disclosures for the front derailleur jack spool forms of FIGS. 46-65, 70 and 71, and 72-76. Thus, as illustrated in FIG. 39 and described in connection therewith, for all jack spool forms of the invention, in both the down-shifting and up-shifting directions, overshift is automatically provided for by detented rotational shifting of a detent spring (494 in the forms shown in FIGS. 46-65 and 70 and 71, and 562 in the form shown in FIGS. 72-76), and in each shifting event the rider is left with the option of selecting two chain positions which are slightly on opposite sides of the respective three chain rings so as to assure the ability to eliminate chain rasp in either of the "parallel riding" or "cross-over riding" situations.

Representative values for the amount of cable pulled and respective number of degrees of rotation for rear derailleur handgrip shifter rotator 290 of FIGS. 19-30 are illustrated in FIG. 44 in a diagram that is layed out flat. The diagram of FIG. 44 and the representative values set forth thereon are equally applicable to all rear derailleur jack spool forms of the invention, including jack spool rear derailleur actuator 410 of FIGS. 66-69, and rear shift actuators corresponding to the gear driven front actuator forms shown in FIGS. 70 and 71 and 72-76.

FIG. 45 is a diagrammatic illustration similar to FIG. 44, but giving representative values for the amount of cable pulled and respective number of degrees for rotation of front derailleur handgrip rotator 290a. Similar representative values for cable pulled and relative degrees of rotation are applicable to the jack spool forms of front derailleur actuators, including the forms shown in FIGS. 46-65, and the gear driven forms of FIGS. 70 and 71 and 72-76.

The jack spool "nautilus" cam configuration has heretofore been described for the front derailleur actuator jack spool forms of FIGS. 46-65, 70 and 71, and 72-74, and for the rear derailleur actuator jack spool form of FIGS. 66-69 as providing progressively increasing torque that compensates for increasing opposing force of the derailleur return spring in the down-shifting direction, and conversely providing progressively decreasing torque that compensates for decreasing opposing force of the derailleur return spring in the up-shifting direction. Also, for front derailleur mechanisms, the jack spool cam configuration has previously been described as providing lineal cable movement compensation for lineal cable movement requirements of front derailleur mechanisms which require a relatively large amount of lineal cable movement to down-shift from the smallest chain ring to the intermediate chain ring, but a relatively small amount of lineal cable movement to down-shift from the intermediate chain ring to the large chain ring. These same basic compensations are applicable in the "shovel cam" embodiments of the invention illustrated in FIGS. 19-43.

Other advantages and features which are described above in detail for the nautilus cam configuration of the shovel cam embodiments of the invention are equally applicable to the nautilus configuration of the jack spool forms of the invention. These include (1) the jack spool nautilus cam configuration provides flexibility for adaptation to, and hence for retrofitting to, a variety of satisfactory rear derailleur mechanisms which have been on the market for the last few years, the diametrical (and hence radial) differential between the smaller and larger diameters of the jack spool nautilus cam being adaptable to the amount of cable movement required for any particular rear derailleur mechanism, whether past, present or future; (2) the jack spool nautilus cam configuration enables any desired amount of rotational movement of the handgrip shift actuator for any corresponding desired amount of lineal control cable pull (for example, approximately 136° of shifter rotator movement for approximately 1.6 inches of lineal cable pull); (3) the jack spool nautilus cam configuration allows for any desired number of degrees of greater actuator rotator rotational movement, and correspondingly greater mechanical advantage, than is possible with simple spool-type actuators; and (4) the jack spool nautilus shaped cam provides an ability to space the shifting detents as much farther apart as desired than the restricted detenting inherent in simple spool-type actuators, for accurate detenting and minimization of detent wear.

While the present invention has been shown and described herein in what are conceived to be the most practical and preferred embodiments, it is recognized that departures may be made therefrom within the scope of the invention, which is therefore not to be limited to the details disclosed herein, but is to be afforded the full scope of the appended claims.

What is claimed is:

1. A bicycle gear shifting system, which comprises:
derailleur shifting means having return spring means operatively associated with the rear wheel of the bicycle;
handgrip shift actuator means mounted on the handlebar of the bicycle;
said shift actuator means comprising manually actuated shifter rotator means rotatable about a first axis generally coaxial of the handlebar,
said rotator means being selectively rotatable one way in a down-shifting direction and the opposite way in an up-shifting direction;
said shift actuator means further comprising jack spool means rotatable about a second axis that is angularly offset from said first axis;
control cable means having one end secured to said jack spool means and the other end operatively connected to said derailleur shifting means, said control cable means being biased toward said derailleur shifting means by said return spring means;
said jack spool means being rotatable one way in a down-shifting direction in which said jack spool means pulls said control cable means for down-shifting said derailleur shifting means, and the opposite way in an up-shifting direction in which said jack spool means releases said control cable means for up-shifting said derailleur shifting means; and
an operative connection between said rotator means and said jack spool means such that down-shifting rotation of said rotator means will cause synchronous down-shifting rotation of said jack spool means, and up-shifting rotation of said rotator means will cause synchronous up-shifting rotation of said jack spool means.

2. A bicycle gear shifting system as defined in claim 1, wherein said second axis is angularly offset from said first axis about 90°.

3. A bicycle gear shifting system as defined in claim 1, wherein said operative connection comprises a mechanical connection.

4. A bicycle gear shifting system as defined in claim 3, wherein said operative connection comprises a cable connection.

5. A bicycle gear shifting system as defined in claim 3, wherein said operative connection comprises a gear connection.

6. A bicycle gear shifting system as defined in claim 5, wherein said gear connection comprises a bevel gear connection.

7. A bicycle gear shifting system as defined in claim 2, wherein said operative connection comprises a cable connection.

8. A bicycle gear shifting system as defined in claim 2, wherein said operative connection comprises a gear connection.

9. A bicycle gear shifting system as defined in claim 8, wherein said gear connection is a bevel gear connection.

10. A bicycle gear shifting system as defined in claim 1, wherein said rotator means is engaged over the outside of the bicycle handlebar substantially inboard of an end of the handlebar.

11. A bicycle gear shifting system as defined in claim 1, wherein said control cable means extends from said jack spool means generally parallel to the bicycle handlebar.

12. A bicycle gear shifting system as defined in claim 1, which comprises cam means on one of said rotator means and jack spool means that is configured so that said jack spool down-shifting control cable pulling substantially compensates for increasing force of said return spring means in the down-shifting direction of said derailleur shifting means.

13. A bicycle gear shifting system as defined in claim 1, which comprises cam means on one of said rotator means and jack spool means which is configured so that said jack spool down-shifting control cable pulling substantially compensates for lost motions in said derailleur shifting means and said control cable means.

14. A bicycle gear shifting system as defined in claim 1, which comprises cam means on one of said rotator means and jack spool means which is configured to cause said derailleur shifting means to move the bicycle chain a sufficient overshift amount beyond the destination sprocket of said derailleur shifting means in a down-shifting event so that the chain will approach the destination sprocket in the same direction as it would in an up-shifting event.

15. A bicycle gear shifting system as defined in claim 14, wherein said cam means is configured so that said movement of the bicycle chain beyond said destination sprocket is insufficient to cause a double shift.

16. A bicycle gear shifting system as defined in claim 14, wherein said destination sprocket is the largest sprocket of said shifting means, and said cam means is configured so that movement of the bicycle chain beyond said destination sprocket is insufficient to cause the chain to derail from said destination sprocket.

17. A bicycle gear shifting system as defined in claim 14, wherein said cam means is configured so that said movement of the bicycle chain beyond said destination sprocket is insufficient to cause the chain to rasp against the next sprocket beyond said destination sprocket.

18. A bicycle gear shifting system as defined in claim 12, wherein said cam means is on said jack spool means.

19. A bicycle gear shifting system as defined in claim 18, wherein said control cable means is engaged on said cam means.

20. A bicycle gear shifting system as defined in claim 13, wherein said cam means is on said jack spool means.

21. A bicycle gear shifting system as defined in claim 20, wherein said control cable means is engaged on said cam means.

22. A bicycle gear shifting system as defined in claim 14, wherein said cam means is on said jack spool means.

23. A bicycle gear shifting system as defined in claim 22, wherein said control cable means is engaged on said cam means.

24. A bicycle gear shifting system as defined in claim 15, wherein said cam means is on said jack spool means.

25. A bicycle gear shifting system as defined in claim 24, wherein said control cable means is engaged on said cam means.

26. A bicycle gear shifting system as defined in claim 16, wherein said cam means is on said jack spool means.

27. A bicycle gear shifting system as defined in claim 26, wherein said control cable means is engaged on said cam means.

28. A bicycle gear shifting system as defined in claim 17, wherein said cam means is on said jack spool means.

29. A bicycle gear shifting system as defined in claim 28, wherein said control cable means is engaged on said cam means.

30. A bicycle gear shifting system as defined in claim 1, which comprises gear-specifying detenting means engaged between structure fixed relative to the bicycle handlebar and rotatable structure comprising one of said rotator means and said jack spool means.

31. A bicycle gear shifting system as defined in claim 30, wherein said detenting means comprises detent projection means and spring means in one of said structures, and an arcuate array of spaced detent notches in the other of said structures, said spring means biasing said projection means against said arcuate array.

32. A bicycle gear shifting system as defined in claim 31, wherein said projection means and said spring means are located in said fixed structure and said arcuate array is located in said rotatable structure.

33. A bicycle gear shifting system as defined in claim 32, wherein said projection means and said spring means are located generally radially outwardly of said arcuate array.

34. A bicycle gear shifting system as defined in claim 33, wherein said operative connection comprises a cable connection.

35. A bicycle gear shifting system as defined in claim 32, wherein said projection means and said spring means are located generally radially inwardly of said arcuate array.

36. A bicycle gear shifting system as defined in claim 35, wherein said operative connection comprises a gear connection.

37. A bicycle gear shifting system as defined in claim 30, wherein said detenting means is engaged between said fixed structure and said rotator means.

38. A bicycle gear shifting system as defined in claim 37, wherein said operative connection comprises a cable connection.

39. A bicycle gear shifting system as defined in claim 30, wherein said detenting means is engaged between said fixed structure and said jack spool means.

40. A bicycle gear shifting system as defined in claim 39, wherein said operative connection comprises a gear connection.

41. A bicycle gear shifting system as defined in claim 31, wherein said projection means and said spring means are located in said fixed structure and said arcuate array is located in said rotator means.

42. A bicycle gear shifting system as defined in claim 41, wherein said operative connection comprises a cable connection.

43. A bicycle gear shifting system as defined in claim 31, wherein said projection means and said spring means are located in said fixed structure and said arcuate array is located in said jack spool means.

44. A bicycle gear shifting system as defined in claim 43, wherein said operative connection comprises a gear connection.

45. A bicycle gear shifting system as defined in claim 31, wherein said projection means and said spring means are together arcuately shiftable in one of said structures between a first, up-shifted position and a second, down-shifting position.

46. A bicycle gear shifting system as defined in claim 45, wherein lost motions in said derailleur shifting means and said control cable means are released in said first position and are taken up in said second position.

47. A bicycle gear shifting system as defined in claim 45, wherein an overshift increment of movement of said derailleur shifting means is released in said first position and is taken up in said second position.

48. A bicycle gear shifting system as defined in claim 45, wherein said projection means and said spring means are together selectively shiftable back and forth between said first and second positions in any selected gear position of said detenting means by manipulation of said rotator means, so as to avoid chain rasp.

49. A bicycle gear shifting system as defined in claim 48, which comprises secondary detenting means engageable between said spring means and said one of said structures to selectively retain said projection means and said spring means together in either of said first and second positions in any selected gear position of said detenting means.

50. A bicycle gear shifting system as defined in claim 48, wherein said derailleur shifting means comprises front derailleur shifting means.

51. A bicycle gear shifting system as defined in claim 48, wherein said derailleur shifting means comprises rear derailleur shifting means.

52. A bicycle gear shifting system as defined in claim 49, wherein said derailleur shifting means comprises front derailleur shifting means.

53. A bicycle gear shifting system as defined in claim 49, wherein said derailleur shifting means comprises rear derailleur shifting means.

54. A bicycle gear shifting system as defined in claim 45, wherein said spring means has a relatively lower spring rate in its said second position than it has in its said first position, so as to substantially compensate for the higher force of the derailleur return spring during down-shifting.

55. A bicycle gear shifting system as defined in claim 31, wherein said detent notches have different down-shifting and up-shifting slopes, said down-shifting notch slopes having a gentler angle of inclination than said up-shifting slopes so as to substantially compensate for the higher derailleur spring force during down-shifting events.

56. A bicycle gear shifting system as defined in claim 31, wherein said spring means comprises elongated leaf spring means.

57. A bicycle gear shifting system as defined in claim 56, wherein said projection means is integral with said leaf spring means.

58. A bicycle gear shifting system as defined in claim 57, wherein said projection means and said spring means are located in said fixed structure and said arcuate array is located in said rotatable structure.

59. A bicycle gear shifting system as defined in claim 58, wherein said rotatable structure comprises said rotator means.

60. A bicycle gear shifting system as defined in claim 59, wherein said operative connection comprises a cable connection.

61. A bicycle gear shifting system as defined in claim 31, wherein said projection means comprises ball detent means.

62. A bicycle gear shifting system as defined in claim 61, wherein said spring means comprises compression spring means.

63. A bicycle gear shifting system as defined in claim 61, wherein said ball detent means and said spring means are located in said fixed structure and said arcuate array is located in said rotatable structure.

64. A bicycle gear shifting system as defined in claim 63, wherein said rotatable structure comprises said jack spool means.

65. A bicycle gear shifting system as defined in claim 64, wherein said operative connection comprises a gear connection.

66. A bicycle gear shifting system as defined in claim 31, wherein said rotatable structure comprises said jack spool means and said operative connection comprises a gear connection;
said jack spool means comprising gear ring means, with said operative connection being a gear connection between said rotator means and said gear ring means, and said one end of said control cable means being fixedly secured to said gear ring means;
said jack spool means further comprising driven ring means that is rotatively driven by said gear ring means, with said detenting means being engaged between said fixed structure and said driven ring means; and
a lost motion drive connection between said gear ring means and said driven ring means, said lost motion drive connection enabling said gear ring means to be rotatably shiftable relative to said driven ring means between a first, up-shifted position and a second, down-shifting position.

67. A bicycle gear shifting system as defined in claim 66, wherein lost motions in said derailleur shifting means and said control cable means are released in said first position and are taken up in said second postion.

68. A bicycle gear shifting system as defined in claim 66, wherein an overshift increment of movement of said derailleur shifting means is released in said first position and is taken up in said second position.

69. A bicycle gear shifting system as defined in claim 66, wherein said driven ring means is located generally concentrically within said gear ring means.

70. A bicycle gear shifting system as defined in claim 66, wherein gear ring means is selectively shiftable back and forth relative to said driven ring means between said first and second relative positions in any selected gear position of said detenting means by manipulation of said rotator means, so as to avoid chain rasp.

71. A bicycle gear shifting system as defined in claim 70, which comprises secondary detenting means engageable between said gear ring means and said driven ring means to selectively retain said gear ring means and said driven ring means in either of said first and second relative positions in any selected gear position of said detenting means.

72. A bicycle gear shifting system as defined in claim 70, wherein said derailleur shifting means comprises front derailleur shifting means.

73. A bicycle gear shifting system as defined in claim 70, wherein said derailleur shifting means comprises rear derailleur shifting means.

74. A bicycle gear shifting system as defined in claim 71, wherein said derailleur shifting means comprises front derailleur shifting means.

75. A bicycle gear shifting system as defined in claim 71, wherein said derailleur shifting means comprises rear derailleur shifting means.

76. In a bicycle gear shifting system comprising derailleur shifting means operatively associated with the rear wheel of the bicycle and having return spring means, handgrip shift actuator means comprising rotatable means with cam means thereon, and control cable means having a first end connected to said shift actuator means and a second end operatively connected to said derailleur shifting means, a method for shifting gears which comprises:

engaging said control cable means proximate its said first end over said cam means; and providing said cam means with a configuration such that rotation thereof in a down-shifting direction will cause said cam means to pull said cable means so as to cause down-shifting of said shifting means, and rotation thereof in an opposite, up-shifting direction will cause said cam means to release said cable means so as to cause up-shifting of said shifting means.

77. The method of claim 76, which comprises configuring said cam means so as to substantially compensate for increasing force of said return spring means in the down-shifting direction.

78. The method of claim 76, which comprises configuring said cam means so as to substantially compensate for lost motions in said derailleur shifting means and said cable means.

79. The method of claim 76, which comprises configuring said cam means so as to cause said shifting means to move the bicycle chain a sufficient overshift amount beyond the destination sprocket of said shifting means in a down-shifting event so that the chain will approach the destination sprocket in the same direction as it would in an up-shifting event.

80. The method of claim 79, which comprises configuring said cam means so that said movement of the bicycle chain beyond said destination sprocket is insufficient to cause a double shift.

81. The method of claim 79, wherein said destination sprocket is the largest sprocket of said shifting means, and which comprises configuring said cam means so that said movement of the bicycle chain is insufficient to cause the chain to derail from said destination sprocket.

82. The method of claim 79, which comprises configuring said cam means so that said movement of the bicycle chain beyond said destination sprocket is insufficient to cause the chain to rasp against the next sprocket beyond said destination sprocket.

83. The method of claim 76, wherein said first end of said cable means is fixedly secured relative to the bicycle handlebar, and which comprises expanding the portion of said cable means which is engaged over said cam means during down-shifting, and contracting such portion of said cable means during up-shifting.

84. The method of claim 83, which comprises configuring said cam means so as to substantially compensate for increasing force of said return spring means in the down-shifting direction.

85. The method of claim 83, which comprises configuring said cam means so as to substantially compensate for lost motions in said derailleur shifting means and said cable means.

86. The method of claim 83, which comprises configuring said cam means so as to cause said shifting means to move the bicycle chain a sufficient overshift amount beyond the destination sprocket of said shifting means in a down-shifting event so that the chain will approach the destination sprocket in the same direction as it would in an up-shifting event.

87. The method of claim 86, which comprises configuring said cam means so that said movement of the bicycle chain beyond said destination sprocket is insufficient to cause a double shift.

88. The method of claim 86, wherein said destination sprocket is the largest sprocket of said shifting means, and which comprises configuring said cam means so that said movement of the bicycle chain is insufficient to cause the chain to derail from said destination sprocket.

89. The method of claim 86, which comprises configuring said cam means so that said movement of the bicycle chain beyond said destination sprocket is insufficient to cause the chain to rasp against the next sprocket beyond said destination sprocket.

90. The method of claim 76, wherein said rotatable means comprises rotatably driven jack spool means, said fist end of said cable means being fixedly secured to said jack spool means, and which comprises pulling the portion of said cable means which is engaged over said cam means during down-shifting, and releasing such portion of said cable means during up-shifting.

91. The method of claim 90, which comprises configuring said cam means so as to substantially compensate for increasing force of said return spring means in the down-shifting direction.

92. The method of claim 90, which comprises configuring said cam means so as to substantially compensate for lost motions in said derailleur shifting means and said cable means.

93. The method of claim 90, which comprises configuring said cam means so as to cause said shifting means to move the bicycle chain a sufficient overshift amount beyond the destination sprocket of said shifting means in a down-shifting event so that the chain will approach the destination sprocket in the same direction as it would in an up-shifting event.

94. The method of claim 93, which comprises configuring said cam means so that said movement of the bicycle chain beyond said destination sprocket is insufficient to cause a double shift.

95. The method of claim 93, wherein said destination sprocket is the largest sprocket of said shifting means, and which comprises configuring said cam means so that said movement of the bicycle chain is insufficient to cause the chain to derail from said destination sprocket.

96. The method of claim 93, which comprises configuring said cam means so that said movement of the bicycle chain beyond said destination sprocket is insufficient to cause the chain to rasp against the next sprocket beyond said destination sprocket.

97. The method of claim 90, which comprises driving said jack spool means by means of a short cable connection between said rotator means and said jack spool means.

98. The method of claim 90, which comprises driving said jack spool means by means of a gear connection between said rotator means and said jack spool means.

99. The method of claim 76, wherein said rotatable means with cam means thereon is rotatable generally coaxially of the bicycle handlebar.

100. The method of claim 76, wherein said rotatable means with cam means thereon is rotatable about an axis that is angularly offset from the general axis of the handlebar.

101. The method of claim 76, wherein said rotatable means with cam means thereon is rotatable about an axis that is angularly offset about 90° from the general axis of the handlebar.

102. The method of claim 101, which comprises exiting said cable means from said handgrip shift actuator means with said cable means generally parallel to said handlebar means so as to minimize cable friction.

103. The method of claim 100, wherein said rotatable means with said cam means thereon comprises jack spool means driven by said handgrip rotator means.

104. The method of claim 103, which comprises exiting said cable means from said handgrip shift actuator means generally at right angles to the axis of rotation of said jack spool means.

105. The method of claim 76, which comprises specifying which sprocket of said derailleur means the bicycle chain is engaged on by detenting between structure fixed relative to the bicycle handlebar and said rotatable means.

106. The method of claim 105, wherein said rotatable means with cam means thereon is rotatable generally coaxially of the bicycle handlebar.

107. The method of claim 105, wherein said rotatable means with said cam means thereon comprises rotatably driven jack spool means, with said first end of said cable means being fixedly secured to said jack spool means.

108. The method of claim 107, which comprises rotatably driving said jack spool means by gear drive means.

* * * * *

US005197927B1

REEXAMINATION CERTIFICATE (4172nd)

United States Patent [19]
Patterson et al.

[11] B1 5,197,927
[45] Certificate Issued  *Oct. 17, 2000

[54] BICYCLE DERAILLEUR CABLE ACTUATING SYSTEM

[75] Inventors: Sam H. Patterson, Agoura Hills, Calif.; John D. Cheever; Jeffery M. Shupe, both of Chicago, Ill.

[73] Assignee: sRAM Corporation, Chicago, Ill.

Reexamination Requests:
No. 90/005,122, Sep. 30, 1998
No. 90/005,265, Feb. 25, 1999

Reexamination Certificate for:
Patent No.:  5,197,927
Issued:  Mar. 30, 1993
Appl. No.:  07/853,442
Filed:  Mar. 18, 1992

[ * ] Notice: This patent is subject to a terminal disclaimer.

Related U.S. Application Data

[63] Continuation-in-part of application No. 07/672,431, Mar. 20, 1991, Pat. No. 5,102,372.

[51] Int. Cl.[7] .......................................................... F16H 7/00
[52] U.S. Cl. ........................... 474/80; 74/489; 74/502.2; 74/502.4; 74/505; 74/506
[58] Field of Search ....................... 474/78–82; 280/236, 280/238, 260, 261; 74/473.14, 473.15, 502.2, 489

[56]  References Cited

U.S. PATENT DOCUMENTS

| 2,874,587 | 2/1959 | Schmid | ............................................ | 74/489 |
| 3,442,148 | 5/1969 | Juy | ......................................... | 74/470 |

(List continued on next page.)

FOREIGN PATENT DOCUMENTS

| 829283 | 6/1938 | France . |
| 2 563 174 | 10/1985 | France . |
| 27 10391 A1 | 9/1978 | Germany . |
| 30 12034 A1 | 10/1981 | Germany . |
| 30 13008 A1 | 10/1981 | Germany . |
| 32 15426 A1 | 10/1983 | Germany . |
| 32 15427 A1 | 10/1983 | Germany . |
| 8536537 U | 4/1986 | Germany . |

(List continued on next page.)

OTHER PUBLICATIONS

*Bicycling Magazine's Complete Guide to Upgrading Your Bike,* Berto, 1988, Chapter 4, "All About Shift Levers and Indexed Shifting."

*Primary Examiner*—Thomas R. Hannon

[57]  ABSTRACT

A bicycle gear shifting system having rotatable front and rear handgrip shift actuators operatively associated with control cables for shifting respective front and rear derailleur mechanisms. In some forms of the invention the control cable is directly actuated by the handgrip rotator, while in other forms the shifter rotator drives a separate "jack spool" which in turn actuates the control cable. A cam on either the handgrip rotator or the jack spool is configured so as to substantially compensate for increasing force of the derailleur return spring during down-shifting. Compensation is provided in the shift actuators of the invention for various lost motions in the derailleur shifting mechanisms and control cable systems. The shift actuators of the invention also provide overshift movement of the derailleur mechanisms in the down-shifting direction so as to overshift the bicycle chain a sufficient amount beyond the destination derailleur sprocket so that the chain will approach the destination sprocket in the same direction as it would in the up-shifting direction. The shift actuators of the invention also provide equalization for the higher derailleur return spring force during down-shifting than during up-shifting, and allow fine-tuning to avoid chain rasp, which is particularly important for "cross-over" riding.

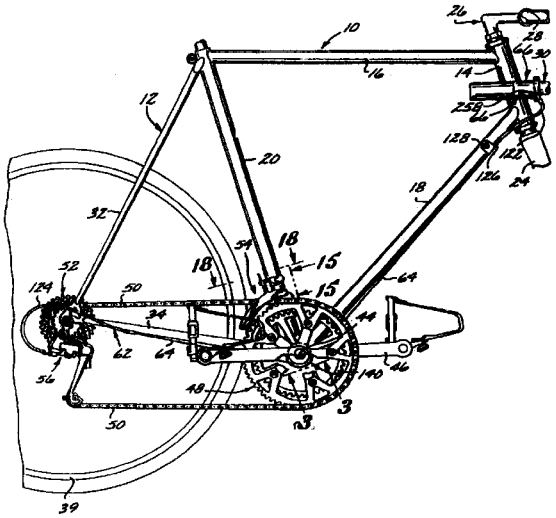

U.S. PATENT DOCUMENTS

| | | | |
|---|---|---|---|
| 3,633,437 | 1/1972 | Ishida | 74/489 |
| 4,260,171 | 4/1981 | Foster | 280/279 |
| 4,352,303 | 10/1982 | Christner | 74/489 |
| 4,461,189 | 7/1984 | Rottenkolber et al. | 74/489 |
| 4,504,250 | 3/1985 | Juy | 474/80 |
| 4,545,455 | 10/1985 | Kanemura et al. | 180/197 |
| 4,599,079 | 7/1986 | Chappell | 474/80 |
| 4,681,198 | 7/1987 | Costa Mas | 192/3 |
| 4,693,700 | 9/1987 | Chappell | 474/80 |
| 4,840,081 | 6/1989 | Nagano | 74/502.2 |
| 4,900,291 | 2/1990 | Patterson | 474/80 |
| 4,905,537 | 3/1990 | Nagano | 74/531 |
| 5,020,387 | 6/1991 | Nagano | 74/475 |
| 5,033,991 | 7/1991 | McLaren | 474/78 |
| 5,134,897 | 8/1992 | Romano | 74/489 |
| 5,135,441 | 8/1992 | Gelbien | 474/78 |

FOREIGN PATENT DOCUMENTS

| | | |
|---|---|---|
| 44-18334 | 8/1969 | Japan . |
| 44-26571 | 11/1969 | Japan . |
| 48-33173 | 10/1973 | Japan . |
| 49-12643 | 2/1974 | Japan . |
| 51-25411 | 6/1976 | Japan . |
| 55-72479 | 5/1980 | Japan . |
| 56-31519 | 7/1981 | Japan . |
| 57-117738 | 7/1982 | Japan . |
| 58-171791 | 11/1983 | Japan . |
| 58-191682 | 11/1983 | Japan . |
| 61-3793 | 1/1986 | Japan . |
| 62-13911 | 4/1987 | Japan . |
| 3-176290 | 7/1991 | Japan . |
| 2 187 050 | 8/1987 | United Kingdom . |

B1 5,197,927

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3–9, 34, 36–38, 40, 42, 44, 51–53, 59, 60, 65, 73–82, 97–99 and 106–108 are cancelled.

Claims 1, 2, 30, 33, 41, 50, 58, 66, 67, 72, 83, 90, 100, 101 and 105 are determined to be patentable as amended.

Claims 10–29, 31, 32, 35, 39, 43, 45–49, 54–57, 61–64, 68–71, 84–89, 91–96 and 102–104, dependent on an amended claim, are determined to be patentable.

New claims 109–116 are added and determined to be patentable.

1. A bicycle gear shifting system, which comprises:
    derailleur shifting means having return spring means operatively associated with the rear wheel of the bicycle;
    handgrip shift actuator means mounted on the handlebar of the bicycle;
    said shift actuator means comprising manually actuated shifter rotator means rotatable about a first axis generally coaxial of the handlebar,
    said rotator means being selectively rotatable one way in a down-shifting direction and the opposite way in an up-shifting direction;
    said shift actuator means further comprising jack spool means rotatable about a second axis that is angularly offset from said first axis;
    control cable means having one end secured to said jack spool means and the other end operatively connected to said derailleur shifting means, said control cable means being biased toward said derailleur shifting means by said return spring means;
    said jack spool means being rotatable one way in a down-shifting direction in which said jack spool means pulls said control cable means for down-shifting said derailleur shifting means, and the opposite way in an up-shifting direction in which said jack spool means releases said control cable means for up-shifting said derailleur shifting means; and
    an operative connection between said rotator means and said jack spool means such that down-shifting rotation of said rotator means will cause synchronous down-shifting rotation of said jack spool means, and up-shifting rotation of said rotator means will cause synchronous up-shifting rotation of said jack spool means*, said operative connection comprising a cable connection.*
2. A bicycle gear shifting system [as defined in claim 1, wherein] *which comprises:*
    *derailleur shifting means having return spring means operatively associated with the rear wheel of the bicycle;*
    *handgrip shift actuator means mounted on the handlebar of the bicycle;*
    *said shift actuator means comprising manually actuated shifter rotator means rotatable about a first axis generally coaxial of the handlebar,*
    *said rotator means being selectively rotatable one way in a down-shifting direction and the opposite way in an up-shifting direction;*
    *said shift actuator means further comprising jack spool means rotatable about a second axis that is angularly offset from said first axis;*
    *control cable means having one end secured to said jack spool means and the other end operatively connected to said derailleur shifting means, said control cable means being biased toward said derailleur shifting means by said return spring means;*
    *said jack spool means being rotatable one way in a down-shifting direction in which said jack spool means pulls said control cable means for down-shifting said derailleur shifting means, and the opposite way in an up-shifting direction in which said jack spool means releases said control cable means for up-shifting said derailleur shifting means; and*
    *an operative connection between said rotator means and said jack spool means such that down-shifting rotation of said rotator means will cause synchronous down-shifting rotation of said jack spool means, and up-shifting rotation of said rotator means will cause synchronous up-shifting rotation of said jack spool means,* said second axis [is] *being* angularly offset from said first axis about 90°*, said operative connection comprising a cable connection.*
3. A bicycle gear shifting system [as defined in claim 1], *which comprises:*
    *derailleur shifting means having return spring means operatively associated with the rear wheel of the bicycle;*
    *handgrip shift actuator means mounted on the handlebar of the bicycle;*
    *said shift actuator means comprising manually actuated shifter rotator means rotatable about a first axis generally coaxial of the handlebar,*
    *said rotator means being selectively rotatable one way in a down-shifting direction and the opposite way in an up-shifting direction;*
    *said shift actuator means further comprising jack spool means rotatable about a second axis that is angularly offset from said first axis;*
    *control cable means having one end secured to said jack spool means and the other end operatively connected to said derailleur shifting means, said control cable means being biased toward said derailleur shifting means by said return spring means;*
    *said jack spool means being rotatable one way in a down-shifting direction in which said jack spool means pulls said control cable means for down-shifting said derailleur shifting means, and the opposite way in an up-shifting direction in which said jack spool means releases said control cable means for up-shifting said derailleur shifting means; and*
    *an operative connection between said rotator means and said jack spool means such that down-shifting rotation of said rotator means will cause synchronous down-shifting rotation of said jack spool means, and up-shifting rotation of said rotator means will cause* synchronous up-shifting rotation of said jack spool means, said operative connection comprising a cable connection; and gear-specifying detenting means engaged between structure fixed relative to the bicycle handlebar and rotatable structure comprising one of said rotator means and said jack spool means.

33. A bicycle gear shifting system [as defined in claim 32, wherein] *comprising:* derailleur shifting means having return spring means operatively associated with the rear wheel of the bicycle;

handgrip shift actuator means mounted on the handlebar of the bicycle;

said shift actuator means comprising manually actuated shifter rotator means rotatable about a first axis generally coaxial of the handlebar, said rotator means being selectively rotatable one way in a down-shifting direction and the opposite way in an up-shifting direction;

said shift actuator means further comprising jack spool means rotatable about a second axis that is angularly offset from said first axis;

control cable means having one end secured to said jack spool means and the other end operatively connected to said derailleur shifting means, said control cable means being biased toward said derailleur shifting means by said return spring means;

said jack spool means being rotatable one way in a down-shifting direction in which said jack spool means pulls said control cable means for down-shifting said derailleur shifting means, and the opposite way in an up-shifting direction in which said jack spool means releases said control cable means for up-shifting said derailleur shifting means;

an operative connection between said rotator means and said jack spool means such that down-shifting rotation of said rotator means will cause synchronous down-shifting rotation of said jack spool means, and up-shifting rotation of said rotator means will cause synchronous up-shifting rotation of said jack spool means, said operative connection comprising a cable connection; and gear-specifying detenting means engaged between structure fixed relative to the bicycle handlebar and rotatable structure comprising one of said rotator means and said jack spool means, said detenting means comprises detent projection means and spring means in said fixed structure, and an arcuate array of spaced detent notches in said rotatable structure, said spring means biasing said projection means against said arcuate array, said projection means and said spring means [are] *being* located generally radially outwardly of said arcuate array.

41. A bicycle gear shifting system [as defined in claim 31, wherein said projection means and said spring means are located in said fixed structure and said arcuate array is located in said rotator means] *comprising:* derailleur shifting means having return spring means operatively associated with the rear wheel of the bicycle;

handgrip shift actuator means mounted on the handlebar of the bicycle;

said shift actuator means comprising manually actuated shifter rotator means rotatable about a first axis generally coaxial of the handlebar, said rotator means being selectively rotatable one way in a down-shifting direction and the opposite way in an up-shifting direction;

said shift actuator means further comprising jack spool means rotatable about a second axis that is angularly offset from said first axis;

control cable means having one end secured to said jack spool means and the other end operatively connected to said derailleur shifting means, said control cable means being biased toward said derailleur shifting means by said return spring means;

said jack spool means being rotatable one way in a down-shifting direction in which said jack spool means pulls said control cable means for down-shifting said derailleur shifting means, and the opposite way in an up-shifting direction in which said jack spool means releases said control cable means for up-shifting said derailleur shifting means;

an operative connection between said rotator means and said jack spool means such that down-shifting rotation of said rotator means will cause synchronous down-shifting rotation of said jack spool means, and up-shifting rotation of said rotator means will cause synchronous up-shifting rotation of said jack spool means, said operative connection comprising a cable connection; and gear-specifying detenting means engaged between structure fixed relative to the bicycle handlebar and rotatable structure comprising one of said rotator means and said jack spool means, said detenting means comprising detent projection means and spring means located in said fixed structure, and an arcuate array of spaced detent notches located in said rotator means, said spring means biasing said projection means against said arcuate array.

50. A bicycle gear shifting system [as defined in claim 48, wherein said derailleur shifting means] *which* comprises:

front derailleur shifting means *having return spring means operatively associated with a front derailleur of the bicycle;* handgrip shift actuator means mounted on the handlebar of the bicycle;

said shift actuator means comprising manually actuated shifter rotator means rotatable about a first axis generally coaxial of the handlebar, said rotator means being selectively rotatable one way in a down-shifting direction and the opposite way in an up-shifting direction;

said shift actuator means further comprising jack spool means rotatable about a second axis that is angularly offset from said first axis;

control cable means having one end secured to said jack spool means and the other end operatively connected to said derailleur shifting means, said control cable means being biased toward said derailleur shifting means by said return spring means;

said jack spool means being rotatable one way in a down-shifting direction in which said jack spool means pulls said control cable means for down-shifting said derailleur shifting means, and the opposite way in an up-shifting direction in which said jack spool means releases said control cable means for up-shifting said derailleur shifting means;

an operative connection between said rotator means and said jack spool means such that down-shifting rotation of said rotator means will cause synchronous downshifting rotation of said jack spool means, and up-shifting rotation of said rotator means will cause synchronous up-shifting rotation of said jack spool means, said operative connection comprising a cable connection; and gear-specifying detenting means engaged between structure fixed relative to the bicycle handlebar and rotatable structure comprising one of said rotator means and said jack spool means, said detenting means comprising detent projection means and spring means in one of said structures, and an arcuate array of spaced detent notches in the other of said structures, said spring means biasing said projection means against said arcuate array, said projection means and said spring means together being arcuately shiftable in one of said structures between a first, up-shifted position and a second, down-shifting position, said projection means and said spring means together being selectively shiftable back and forth between said first and second positions in any selected gear position of said detenting means by manipulation of said rotator means, so as to avoid chain rasp.

58. A bicycle gear shifting system [as defined in claim 57, wherein said projection means and said spring means are located in said fixed structure and said arcuate array is located in said rotatable structure], which comprises:

derailleur shifting means having return spring means opearatively associated with the rear wheel of the bicycle;

handgrip shift actuator means mounted on the handlebar of the bicycle;

said shift actuator means comprising manually actuated shifter rotator means rotatable about a first axis generally coaxial of the handlebar, said rotator means being selectively rotatable one way in a down-shifting direction and the opposite way in an up-shifting direction;

said shift actuator means further comprising jack spool means rotatable about a second axis that is angularly offset from said first axis;

control cable means having one end secured to said jack spool means and the other end operatively connected to said derailleur shifting means, said control cable means being biased toward said derailleur shifting means by said return spring means;

said jack spool means being rotatable one way in a down-shifting direction in which said jack spool means pulls said control cable means for down-shifting said derailleur shifting means, and the opposite way in an up-shifting direction in which said jack spool means releases said control cable means for up-shifting said derailleur shifting means; and an operative connection between said rotator means and said jack spool means such that down-shifting rotation of said rotator means will cause synchronous down-shifting rotation of said jack spool means, and up-shifting rotation of said rotator means will cause synchronous up-shifting rotation of said jack spool means, said operative connection comprising a cable connection; and gear-specifying detenting means engaged between structure fixed relative to the bicycle handlebar and structure comprising said rotator means, said detenting means comprising detent projection means and elongated leaf spring means in said fixed structure, and an arcuate array of spaced detent notches in said rotator means, said spring means biasing said projection means against said arcuate array, said projection means integral with said leaf spring means.

66. A bicycle gear shifting system [as defined in claim 31, wherein said rotatable structure comprises said jack spool means and said operative connection comprises a gear connection] which comprises:

derailleur shifting means having return spring means operatively associated with the rear wheel of the bicycle;

handgrip shift actuator means mounted on the handlebar of the bicycle;

said shift actuator means comprising manually actuated shifter rotator means rotatable about a first axis generally coaxial of the handlebar, said rotator means being selectively rotatable one way in a down-shifting direction and the opposite way in an up-shifting direction;

said shift actuator means further comprising jack spool means rotatable about a second axis that is angularly offset from said first axis;

control cable means having one end secured to said jack spool means and the other end operatively connected to said derailleur shifting means, said control cable means being biased toward said derailleur shifting means by said return spring means;

said jack spool means being rotatable one way in a down-shifting direction in which said jack spool means pulls said control cable means for down-shifting said derailleur shifting means, and the opposite way in an up-shifting direction in which said jack spool means releases said control cable means for up-shifting said derailleur shifting means;

an operative connection between said rotator means and said jack spool means such that down-shifting rotation of said rotator means will cause synchronous down-shifting rotation of said jack spool means, and up-shifting rotation of said rotator means will cause synchronous up-shifting rotation of said jack spool means;

gear-specifying detenting means engaged between structure fixed relative to the bicycle handlebar and rotatable structure comprising one of said rotator means and said jack spool means, said detenting means comprising detent projection means and spring means in one of said structures, and an arcuate array of spaced detent notches in the other of said structures, said spring means biasing said projection means against said arcuate array;

said jack spool means comprising gear ring means, with said operative connection being a gear connection between said rotator means and said gear ring means, and said one end of said control cable means being fixedly secured to said gear ring means;

said jack spool means further comprising driven ring means that is rotatively driven by said gear ring means, with said detenting means being engaged between said fixed structure and said driven ring means; and a lost motion drive connection between said gear ring means and said driven ring means, said lost motion drive connection enabling said gear ring means to be rotatably shiftable relative to said driven ring means between a first, up-shifted position and a second, down-shifting position.

67. A bicycle gear shifting system as defined in claim 66, wherein lost motions in said derailleur shifting means and said control cable means are released in said first position and are taken up in said second [postion] *position*.

72. A bicycle gear shifting system [as defined in claim 70, wherein said derailleur shifting means] *which* comprises:

front derailleur shifting means *having return spring means operatively associated with a front derailleur of the bicycle;* handgrip shift actuator means mounted on the handlebar of the bicycle;

said shift actuator means comprising manually actuated shifter rotator means rotatable about a first axis generally coaxial of the handlebar, said rotator means being selectively rotatable one way in a down-shifting direction and the opposite way in an up-shifting direction;

said shift actuator means further comprising jack spool means rotatable about a second axis that is angularly offset from said first axis;

control cable means having one end secured to said jack spool means and the other end operatively connected to said derailleur shifting means, said control cable means being biased toward said derailleur shifting means by said return spring means;

said jack spool means being rotatable one way in a down-shifting direction in which said jack spool means pulls said control cable means for down-shifting said derailleur shifting means, and the opposite way in an up-shifting direction in which said jack spool means releases said control cable means for up-shifting said derailleur shifting means;

an operative connection between said rotator means and said jack spool means such that down-shifting rotation of said rotator means will cause synchronous down-shifting rotation of said jack spool means, and up-shifting rotation of said rotator means will cause synchronous up-shifting rotation of said jack spool means, said operative connection comprising a gear connection; and gear-specifying detenting means engaged between structure fixed relative to the bicycle handlebar and rotatable structure comprising said jack spool means, said detenting means comprising detent projection means and spring means in one of said structures, and an arcuate array of spaced detent notches in the other of said structures, said spring means biasing said projection means against said arcuate array;

said jack spool means further comprising driven ring means that is rotatively driven by said gear ring means, with said detenting means being engaged between said fixed structure and said driven ring means; and a lost motion drive connection between said gear ring means and said driven ring means, said lost motion drive connection enabling said gear ring means to be rotatably shiftable relative to said driven ring means between a first, up-shifted position and a second, down-shifting position.

83. [The method of claim 76, wherein] *In a bicycle gear shifting system comprising derailleur shifting means operatively associated with the rear wheel of the bicycle and having return spring means, handgrip shift actuator means comprising rotatable means with cam means thereon, and control cable means having a first end connected to said shift actuator means and a second end operatively connected to said derailleur shifting means, a method for shifting gears which comprises:* engaging said control cable means proximate its said first end over said cam means; and providing said cam means with a configuration such that rotation thereof in a down-shifting direction will cause said cam means to pull said cable means so as to cause down-shifting of said shifting means, and rotation thereof in an opposite, up-shifting direction will cause said cam means to release said cable means so as to cause up-shifting of said shifting means, said first end of said cable means [is] *being* fixedly secured relative to the bicycle handlebar, [and which comprises] *the method further comprising* expanding the portion of said cable means which is engaged over said cam means during down-shifting, and contracting such portion of said cable means during up-shifting.

90. [The method of claim 76, wherein] *In a bicycle gear shifting system comprising derailleur shifting means operatively associated with the rear wheel of the bicycle and having return spring means, handgrip shift actuator means comprising rotatable means with cam means thereon, and control cable means having a first end connected to said shift actuator means and a second end operatively connected to said derailleur shifting means, a method for shifting gears which comprises;* engaging said control cable means proximate its said first end over said cam means; and providing said cam means with a configuration such that rotation thereof in a down-shifting direction will cause said cam means to pull said cable means so as to cause down-shifting of said shifting means, and rotation thereof in an opposite, up-shifting direction will cause said cam means to release said cable means so as to cause up-shifting of said shifting means, said rotatable means [comprises] *comprising* rotatably driven jack spool means, said [fist] *first* end of said cable means being fixedly secured to said jack spool means, [and which comprises] *the method further comprising* pulling the portion of said cable means which is engaged over said cam means during down-shifting, and releasing such portion of said cable means during up-shifting; and driving said jack spool means by means of a short cable connection between manually actuated shifter rotator means of the shift actuator means and said jack spool means.

100. The method of claim [76] *90*, wherein said rotatable means with cam means thereon is rotatable about an axis that is angularly offset from the general axis of the handlebar.

101. The method of claim [76] *90*, wherein said rotatable means with cam means thereon is rotatable about an axis that is angularly offset about 90° from the general axis of the handlebar.

105. The method of claim [76] *90*, which comprises specifying which sprocket of said derailleur means the bicycle chain is engaged on by detenting between structure fixed relative to the bicycle handlebar and said rotatable means.

*109. The bicycle gear shifting system of claim 1, wherein said jack spool means and said rotator means are configured such that said shift actuator means displaces said control cable means at a rate less than that of a simple spooling shifter engaged over the outside of the bicycle handlebar.*

*110. The bicycle gear shifting system of claim 2, wherein said jack spool means and said rotator means are configured* such that said shift actuator means displaces said control cable means at a rate less than that of a simple spooling shifter engaged over the outside of the bicycle handlebar.

111. The bicycle gear shifting system of claim 30, wherein said jack spool means and said rotator means are configured such that said shift actuator means displaces said control cable means at a rate less than that of a simple spooling shifter engaged over the outside of the bicycle handlebar.

112. The bicycle gear shifting system of claim 33, wherein said jack spool means and said rotator means are configured such that said shift actuator means displaces said control cable means at a rate less than that of a simple spooling shifter engaged over the outside of the bicycle handlebar.

113. The bicycle gear shifting system of claim 41, wherein said jack spool means and said rotator means are configured such that said shift actuator means displaces said control cable means at a rate less than that of a simple spooling shifter engaged over the outside of the bicycle handlebar.

114. The bicycle gear shifting system of claim 50, wherein said jack spool means and said rotator means are configured such that said shift actuator means displaces said control cable means at a rate less than that of a simple spooling shifter engaged over the outside of the bicycle handlebar.

115. The bicycle gear shifting system of claim 66, wherein said jack spool means and said rotator means are configured such that said shift actuator means displaces said control cable means at a rate less than that of a simple spooling shifter engaged over the outside of the bicycle handlebar.

116. The bicycle gear shifting system of claim 72, wherein said jack spool means and said rotator means are configured such that said shift actuator means displaces said control cable means at a rate less than that of a simple spooling shifter engaged over the outside of the bicycle handlebar.

* * * * *